United States Patent
Hutchinson et al.

(10) Patent No.: US 12,083,482 B2
(45) Date of Patent: Sep. 10, 2024

(54) LIGHTWEIGHT EXPANDED POLYTETRAFLUOROETHYLENE MEMBRANES HAVING HIGH INSTRINSIC STRENGTH AND OPTICAL TRANSPARENCY

(71) Applicant: W. L. Gore & Associates, Inc., Newark, DE (US)

(72) Inventors: Bryan Hutchinson, Newark, DE (US); Justin J. Skaife, Newark, DE (US); Bret Snyder, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 413 days.

(21) Appl. No.: 17/596,499

(22) PCT Filed: Jun. 9, 2020

(86) PCT No.: PCT/US2020/036725
§ 371 (c)(1),
(2) Date: Dec. 10, 2021

(87) PCT Pub. No.: WO2020/251909
PCT Pub. Date: Dec. 17, 2020

(65) Prior Publication Data
US 2023/0081107 A1 Mar. 16, 2023

Related U.S. Application Data

(60) Provisional application No. 62/861,157, filed on Jun. 13, 2019.

(51) Int. Cl.
*B01D 69/02* (2006.01)
*B01D 67/00* (2006.01)
*B01D 71/36* (2006.01)

(52) U.S. Cl.
CPC ......... *B01D 69/02* (2013.01); *B01D 67/0027* (2013.01); *B01D 71/36* (2013.01); *B01D 2325/24* (2013.01)

(58) Field of Classification Search
CPC  B01D 69/02; B01D 67/0027; B01D 67/0002; B01D 71/36; B01D 2325/24;
(Continued)

(56) References Cited

U.S. PATENT DOCUMENTS 3,953,566 A * 4/1976 Gore ................. H01B 3/445
264/289.3
3,962,153 A * 6/1976 Gore ................. B29C 55/12
55/528

(Continued)

*Primary Examiner* — Liam Royce

(57) ABSTRACT

Thin, self-supporting biaxially expanded polytetrafluoroethylene (ePTFE) membranes that have a high crystallinity index, high intrinsic strength, low areal density (i.e., lightweight), and high optical transparency are provided. In particular, the ePTFE membrane may have a crystallinity index of at least about 94% and a matrix tensile strength at least about 600 MPa in both longitudinal nd transverse directions. In addition, the ePTFE membrane is transparent or invisible to the naked eye through a complete conversion of the PTFE primary particles into fibrils. The ePTFE membrane may have a thickness per layer of less than 100 nm and a porosity reater than 50%. Further, the ePTFE membrane is stackable, which, in turn, may be used to control permeability, pore size, and/or bulk mechanical properties. The ePTFE membrane may be used to form composites, laminates, fibers, tapes, sheets, tubes, or three-dimensional objects. Additionally, the ePTFE membrane may be used in filtration applications.

26 Claims, 39 Drawing Sheets

(58) Field of Classification Search
CPC .......... B29C 55/005; B29C 2793/0081; B29C 2793/009; B29C 2793/0027; B29C 55/12; B29C 63/02; B29K 2027/18; B29K 2995/0041; B29K 2995/0077; B29D 7/01; B29L 2031/755
See application file for complete search history.

(56) References Cited

U.S. PATENT DOCUMENTS

| | | | | |
|---|---|---|---|---|
| 5,213,882 | A | * | 5/1993 | Sassa .................. D04H 1/4318 |
| | | | | 428/36.1 |
| 5,476,589 | A | | 12/1995 | Bacino |
| 7,306,729 | B2 | | 12/2007 | Bacino |
| 2007/0012624 | A1 | * | 1/2007 | Bacino ............... B01D 67/0027 |
| | | | | 210/500.36 |
| 2013/0231733 | A1 | | 9/2013 | Knisley |
| 2014/0172083 | A1 | | 6/2014 | Bruchman |
| 2016/0016124 | A1 | | 1/2016 | Zheng |

\* cited by examiner

20 μm

10 μm

2 μm

20 μm

10 µm

5 μm

2 μm

LIGHTWEIGHT EXPANDED POLYTETRAFLUOROETHYLENE MEMBRANES HAVING HIGH INSTRINSIC STRENGTH AND OPTICAL TRANSPARENCY

FIELD

The present invention is directed to microporous fluoropolymer membranes, and more specifically, to thin, self-supporting, highly expanded polytetrafluoroethylene (ePTFE) membranes that have high crystallinity index, low areal density, high intrinsic strength, and high optical transparency.

BACKGROUND

Polytetrafluoroethylene is an attractive material due to one or more properties such as inertness to many chemicals, biocompatibility, thermal stability, low surface energy, low coefficient of friction, and the ability to be processed into a variety of form factors, such as membranes, fibers, tubes, and the like. Expanded polytetrafluoroethylene (ePTFE) may be used alone or used in composites and/or laminates to produce articles for use in a variety of applications. Many of these applications may benefit from using materials that are lighter, thinner, stronger, and/or have improved optical properties. As such, there is an ever present need to provide ePTFE articles with improved properties.

SUMMARY

According to one aspect, ("Aspect 1"), an expanded polytetrafluoroethylene (ePTFE) membrane includes a matrix tensile strength at least about 600 MPa in both longitudinal and transverse directions and a crystallinity index of at least about 94%.

According to another aspect, ("Aspect 2") further to Aspect 1, the ePTFE membrane has an areal density per layer less than about 100 mg/m².

According to another aspect, ("Aspect 3") further to Aspect 1 or Aspect 2, the ePTFE membrane has a specific surface area from about 35 m²/g to about 120 m²/g.

According to another aspect, ("Aspect 4") further to any one of the preceding Aspects, the ePTFE membrane has a total luminous transmittance of at least about 98%.

According to another aspect, ("Aspect 5") further to any one of the preceding Aspects, the ePTFE membrane comprises fibrils having a median fibril width from about 10 nm to about 80 nm.

According to another aspect, ("Aspect 6") further to any one of the preceding Aspects, the ePTFE membrane has a membrane thickness per layer from 1 nm to about 100 nm.

According to another aspect, ("Aspect 7") further to any one of the preceding Aspects, the ePTFE membrane is self-supporting.

According to another aspect, ("Aspect 8") further to any one of the preceding Aspects, the ePTFE membrane is biaxially oriented.

According to another aspect, ("Aspect 9") further to Aspect 8, the ePTFE membrane has an areal density less than about 10 g/m².

According to another aspect, ("Aspect 10") further to Aspect 8 or Aspect 9, the ePTFE membrane has a quality factor at a particle size of 0.1 micron and a face velocity 5.33 cm/sec of at least about 65 kPa$^{-1}$.

According to another aspect, ("Aspect 11") further to Aspects 8-10, the ePTFE membrane is at least partially coated with a polymer, at least partially imbibed with a polymer, or a combination thereof.

According to another aspect, ("Aspect 12") further to Aspects 8-11, the ePTFE membrane is in the form of a fiber, a sheet, a tube, a three dimensional self-supporting structure, a diced fiber, a diced sheet, a diced tube, or a diced three dimensional self-supporting structure.

According to another aspect, ("Aspect 13") further to Aspects 8-12, the ePTFE membrane has a specific surface area from about 35 m²/g to about 120 m²/g.

According to another aspect, ("Aspect 14") further to Aspects 8-13, the ePTFE membrane has a total luminous transmittance of at least about 98%.

According to another aspect, ("Aspect 15") further to Aspects 8-14, the ePTFE membrane includes a spacing layer.

According to another aspect, ("Aspect 16") further to Aspect 17 the spacing layer is selected from a porous polymer, a non-porous polymer, a fluoropolymer, a porous polyolefin, and a non-porous polyolefin.

According to another aspect, ("Aspect 17") a composite includes the expanded polytetrafluoroethylene membrane of Aspect 1.

According to another aspect, ("Aspect 18") a laminate includes the expanded polytetrafluoroethylene membrane of Aspect 1.

According to another aspect, ("Aspect 19") an article includes the expanded polytetrafluoroethylene membrane of Aspects 1-16, the composite of Aspect 17 or the laminate of Aspect 18.

According to one aspect, ("Aspect 20") a method of forming a biaxially oriented ePTFE membrane includes (1) sectioning at least a first piece from a first expanded polytetrafluoroethylene (ePTFE) membrane, (2) biaxially stretching said at least a first piece to obtain a second expanded polytetrafluoroethylene membrane, (3) sectioning at least a second piece from said second expanded membrane, (4) positioning said at least one first piece and said at least one second piece in a stacked orientation to form stacked sample, and (5) repeating steps (2) through (4) until a desired biaxially oriented ePTFE membrane is obtained.

According to another aspect, ("Aspect 21"), further to Aspect 20, the ePTFE membrane includes a spacing layer.

According to another aspect, ("Aspect 22"), further to Aspect 21, the spacing layer is selected from a porous polymer, a non-porous polymer, a fluoropolymer, a porous polyolefin, and a non-porous polyolefin.

According to another aspect, ("Aspect 23"), a method of filtering a filterable matrix includes passing a filterable matrix through the ePTFE membrane of Aspect 1, the ePTFE membrane of Aspect 8, the composite of Aspect 17 or the laminate of Aspect 18 to form a filtrate.

According to another aspect, ("Aspect 24"), further to Aspect 23, the method includes collecting the filtrate.

According to another aspect, ("Aspect 25"), further to Aspect 23 or Aspect 24, the filterable matrix is selected from a solution, a suspension, a colloid, a biological fluid, a component of a biological fluid, an aqueous material, or a non-aqueous material.

According to another aspect, ("Aspect 26"), further to Aspect 23, the method includes a nanoparticle retention percent (%) equal to or greater than a line defined by y>=9.70–10.76*ln(x) where y=Nanoparticle Retention % and x=Filtrate Permeability (g/cm$^2$/s/MPa).

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

Figure 1:
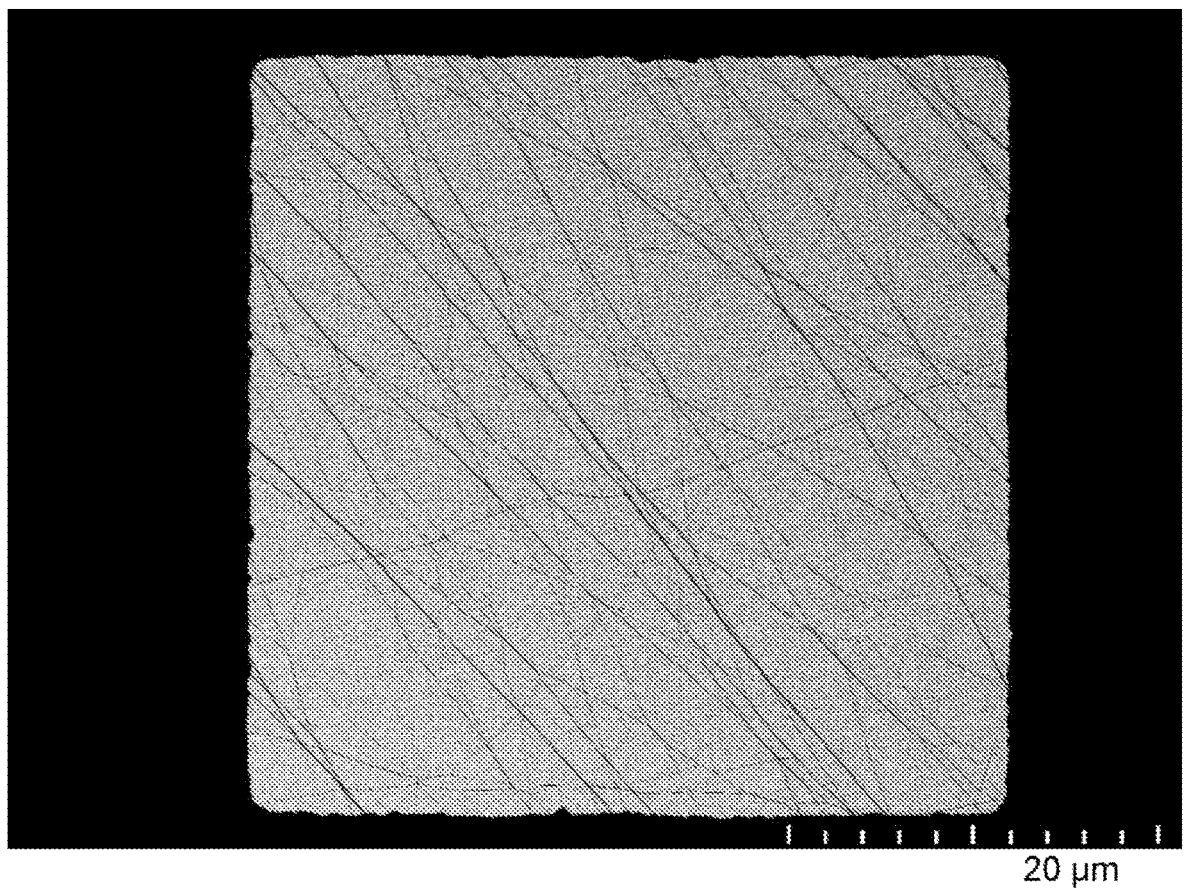
FIG. 1 is a scanning transmission electron microscopy (STEM) image of Sample E1 G from Example 1 taken at 2,000× magnification with a full horizontal field width of approximately 63 microns in accordance with embodiments described herein.

Average Fibril Width: $\overline{w}$ (nm).
Median Fibril Width: $w_m$ (nm).
Area Weighted Fibril Width (AWFW): $\overline{w}_{AWFW}$ (nm).
Area Weighted Fibril Width was calculated utilizing the following Equation:

$$\overline{w}_{AWFW} = \frac{\sum n_i w_i^2}{\sum n_i w_i}$$

Specific Surface Area (SSA) was calculated with the following Equation $$SSA = \frac{A}{V\rho_x} (m^2/g).$$

where:
Surface area: A (m$^2$);
Volume: V (m$^3$); and
Density of crystalline PTFE $\rho_x$ (g/m$^3$).
Specific Surface Area (based on $w_m$) was calculated with the following Equation:

$$SSA_{w_m} = \frac{4}{\rho_x w_m} (m^2/g).$$

Specific Surface Area (based on $\overline{w}_{AWFW}$) was calculated with the following Equation:

$$SSA_{\overline{w}_{AWFW}} = \frac{4}{\rho_x \overline{w}_{AWFW}} (m^2/g).$$

Areal Density (Mass per area) (g/m$^2$):
Areal Density (initial): MPA$_O$ and
Areal Density (final): MPA$_f$.
Number of layers (n).
Area Ratio (AR) was calculated by the following Equation:

$$AR = \frac{nMPA_O}{MPA_f}.$$

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale, but may be exaggerated to illustrate various aspects of the present disclosure, and in that regard, the drawing figures should not be construed as limiting.

In addition, the terms "adjacent" and "adjacent to" as used herein are meant to denote that when an element is "adjacent" to another element, the element may be directly adjacent to the other element or intervening elements may be present. As used herein, the singular forms "a", "an", and "the" include plural reference unless the context clearly dictates otherwise. The term "on" as used herein is meant to denote that when an element is "on" another element, it can be directly on the other element or intervening elements may also be present. It is to be appreciated that the terms "fine powder" and "powder" may be used interchangeably herein. Also, the terms "ePTFE membrane(s)" and "membrane(s)" may be used interchangeably herein. Further, in this application, the term "ePTFE membrane" is meant to include a single layer or multiple layers of ePTFE membrane(s). It is to be understood that the machine direction and the longitudinal direction are the same and may be interchangeably used herein. In addition, the terms "microporous ePTFE membrane" and "ePTFE membrane" may be used interchangeably herein.

In one aspect, the present invention is directed to thin, self-supporting biaxially oriented polytetrafluoroethylene (ePTFE) membranes that have a high crystallinity index, high intrinsic strength, low areal density (i.e., lightweight), and high optical transparency. In particular, the ePTFE membrane may have a crystallinity index of at least about 94% and a matrix tensile strength of at least about 600 MPa in both the longitudinal and transverse directions. The ePTFE membrane may also have an areal density less than about 100 mg/m$^2$ and a total luminous transmittance of at least 98%. In addition, the ePTFE membrane is transparent or invisible to the naked eye. Further, the ePTFE membrane is stackable, which may be used to control permeability, pore size, and/or bulk mechanical properties. The ePTFE membrane may be used to form composites, laminates, fibers, sheets, tubes, or other three-dimensional objects, which may or may not be subsequently diced or otherwise cut or sectioned into smaller portions. Additionally, the biaxially oriented ePTFE membranes may be used in filtration applications. In another aspect, the biaxially oriented ePTFE membrane may be further uniaxially expanded, which aligns the fibrils in one direction (hereafter a uniaxially oriented ePTFE membrane). Such an ePTFE membrane may have a tenacity greater then about 5 grams force per denier (gf/d) and a bulk denier less than about 750 grams per 9000 meters (g/9000 m).

With polytetrafluoroethylene (PTFE) polymers, the particle size, shape, and distribution thereof are important to obtain desired porous structures. These particle characteristics affect the packing density as well as connection density, thereby affecting the porous structures that can be produced from the particles. The PTFE resin is provided in a particulate form, for example, in the form of a fine powder. PTFE fine powders are formed of primary particles.

In forming the ePTFE membrane, the PTFE fine powder is first mixed with a lubricant, such as a light mineral oil. One particular example of a suitable lubricant is an isoparaffinic hydrocarbon, such as ISOPAR™ K (ExxonMobil Chemical, Spring, TX). Other suitable lubricants include aliphatic hydrocarbons, aromatic hydrocarbons, halogenated hydrocarbons, and the like, and are selected according to flammability, evaporation rate, and economic considerations. It is to be appreciated that the term "lubricant", as used herein, is meant to describe a processing aid that includes (or consists of) an incompressible fluid that is not a solvent for the polymer at the process conditions. The fluid-polymer surface interactions are such that it is possible to create a homogenous mixture. It is also to be noted that that choice of lubricant is not particularly limiting and the selection of lubricant is largely a matter of safety and convenience. The lubricant may be added to the PTFE powder in an amount from about 242 mL/kg to about 340 mL/kg.

In at least one embodiment, the PTFE fine powder and lubricant are mixed so as to uniformly or substantially uniformly distribute the lubricant with the PTFE powder. It is to be appreciated that various times and mixing methods may be used to distribute the PTFE powder in the lubricant. Once the lubricant and PTFE powder are sufficiently distributed, the lubricated powder is compressed into a cylindrical form (i.e., a pellet). The pellet may then be ram extruded (e.g., typically called paste extrusion or paste processing when lubricant is present) through an extruder die to produce a cohesive, flexible PTFE tape. As used herein, the term "cohesive" is meant to describe a tape that is sufficiently strong for further processing. The ram extrusion occurs below the melting temperature PTFE polymer (e.g., below 327° C.). The tape formed has an indeterminate length and a thickness less than about 1.0 mm, less than about 0.8 mm, less than about 0.5 mm, or less than about 0.4 mm. The cohesive, flexible tapes are referred hereafter simply as "tape".

In a subsequent step, the lubricant is removed from the tape. In instances where ISOPAR™ K is the lubricant, the tape may be heated to about 200° C. In other embodiments, the lubricant may be removed by washing the tape in hexane or other suitable solvent. If the lubricant is of sufficient volatility, the lubricant may be removed without a washing step, or it may be removed by heat and/or vacuum. It is to be appreciated, however, that any conventional drying method may be used.

The tape is then expanded in the longitudinal and transverse directions simultaneously (i.e., biaxially expanded). As used herein, the terms "biaxially expanded", "biaxial expansion", and "biaxially oriented" are meant to describe a polymer, membrane, preform, or article that is expanded in at least two orthogonal directions such that the fibrils are substantially oriented in-plane. In one embodiment, the tape is subsequently expanded only in the machine direction (i.e., uniaxially expanded). As used herein, the term "uniaxial", "uniaxially oriented" or "uniaxial expansion" is meant to describe a polymer, membrane, preform, or article that is expanded in only one direction (e.g., either the machine direction (MD) or the transverse direction (TD)). The expansion may be conducted with or without heat at strain rates up to about up to about 10,000%/second, up to about 5,000%/second, up to about 2,500%/second, up to about 1,000%/second, up to about 750%/second, up to about 500%/second, up to about 250%/second, up to about 150%/second, up to about 100%/second, up to about 75%/second, up to about 50%/second, up to about 40%/second, up to about 35%/second, up to about 30%/second, up to about 20%/second, up to about 10%/second, or up to about 5%/second. Additionally, the tape may be expanded (with or without heat) from about 1%/second to about 10,000%/second, from about 1%/second to about 5,000%/second from about 1%/second to 2,500%/second, from about 1%/second to about 1,000%/second, from about 1%/second to about 750%/second, from about 1%/second to about 500%/second, from about 1%/second to about 250%/second, from about 1%/second to about 150%/second, from about 1%/second to about 100%/second, from about 1%/second to about 75%/second, from about 1%/second to about 50%/second, from about 1%/second to about 40%/second, from about 1%/second to about 35%/second, from about 1%/second to about 30%/second, from about 1%/second to about 20%/second, from about 1%/second to about 10%/second, or from about 1%/second to about 5%/second. It is to be appreciated that an increase in intrinsic strength concurrently occurs upon expansion. The increase in intrinsic strength of the PTFE polymer is dependent upon the strength of the tape prior to expansion, the quality of the PTFE resin (e.g., particle size, molecular weight, distribution of particle size and/or molecular weight, degree of crystallinity, composition of polymer, and the like), the temperature at which expansion is performed, the rate of expansion, and/or the total amount of expansion.

The tape is biaxially and in some embodiments, additionally uniaxially expanded, to form an ePTFE membrane. The tape may be expanded at the same or different strain rates and at the same or different temperatures to achieve the microporous ePTFE membrane. As used herein, the term "microporous" is meant to define an article, such as a membrane, that has pores that are not visible to the naked eye. It has been discovered that the material properties of an ePTFE membrane produced in this manner exceed comparative properties of conventional membranes through an efficient and complete conversion of the PTFE primary particles (i.e., PTFE fine powder) into fibrils. Advantageously, the ePTFE membranes discussed herein retain the properties of conventional ePTFE membranes, such as, but not limited to, chemical inertness, thermal stability, low surface energy, low coefficient of friction, biocompatibility, and a wide range of use temperatures. The ePTFE membrane may optionally be heat treated at a temperature up to about 390° C. Uniaxially stretching the ePTFE membrane creates an ePTFE membrane with uniaxially-oriented fibrils, a high crystallinity index, and a high matrix tensile strength in the direction in which it was stretched (i.e., the machine direction (MD) or the transverse direction (TD)). Hereafter, the ePTFE membrane is described with respect to expansion in the machine direction, but it is to be appreciated that expanding in the transverse direction is considered to be within the purview of the invention.

The biaxially oriented ePTFE membrane is very thin, and may have a total membrane thickness less than about 2 mm, less than about 1.5 mm, less than about 1.0 mm, less than about 0.5 mm, less than about 0.3 mm, less than about 0.1 mm, less than 0.05 mm, less than 0.005 mm, less than 0.001 mm, less than about 500 nm, less than about 400 nm, less than about 300 nm, less than about 200 nm, less than about 100 nm, less than about 50 nm, less than about 25 nm, less than about 10 nm, less than about 5 nm, or less than about 1 nm. As used herein, the term "about" is meant to denote a range +/−10% of the number or amount being described. The biaxially oriented ePTFE membrane may be formed to have a total membrane thickness from about 1 nm to about 100 nm, from about 1 nm to about 90 nm, from about 1 nm to about 80 nm, from about 1 nm to about 70 nm, from about 1 nm to about 60 nm, from about from about 1 nm to about 50 nm, from about 1 nm to about 40 nm, from about 1 nm to about 30 nm, from about 1 nm to about 20 nm, or from about 1 nm to about 10 nm.

In at least one embodiment, the biaxially oriented ePTFE membrane has a thickness per layer less than about 100 nm, less than about 90 nm, less than about 80 nm, less than about 70 nm, less than about 60 nm, less than about 50 nm, or less than about 40 nm, less; than about 30 nm, less than about 20 nm, less than about 10 nm, less than about 5 nm, less than about 4 nm, less than about 3 nm, less than about 2 nm, less than about 1 nm. In some embodiments, the ePTFE membrane has a thickness per layer from about 1 nm to about 100 nm, from about 1 nm to about 90 nm, from about 1 nm to about 80 nm, from about 1 nm to about 70 nm, from about 1 nm to about 60 nm, from about 1 nm to about 50 nm, from about 1 nm to about 40 nm, from about 1 nm to about 30, from about 1 nm to about 20 nm, from about 1 nm to about 10 nm, from about 1 nm to about 5 nm, from about 1 nm to about 4 nm, from about 1 nm to about 3 nm, or from about 1 nm to about 2 nm. The biaxially oriented ePTFE membrane, unlike conventional ePTFE membranes, is so thin as to be invisible to the naked eye.

The "invisibility" of the biaxially oriented ePTFE membranes is also at least partially due to the fibril microstructure of the ePTFE membranes. Generally, the fibrils are substantially cylindrical in shape. The term "substantially cylindrical" as used herein is meant to denote that the fibrils in the biaxially oriented ePTFE membranes have an aspect ratio in cross section of about 1:1 to about 10:1. In addition, the fibrils in the biaxially oriented ePTFE membranes are thin, and have a median fibril width that is not greater than about 80 nm. In some embodiments, the median fibril width is less than about 70 nm, less than about 60 nm, less than about 50 nm, less than about 40 nm, less than about 30 nm, less than about 20 nm, or less than about 10 nm. In some embodiments, the median fibril width is from about 10 nm to about 80 nm, from about 10 nm to about 70 nm, from about 10 nm to about 60 nm, from about 10 nm to about 50 nm, from about 10 nm to about 40 nm, from about 10 nm to about 30 nm, or from about 10 nm to about 20 nm. In some embodiments, the median fibril width is from about 20 nm to about 70 nm, from about 30 nm to about 60 nm, from about 40 nm to about 50 nm. In other embodiments, the median fibril width is from about 30 nm to about 80 nm, from about 40 nm to about 80 nm, from about 50 nm to about 80 nm, from about 60 nm to about 80 nm, or from about 70 nm to about 80 nm. The intersection or overlap of two or more fibrils are called "crossover points" herein. In some embodiments, the thickness of a biaxially oriented ePTFE membrane may be the thickness of the crossover point of two fibrils.

In addition, the biaxially oriented ePTFE membranes are extremely light, having an areal density per layer less than about 100 mg/m$^2$ (0.1 g/m$^2$), less than about 90 mg/m$^2$ (0.09 g/m$^2$), less than about 80 mg/m$^2$ (0.08 g/m$^2$), less than about 70 mg/m$^2$ (0.07 g/m$^2$), less than about 60 mg/m$^2$ (0.06 g/m$^2$), less than about 50 mg/m$^2$ (0.05 g/m$^2$), less than about 40 mg/m$^2$ (0.04 g/m$^2$), less than about 30 mg/m$^2$ (0.03 g/m$^2$), less than about 20 mg/m$^2$ (0.02 g/m$^2$), less than about 15 mg/m$^2$ (0.015 g/m$^2$), less than about 10 mg/m$^2$ (0.01 g/m$^2$), less than about 5 mg/m$^2$ (0.005 g/m$^2$), less than about 4 mg/m$^2$ (0.004 g/m$^2$), less than about 3 mg/m$^2$ (0.003 g/m$^2$), less than about 2 mg/m$^2$ (0.002 g/m$^2$), less than 1.0 mg/m$^2$ (0.001 g/m$^2$), less than about 0.50 mg/m$^2$ (0.0005 g/m$^2$), less than about 0.40 mg/m$^2$ (0.0004 g/m$^2$), less than about 0.30 mg/m$^2$ (0.0003 g/m$^2$), less than about 0.20 mg/m$^2$ (0.0002 g/m$^2$), less than about 0.10 mg/m$^2$ (0.0001 g/m$^2$), less than about 0.05 mg/m$^2$ (0.00005 g/m$^2$) or less than about 0.003 mg/m$^2$ (0.000003 g/m$^2$). In some embodiments, the areal density per layer is about 0.003 mg/m$^2$ (0.000003 g/m$^2$) to about 100 mg/m$^2$ (0.1 g/m$^2$), from about 0.003 mg/m$^2$ (0.000003 g/m$^2$) to about 90 mg/m$^2$ (0.09 g/m$^2$), from about 0.003 mg/m$^2$ (0.000003 g/m$^2$) to about 80 mg/m$^2$ (0.08 g/m$^2$), from about 0.003 mg/m$^2$ (0.000003 g/m$^2$) to about 70 mg/m$^2$ (0.07 g/m$^2$), from about 0.003 mg/m$^2$ (0.000003 g/m$^2$) to about 60 mg/m$^2$ (0.06 g/m$^2$), from about 0.003 mg/m$^2$ (0.000003 g/m$^2$) to about 50 mg/m$^2$ (0.05 g/m$^2$), from about 0.003 mg/m$^2$ (0.000003 g/m$^2$) to about 40 mg/m$^2$ (0.04 g/m$^2$), from about 0.003 mg/m$^2$ (0.000003 g/m$^2$) to about 30 mg/m$^2$ (0.03 g/m$^2$), from about 0.003 mg/m$^2$ (0.000003 g/m$^2$) to about 20 mg/m$^2$ (0.02 g/m$^2$), from about 0.003 mg/m$^2$ (0.000003 g/m$^2$) to about 10 mg/m$^2$ (0.01 g/m$^2$), from about 0.003 mg/m$^2$ (0.000003 g/m$^2$) to about 1.0 mg/m$^2$ (0.001 g/m$^2$), from about 0.003 mg/m$^2$ (0.000003 g/m$^2$) to about 0.5 mg/m$^2$ (0.0005 g/m$^2$), from about 0.003 mg/m$^2$ (0.000003 g/m$^2$) to about 0.4 mg/m$^2$ (0.0004 g/m$^2$), from about 0.003 mg/m$^2$ (0.000003 g/m$^2$) to about 0.3 mg/m$^2$ (0.0003 g/m$^2$), from about 0.003 mg/m$^2$ (0.000003 g/m$^2$) to about 0.2 mg/m$^2$ (0.0002 g/m$^2$), from about 0.003 mg/m$^2$ (0.000003 g/m$^2$) to about 0.1 mg/m$^2$ (0.0001 g/m$^2$) or from about 0.003 mg/m$^2$ (0.000003 g/m$^2$) to about 0.05 mg/m$^2$ (0.00005 g/m$^2$). In some embodiments, the areal density per layer is from about 5 mg/m$^2$ (0.005 g/m$^2$) to about 100 mg/m$^2$ (0.1 g/m$^2$), from about 20 mg/m$^2$ (0.0002 g/m$^2$).

Further, the biaxially oriented ePTFE membrane has an area ratio from about 2:000:1 to 300,000,000:1. In some embodiments, the biaxially oriented ePTFE membrane has an area ratio from about 20,000:1 to about 300,000,000:1, from about 40,000:1 to about 300,000,000:1, from about 60,000:1 to about 300,000,000:1, from about 80,000:1 to about 300,000,000:1, from about 100,000:1 to about 300,000,000:1, from about 250,000:1 to about 300,000,000:1, from about 500,000:1 to about 300,000,000:1, from about 1,000,000:1 to about 300,000,000:1, or from about 2,500,000:1 to about 300,000,000:1.

Additionally, the biaxially oriented ePTFE membranes may have a total areal density less than about 100 g/m$^2$, less than about 10 g/m$^2$, less than about 5 g/m$^2$, less than about 1 g/m$^2$, less than about 0.5 g/m$^2$, less than about 0.1 g/m$^2$, less than about 50 mg/m$^2$ (0.05 g/m$^2$), less than about 10 mg/m$^2$ (0.01 g/m$^2$), less than about 5.0 mg/m$^2$ (0.005 g/m$^2$), less than about 4.0 mg/m$^2$ (0.004 g/m$^2$), less than about 3.0 mg/m$^2$ (0.003 g/m$^2$), less than about 2.0 mg/m$^2$ (0.002 g/m$^2$), less than about 1.0 mg/m$^2$ (0.001 g/m$^2$), less than about 0.50 mg/m$^2$ (0.0005 g/m$^2$), less than about 0.40 mg/m$^2$ (0.0004 g/m²), less than about 0.30 mg/m² (0.0003 g/m²), less than about 0.20 mg/m² (0.0002 g/m²) less than about 0.10 mg/m² (0.0001 g/m²), less than about 0.07 mg/m² (0.00007 g/m²), less than about 0.05 mg/m² (0.00005 g/m²), less than about 0.03 mg/m² (0.00003 g/m²), less than about 0.007 mg/m² (0.000007 g/m²), or less than about 0.003 mg/m² (0.000003 g/m²). In some embodiments, the biaxially oriented ePTFE membranes have a total areal density from about 0.003 mg/m² (0.000003 g/m²) to about 100 g/m², from about 0.003 mg/m² (0.000003 g/m²) to about 10 g/m², from about 0.003 mg/m² (0.000003 g/m²) to about 1.0 g/m², from about 0.003 mg/m² (0.000003 g/m²) to about 0.5 g/m², from about 0.003 mg/m² (0.000003 g/m²) to about 0.1 g/m², from about 0.003 mg/m² (0.000003 g/m²) to about 50 mg/m² (0.05 g/m²), from about 0.003 mg/m² (0.000003 g/m²) to about 10 mg/m² (0.01 g/m²), from about 0.003 mg/m² (0.000003 g/m²) to about 5 mg/m² (0.005 g/m²), from about 0.003 mg/m² (0.000003 g/m²) to about 4.0 mg/m² (0.004 g/m²), from about 0.003 mg/m² (0.000003 g/m²) to about 3.0 mg/m² (0.003 g/m²), from about 0.003 mg/m² (0.000003 g/m²) to about 2.0 mg/m² (0.002 g/m²), from about 0.003 mg/m² (0.000003 g/m²) to about 1.0 mg/m² (0.001 g/m²), from about 0.003 mg/m² (0.000003 g/m²) to about 0.50 mg/m² (0.0005 g/m²), from about 0.003 mg/m² (0.000003 g/m²) to about 0.40 mg/m² (0.0004 g/m²), from about 0.003 mg/m² (0.000003 g/m²) to about 0.30 mg/m² (0.0003 g/m²), from about 0.003 mg/m² (0.000003 g/m²) to about 0.20 mg/m² (0.0002 g/m²), from about 0.003 mg/m² (0.000003 g/m²) to about 0.10 mg/m² (0.0001 g/m²), from about 0.003 mg/m² (0.000003 g/m²) to about 0.07 mg/m² (0.00007 g/m²), from about 0.003 mg/m² (0.000003 g/m²) to about 0.05 mg/m² (0.00005 g/m²) or from about 0.10 mg/m² (0.010 g/m²) to about 10 g/m².

The uniaxially oriented ePTFE membranes are also extremely light, having an areal density per layer less than about 500 mg/m² (0.5 g/m²), less than about 400 mg/m² (0.4 g/m²), less than about 300 mg/m² (0.3 g/m²), less than about 200 mg/m² (0.2 g/m²), less than about 100 mg/m² (0.1 g/m²), less than about 70 mg/m² (0.07 g/m²), less than about 50 mg/m² (0.05 g/m²), less than about 30 mg/m² (0.03 g/m²), less than about 25 mg/m² (0.025 g/m²), less than about 20 mg/m² (0.02 g/m²), less than about 15 mg/m² (0.015 g/m²), less than about 10 mg/m² (0.01 g/m²), less than about 5 mg/m² (0.005 g/m²), less than about 4 mg/m² (0.004 g/m²), less than about 3 mg/m² (0.003 g/m²), less than about 2 mg/m² (0.002 g/m²), less than 1.0 mg/m² (0.001 g/m²), less than about 0.50 mg/m² (0.0005 g/m²), less than about 0.40 mg/m² (0.0004 g/m²), less than about 0.30 mg/m² (0.0003 g/m²), less than about 0.20 mg/m² (0.0002 g/m²), or less than about 0.10 mg/m² (0.0001 g/m²). In some embodiments, the areal density is from about 0.10 mg/m² (0.0001 g/m²) to about 500 mg/m² (0.5 g/m²), from about 0.10 mg/m² (0.0001 g/m²) to about 400 mg/m² (0.4 g/m²), from about 0.10 mg/m² (0.0001 g/m²) to about 300 mg/m² (0.3 g/m²), from about 0.10 mg/m² (0.0001 g/m²) to about 200 mg/m² (0.2 g/m²), from about 0.10 mg/m² (0.0001 g/m²) to about 100 mg/m² (0.1 g/m²), from about 0.10 mg/m² (0.0001 g/m²) to about 70 mg/m² (0.07 g/m²), from about 0.10 mg/m² (0.0001 g/m²) to about 50 mg/m² (0.05 g/m²), from about 0.10 mg/m² (0.0001 g/m²) to about 30 mg/m² (0.03 g/m²), from about 0.10 mg/m² (0.0001 g/m²) to about 20 mg/m² (0.02 g/m²), from about 0.10 mg/m² (0.0001 g/m²) to about 15 mg/m² (0.015 g/m²), from about 0.10 mg/m² (0.0001 g/m²) to about 10 mg/m² (0.01 g/m²), from about 0.10 mg/m² (0.0001 g/m²) to about 5 mg/m² (0.005 g/m²), from about 0.10 mg/m² (0.0001 g/m²) to about 0.40 mg/m² (0.0004 g/m²), from about 0.10 mg/m² (0.0001 g/m²) to about 0.30 mg/m² (0.0003 g/m²), or from about 0.10 mg/m² (0.0001 g/m²) to about 0.20 mg/m² (0.0002 g/m²).

Despite being thin and lightweight, the ePTFE membranes that are biaxially expanded possess high intrinsic strength properties. The ePTFE membranes have a matrix tensile strength (MTS) of at least about 600 MPa in both the longitudinal and transverse directions, at least about 650 MPa, at least about 700 MPa, at least about 750 MPa, at least about 800 MPa, at least about 850 MPa, at least about 900 MPa, or at least about 1000 MPa in both the longitudinal and transverse directions. In at least one embodiment, the biaxially oriented ePTFE membranes have a matrix tensile strength (MTS) from about 600 MPa to about 1000 MPa, from about 650 MPa to about 1000 MPa, from about 700 MPa to about 1000 MPa, from about 750 MPa to about 1000 MPa, from about 800 MPa to about 1000 MPa, from about 850 MPa to about 1000 MPa, or from about 900 MPa to about 1000 MPa in both the longitudinal and transverse directions.

Additionally, ePTFE membranes having been additionally uniaxially expanded have even higher intrinsic strength properties. In some embodiments the ePTFE membranes have a matrix tensile strength (MTS) greater than about 1000 MPa in the machine direction, greater than about 1100 MPa in the machine direction, greater than about 1200 MPa in the machine direction, greater than about 1200 MPa in the machine direction, greater than about 1300 MPa in the machine direction, or greater than about 1400 MPa in the machine direction. In some embodiments, the uniaxially oriented ePTFE membrane has a matrix tensile strength from about 1000 MPa to about 1400 MPa in the machine direction, from about 1100 MPa to about 1400 MPa in the machine direction, from about 1200 MPa to about 1400 MPa in the machine direction, from about 1200 MPa to about 1300 MPa in the machine direction, or from about 1300 MPa to about 1400 MPa in the transverse direction. It is to be appreciated that although the matrix tensile strength is given herein for the machine direction, it is equally applicable for ePTFE membranes expanded in the transverse direction.

In addition, uniaxially oriented ePTFE membrane has a matrix storage modulus of at least 100 GPa at ambient temperature (i.e., about 20° C.). In some embodiments, the uniaxially oriented ePTFE membrane has a matrix storage modulus at ambient temperature (i.e., about 20° C.) from about 100 GPa to about 111 GPa, from about 101 GPa to about 111 GPa, from about 102 GPa to about 111 GPa, from about 103 GPa to about GPa, from about 104 GPa to about 111 GPa, from about 105 GPa to about 111 GPa, from about 106 GPa to about 111 GPa, from about 107 GPa to about 111 GPa, from about 108 GPa to about 111 GPa, from about 109 GPa to about 111 GPa, or from about 110 GPa to about 111 GPa. The uniaxially oriented ePTFE membrane also has a bulk denier less than about 750 g/9000 m. In some embodiments, the uniaxially oriented ePTFE membrane has a bulk denier from about 0.5 g/9000 m to about 750 g/9000 m, from about 0.5 g/9000 m to about 650 g/9000 m, from about 0.5 g/9000 m to about 500 g/9000 m, from about 100 g/9000 m to about 450 g/9000 m, from about 0.5 g/9000 m to about 400 g/9000 m, from about 0.5 g/9000 m to about 350 g/9000 m, from about 0.5 g/9000 m to about 250 g/9000 m, from about 0.5 g/9000 m to about 200 g/9000 m, from about 0.5 g/9000 m to about 150 g/9000 m, from about 0.5 g/9000 m to about 100 g/9000 m, from about 0.5 g/9000 m to about 50 g/9000 m, from 0.5 g/9000 m to about 25 g/9000 m, from about 0.5 g/9000 m to about 15 g/9000 m, from about 0.5 g/9000 m to about to about 10 g/9000 m, from about 0.5 g/9000 m to about 5 g/9000 m, from about 0.5 g/9000 m to about 3 g/9000 m, or from about 0.5 g/9000 m to about 1 g/9000 m.

In addition, the uniaxially oriented ePTFE membranes have a tenacity of at least about 5 gf/d. In some embodiments, the uniaxially oriented ePTFE membranes have a tenacity from about 5 gf/d to about 8 gf/d from about 6 gf/d to about 8 gf/d, or from about 6 gf/d to about 7 gf/d. Further, the uniaxially oriented ePTFE membranes have a <P2> orientation greater than or equal to 0.985.

In addition, biaxially oriented ePTFE membranes have little air resistance. In some embodiments, the air resistance of the ePTFE membrane may be less than about 30,000 Pa·s/m, less than about 25,000 Pa·s/m, less than about 20,000 Pa·s/m, less than about 15,000 Pa·s/m, less than about 10,000 Pa·s/m, less than about 7,500 Pa·s/m, less than about 5000 Pa·s/m, less than about 2000 Pa·s/m, less than about 1500 Pa·s/m, less than about 1000 Pa·s/m, less than about 750 Pa·s/m, less than about 500 Pa·s/m, less than about 250 Pa·s/m, or less than about 150 Pa·s/m. In some embodiments, the air resistance is from about 100 Pa·s/m to about 2000 Pa·s/m, from about 100 Pa·s/m to about 1500 Pa·s/m, from about 100 Pa·s/m to about 1000 Pa·s/m, from about 100 Pa·s/m to about 750 Pa·s/m, from about 100 Pa·s/m to about 500 Pa·s/m, from about 100 Pa·s/m to about 250 Pa·s/m, or from about 250 Pa·s/m to about 500 Pa·s/m. The low air resistance in combination with the high surface area of the ePTFE membrane provides for a high performance filtration device.

The biaxially oriented ePTFE membranes are also highly optically transmissive, with a total luminous transmittance (measured from 380 nm to 780 nm) that is greater than or equal to about 90%, greater than or equal to about 95%, greater than or equal to about 98%, greater than or equal to about 99%. In exemplary embodiments, the biaxially oriented ePTFE membrane may have a total luminous transmittance from about 90% to about 99%, from about 95% to about 99%, or from about 98% to about 99%. In some embodiments, the ePTFE membrane has a total luminous transmittance of nearly 100%.

The fibrils of the ePTFE membrane (biaxially oriented and uniaxially oriented) may optionally be coated such that the ePTFE is porous or such that the ePTFE is non-porous with at least one coating composition, such as, but not limited to, a polymer or a biologic coating. A coating composition can be applied to the ePTFE membrane by any conventional coating method such as solvent coating, spray coating, spin coating, vapor deposition, atomic layer deposition (ALD), or dip coating. Additionally, a coating may be applied to the ePTFE membrane by applying compression with heat between sheets of a component, such as, but not limited to, fluorinated ethylene propylene (FEP), polyfluoroacrylate (PFA) and silicone.

In some embodiments, the coating composition occupies or fills at least a portion of the spaces through the thickness of the biaxially or uniaxially oriented ePTFE membrane. Suitable polymers and/or biologic coatings that may be coated and/or imbibed on or into the ePTFE membrane include, but are not limited to, polyesters; polystyrene; polyamides; polyphthalamides; polyamide-imides; polycarbonates; polyethersulphones; polysulfones; polyphenylenesulfides; liquid crystalline polymers; polyetherketones; polyetheretherketones; polysiloxanes; epoxies; polyurethanes; polyimides; polyetherim ides; polyacrylates; polyparaxylylene; terpolymers of tetrafluoroethylene (TFE), VDF (vinylidenefluoride), and HFP (hexafluoropropylene); copolymers of tetrafluoroethylene (TFE) and perfluoroalkylvinylethers (PAVEs); a copolymer of tetrafluoroethylene and perfluoro-2,2-dimethyl-1,3-dioxole; perfluoroalkylvinylethers; perfluoroalkylethers; polyvinylidenefluoride (PVDF); ethylene tetrafluoroethylene (ETFE); polychlorotrifluoroethylene (PCTFE); fluorinated ethylene propylene (FEP); perfluoroalkoxyalkanes (PFA), polyvinyl alcohol (PVA), CBAnHeparin coating (commercially available from W.L. Gore & Associates, Inc.), antimicrobial agents, antibodies, pharmaceuticals, biologic entities, vascularization stimulators, and any combination thereof. The amount of coating applied will be dependent upon the desired application.

The biaxially or uniaxially oriented ePTFE membranes are self-supporting, and in some embodiments the ePTFE membrane is used to reinforce a polymer film such as porous polymers, non-porous polymers, fluoropolymers, polyolefins, films, tapes, and other membranes. By "self supporting" is it meant that the ePTFE membrane does not require a backing or carrier layer. However, because the ePTFE membrane is so thin, the edges of the ePTFE membrane are often restrained at macroscale lengths. In other words, the ePTFE membrane is restrained around the perimeter of the membrane (e.g., "picture framed") to maintain the integrity of the ePTFE membrane. The intrinsic strength of the membrane is connected across distances and holds itself together without a backing or supporting layer behind or under the membrane.

The biaxially oriented and uniaxially oriented ePTFE membranes may be formed as a single layer of ePTFE membrane. In other embodiments, the biaxially and uniaxially oriented ePTFE membranes may have tens, hundreds, or thousands of layers of ePTFE membrane present in the ePTFE membrane. In some embodiments, 2 layers to 4 layers may be present. In other embodiments, 2 layers to 16 layers may be present in the ePTFE membrane. In further embodiments, 2 layers to 500 layers, 2 layers to 1,000 layers, 2 layers to 5,000 layers, 2 layers to 10,000 layers, 2 layers to 25,000 layers, 2 layers to 50,000 layers, 2 to 100,000 layers, 2 to 500,000 layers, 2 to 1,000,000 layers (or more) may be present in the ePTFE membrane. Although not wishing to be bound by theory, it is believed that the only limiting factor for the number of ePTFE layers present in the ePTFE membrane is the time spent to stack the layers and expand. Typically, the ePTFE membrane stack "grows" four-fold each time the ePTFE membrane is biaxially expanded. It is to be appreciated that no adhesive or other bonding agent is typically used to connect the individual ePTFE membranes in the stacked ePTFE membranes, although the inclusion of an adhesive or other bonding material is not precluded from use herein and is considered to be within the purview of the invention.

In another embodiment, the ePTFE membrane (both biaxially oriented and uniaxially oriented) may include ePTFE membranes having the same mechanical properties, ePTFE membranes having differing mechanical properties, and/or a spacing layer (e.g. a different polymeric layer such as, a porous polymer, a non-porous polymer, a fluoropolymer, a porous polyolefin, or a non-porous polyolefin. In other words, the ePTFE membrane may be engineered to include different polymeric and/or non-polymeric layer(s) in the ePTFE membrane. Additionally, one ePTFE membrane layer may differ from another ePTFE layer by the amount of expansion and/or strain rate, and/or total work it has been through. By varying the membrane type, expansion, mechanical properties of any additional layers within a ePTFE membrane, the ePTFE membrane may be formed to meet specific bulk properties while maintaining transport, filtration, or separation requirements.

Through the formation of the ePTFE membranes (biaxially and uniaxially oriented) and/or the optional additional spacing layers within the ePTFE membrane, the permeability, the pore size, and bulk mechanical properties may be controlled. As used herein, the term "permeability" means the ability to transmit fluids (i.e., liquid or gas) through the pores of a membrane or filter material when the material is subjected to a differential pressure across it. In one instance, the ePTFE membranes allow for a range of pore sizes, such as, for example, pore sizes less than about 6 microns in diameter. As used herein, the term "pore size" means the size of the pores in ePTFE membrane. The pore size may range from about 2 nm to about 6 microns. Additionally, the ePTFE may have a specific surface area (SSA) as measured by area weighted fibril width (AWFW) from about 35 $m^2/g$ to about 120 $m^2/g$, from about 45 $m^2/g$ to about 120 $m^2/g$, from about 55 $m^2/g$ to about 120 $m^2/g$, from about 65 $m^2/g$ to about 120 $m^2/g$, from about 75 $m^2/g$ to about 120 $m^2/g$, from about 80 $m^2/g$ to about 120 $m^2/g$, from about 90 $m^2/g$ to about 120 $m^2/g$, from about 100 $m^2/g$ to about 120 $m^2/g$, or from about 110 $m^2/g$ to about 120 $m^2/g$.

In some embodiments, the biaxially oriented ePTFE membranes may be used in air filtration applications. In such applications, the ePTFE membrane demonstrates a quality factor at a face velocity of 5.33 cm with a 0.1 micron diameter challenge particle of at least 65 ($kPa^{-1}$). It is to be appreciated that the strength to weight ratio (intrinsic strength) of the ePTFE membrane is higher than that of conventional ePTFE membranes. Higher quality factor values are associated with better filtration performance. In certain embodiments, the biaxially oriented ePTFE membrane may have a quality factor from about 65 ($kPa^{-1}$) to about 180 ($kPa^{-1}$), from about 70 ($kPa^{-1}$) to about 180 ($kPa^{-1}$), from about 80 ($kPa^{-1}$) to about 180 ($kPa^{-1}$), from about 90 ($kPa^{-1}$) to about 180 ($kPa^{-1}$), from about 100 ($kPa^{-1}$) to about 180 ($kPa^{-1}$), from about 110 ($kPa^{-1}$) to about 180 ($kPa^{-1}$), from about 120 ($kPa^{-1}$) to about 180 ($kPa^{-1}$), from about 130 ($kPa^{-1}$) to about 180 ($kPa^{-1}$), from about 140 ($kPa^{-1}$) to about 180 ($kPa^{-1}$), from about 150 ($kPa^{-1}$) to about 180 ($kPa^{-1}$), from about 160 ($kPa^{-1}$) to about 180 ($kPa^{-1}$), or from about 170 ($kPa^{-1}$) to about 180 ($kPa^{-1}$).

The biaxially oriented ePTFE membranes may be used in applications where it is desirable to filter nanoparticles (e.g., from about 1 nm to about 200 nm) from a liquid media, even when the liquid media is traveling at high flow rate. Thus, the ePTFE membrane may be used as a filtration material, and by the nature of polytetrafluoroethylene, is resistant to chemical attack, is biocompatible, and demonstrates a high matrix tensile strength (MTS). The filterable matrix may be selected from a solution, a suspension, a colloid, a biological fluid, a component of a biological fluid, an aqueous material, or a non-aqueous material. To filter a filterable matrix, the matrix is passed through the ePTFE membrane and the resulting filtrate is collected. In one embodiment, the biaxially oriented ePTFE membrane includes a nanoparticle retention percent (%) equal to or greater than the line defined by Equation (1):

$$y >= 9.70 - 10.76 * \ln(x) \qquad \text{Equation (1)}$$

where
y=Nanoparticle Retention %, and
x=Filtrate Permeability [$g/cm^2/s/MPa$].

Test Methods
Non-Contact Thickness Measurements
The non-contact thickness of the membranes was measured using a KEYENCE LS-7600 laser system (commercially available from KEYENCE America).
Membrane Density Calculation
Samples were cut to form square sections 15.2 cm by 15.2 cm. Each sample was weighed using a MettlerToledo AT20 balance. Using the thickness calculated by the KEYENCE laser, the densities of the samples were calculated using Equation (2).

$$\rho = m/(w * l * t) \qquad \text{Equation (2)}$$

where:
$\rho$=density (g/$cm^3$);
m=mass (g);
w=width (cm);
l=length (cm); and
t=thickness (cm).
Matrix Tensile Strength (MTS) (Method 1)
To determine the MTS of biaxial ePTFE membranes, a sample ePTFE membrane was cut in the longitudinal and transverse directions using an ASTM D412-Dogbone Die Type F (D412F). To determine MTS of uniaxial membranes, a sample ePTFE membrane was loaded in the longitudinal direction. Tensile break load was measured using an INSTRON® 5567 (Illinois Tool Works Inc., Norwood, MA) tensile test machine equipped with flat-faced grips and a "22 lb" (~100 N) load cell. The gauge length for the grips was set to 8.26 cm and the strain rate was 0.847 cm/s. After placing the sample in the grips, the sample was retracted 1.27 cm to obtain a baseline followed by a tensile test at the aforementioned rate. The peak force measurement was used for the MTS calculation. The longitudinal and transverse MTS were calculated using Equation (3):

$$\text{MTS} = (\text{maximum load/cross sectional area}) \times (\text{density of resin/density of the membrane}). \qquad \text{Equation (3)}$$

Matrix Tensile Strength (MTS) (Method 2)
To determine the MTS of uniaxial ePTFE membranes, a sample ePTFE was loaded in the longitudinal direction using cord and yarn grips. Tensile break load was measured using an INSTRON® 5567 (Illinois Tool Works Inc., Norwood, MA) tensile test machine equipped with cord and yard grips and a "22 lb" (~100 N) load cell. The gauge length for the grips was set to 15.24 cm and the strain rate was 0.254 cm/s. After placing the sample in the grips, the sample was retracted 1.27 cm to obtain a baseline followed by a tensile test at the aforementioned rate. The peak force measurement was used for the MTS calculation.
Scanning Transmission Electron Microscope (STEM)
Low voltage STEM (scanning transmission electron microscopy) is a technique used to visualize thin samples by accelerating a focused beam of electrons through the sample and collecting the transmitted electrons with a suitable detector. Low voltage refers to the use of a beam accelerating voltage of less than 100 kV (<30 kV as exemplified herein). The image contrast is due to differences in the electron absorption by the membrane due to either composition or thickness.

A scanning electron microscope (Hitachi, SU8000; Hitachi Ltd, Tokyo, Japan) with a transmission adapter (STEM) was used and operated at an accelerating voltage no higher than 30 kV. No prior or additional treatment (staining) was applied to the samples. The samples for the analysis of the thin porous films were prepared on a copper grid (PELCO® Center-Marked Grids, 400 mesh, Copper, Product #1GC400, Ted Pella Inc., Redding, CA) with a carbon support layer (Carbon Type-B, 300 mesh, Copper, Product #01813, Ted Pella, Inc.).

X-Ray Diffractograms for Biaxial Samples

Two dimensional (2-d) x-ray diffractograms were obtained using the X27C beam line of the National Synchrotron Light Source at Brookhaven National Laboratory (Upton, NY). The beamline provided a well collimated, monochromatic x-ray beam with a wavelength of 0.1371 nm, a nominal flux of $10^{12}$ photons/s, and a diameter of 0.39 mm. The detector was a Rayonix MAR-CCD 2-d Image System (Rayonix LLC, Evanston, IL). The system was set with a sample-detector distance of 67.97 mm and calibrated using a $Al_2O_3$ powder standard. The samples were mounted between the beam and detector and the transmission geometry scattered/diffracted x-ray image collected for between 480 and 540 seconds. In addition, a background image without the sample present was recorded for the same time period immediately after each sample was imaged. The background image was then subtracted from the sample image to remove the effect of air scattering and create the desired diffractogram.

X-Ray Scattering Methodology for Uniaxial Samples

The wide-angle x-ray scattering experiments were carried out on a Xenocs brand Xeuss 2.0 SAXS/WAXS Laboratory Beam line system (Xenocs SAS, Sassenage, France). The instrument uses a GeniX3D Cu $k_\alpha$ source (0.154 nm wavelength) operating at 50 kV and 0.6 mA, and a Dectris brand Pilatus 300K detector (Dectris Ltd., Baden-Daettwil, Switzerland). The beam was collimated with 2 in-line slits, each open to an area of 0.5 mm×0.5 mm. The sample-detector distance was 71.0 mm (calibrated by lanthanum hexaboride standard). The "Virtual Detector" feature of the Xeuss 2.0 system was used to erase blind spots in the detector as well as to extend its angular range. This is achieved by translating the detector in the horizontal direction, then averaging multiple scans. Here, 4 scans were taken at varying horizontal detector offsets, each with exposure times of 15 minutes. Averaging these four scans provided a scattering profile. The orientation was quantified from the I vs. φ Azimuthal scans utilizing Equation (4).

$$\langle \cos^2(\varphi) \rangle = \frac{\int_0^{\pi/2} I(\varphi)\cos^2(\varphi)\sin(\varphi)d\varphi}{\int_0^{\pi/2} I(\varphi)\sin(\varphi)d\varphi} \quad \text{Equation (4)}$$

As <P2> approaches 1, nearly perfect orientation in the machine direction is achieved as determined by Equation (5).

$$\langle P2 \rangle = \frac{3\langle\cos^2(\varphi)\rangle - 1}{2} \quad \text{Equation (5)}$$

Crystallinity Index

The crystallinity index was obtained by peak fitting of Intensity vs. q scans using JMP® 14.1.0 statistical analysis software (SAS institute). The range of integration was limited to q=8.74 to 15.4 ($nm^{-1}$), and a linear background was defined such that it coincided with the measured intensity from about q=8.74 to 10 ($nm^{-1}$) and q=14.1 to 15.4 ($nm^{-1}$). The Pearson VII function was used to fit both peaks after the linear background was subtracted.

As defined in U.S. Patent Publication No. 2004/0173978 to Bowen, et al., the crystallinity index was calculated from the area under the fitted 100 crystalline peak ($A_{100}$) and the area under the fitted amorphous peak (Aamorphous) according to Equation (6).

$$\text{Crystallinity Index}(\%) = \{A_{100}/(A_{100}+A_{amorphous})\} \times 100 \quad \text{Equation (6)}$$

Bubble Point

The bubble point was measured according to the general teachings of ASTM F31 6-03 using a Capillary Flow Porometer (Model CFP 1500 AE from Porous Materials, Inc., Ithaca, NY). The sample membrane was placed into a sample chamber and wet with SilWick Silicone Fluid (commercially available from Porous Materials, Inc.) having a surface tension of 19.1 dynes/cm. The bottom clamp of the sample chamber consists of a 40 micron porous metal disc insert (Mott Metallurgical, Fannington, Conn.) with the following dimensions (2.54 cm diameter, 3.175 mm thickness). The top clamp of the sample chamber consists of an opening, 12.7 mm in diameter. Using the Capwin software version 6.74.70, the following parameters and set points were used:

| Parameter | Set Point |
| --- | --- |
| Maxflow | 200000 (cc/m) |
| Bubflow | 10-127 (cc/m) |
| F/PT | 50 |
| Minbppres | 0.1 (psi) |
| Zerotime | 1 (sec) |
| V2incr | 10 (cts) |
| Preginc | 1 (cts) |
| Pulse Delay | 2 (sec) |
| Maxpress | 500 (psi) |
| Pulse Width | 0.2 (sec) |
| Mineqtime | 30 (sec) |
| Presslew | 10 (cts) |
| Flowslew | 50 (cts) |
| Eqiter (0.1 sec) | 3 |
| Aveiter (0.1 sec) | 20 |
| Maxpdif | 0.1 (psi) |
| Maxfdif | 50 (cc/m) |
| Startp | 1 (psi). |

The values presented for bubble point were the average of two measurements.

ATEQ Airflow

The ATEQ airflow test measures laminar volumetric flow rates of air through membrane samples. Each membrane sample was clamped between two plates in a manner that seals an area of 2.99 $cm^2$ across the flow pathway. An ATEQ® (ATEQ Corp., Livonia, Mich.) Premier D Compact Flow Tester was used to measure airflow rate (L/hr) through each membrane sample by challenging it with a differential air pressure of 1.2 kPa (12 mbar) through the membrane.

Airflow Resistance

A Textest FX 3300 Air Permeability Tester device manufactured by Textest AG (Zurich, Switzerland) was used to test airflow resistance. The Frazier permeability reading is the rate of flow of air in cubic feet per square foot of sample area per minute at a differential pressure drop across the test sample of 12.7 mm water column. Where noted the pressure drop was reduced for the characterization of lightweight unsupported membranes. Air permeability was measured by clamping a test sample into a circular, flanged fixture which provided a circular opening of 7 cm diameter (38.5 $cm^2$ area). The upstream side of the sample fixture was connected to a flow meter in line with a source of dry compressed air.

Optical Transmittance Measurements

Optical transmittance measurements were carried out using a spectrophotometer (Jasco V-670; JASCO Deutschland GmbH, Pfungstadt, Germany) with double-beam integrating sphere attachment (150 mm diameter, ILN-725). The spectrophotometer is comprised of a deuterium and tungsten-halogen lamps, a single Czerny-Turner type monochromator (1200 line/mm diffraction grating) and a photomultiplier tube (PMT) detector. The light from the monochromator is split into a sample and reference beam before entering the integrating sphere. The integrating sphere is configured for unidirectional illumination and diffuse detection. The sample beam illuminates, at normal incidence, a 20 mm×20 mm sample mounted on the integrated sphere entrance port; while the reference beam passes through an open port on the integrating sphere. The sample and reference beams are alternately incident upon the PMT detector and converted to a digital signal after being subjected to synchronous rectification.

The monochromator bandwidth was set to 10 nm and the grating wavelength was scanned from 250 nm to 800 nm at a scan rate of 2000 nm/min. The source was changed from the deuterium to the tungsten-halogen lamp at 340 nm. The signal was recorded at intervals of 2 nm. A 'dark correction' spectrum (blocking the sample beam) and a 'baseline correction' spectrum (sample beam passes through an open port) was collected: these spectra were used to report the transmittance spectrum expressed as a percentage of the incident light.

The total luminous transmittance was calculated by weighting the transmittance spectrum by a CIE Standard Illuminant and CIE Standard Colorimetric Observer (see ASTM D1003-13: Standard Test Method for Haze and Luminous Transmittance of Transparent Plastics.) The D65 illuminant and the 1931 2-deg standard observer were used in the calculation presented here. The % Transmittance in the UVA and UVB ranges were calculated by computing the average % Transmittance for the 315-400 nm and 280-315 nm wavelength ranges, respectively.

Average Fibril Width Determination

Figure 11:
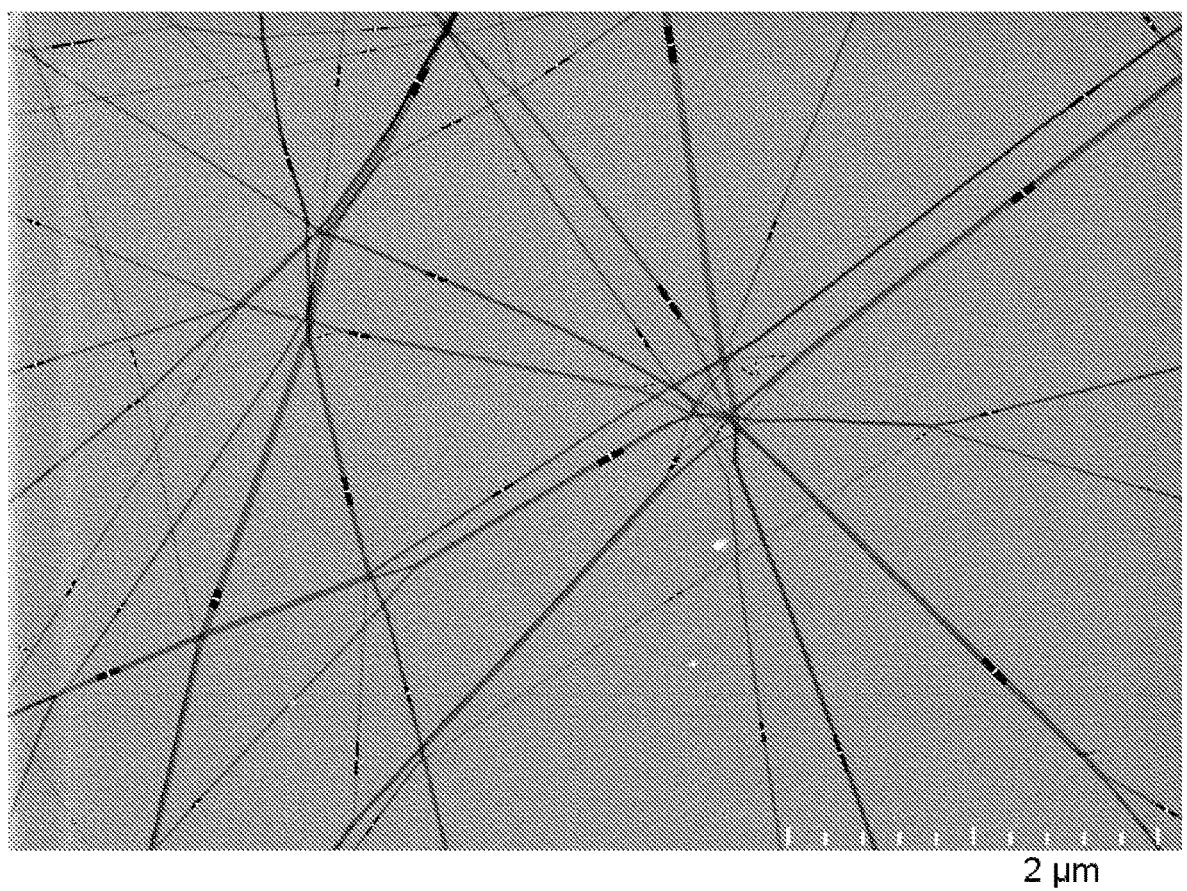
FIG. 11 is a STEM image of Sample E1H (taken at 20,000×magnification with a full horizontal field width of approximately 6 microns) from Example 5 where manual image analysis was used to measure fibril width in accordance with embodiments described herein.

Selected samples were imaged by STEM and characterized manually by 50 measurements of the projected width of the fibrils (e.g., FIG. 11). Uniform sampling was facilitated by using a random number generator to highlight 50 regions, then the operator would trace the outline of the nearest fibril—preferably a fragment of a fibril which has not already been characterized. In general, the marked fibril was rectangular in shape, with an aspect ratio greater than 1. The nominal projected width of the fibril was calculated from the ratio of the area divided by the length of the object. This is thought to be more representative and informative than a single width measurement as it naturally forces the projected width measurement to be perpendicular to the major axis of the rectangular shape. To confirm the method, lines were drawn through the centroid of the manually identified region, orthogonal to the major axis at the calculated width as calculated according to Equation (7).

$$\overline{w}_{AWFW} = \frac{\sum n_i w_i^2}{\sum n_i w_i}. \qquad \text{Equation (7)}$$

Dynamic Mechanical Analyzer (DMA) Matrix Storage Moduli and Loss Moduli

Measurement of the matrix storage and loss moduli was carried out using a TA Instruments Q800 system (TA Instruments, New Castle, Del.) outfitted with tension sample clamps. The DMA was calibrated according to standard TA Instruments procedures. Samples dimensions were obtained using a 10× microscope with a 0.1 mm graduated reticule for width and a KEYENCE LS7010 high accuracy non-contact micrometer (Keyence Corp., Itasca, Ill.) for thickness. The sample mass was measured using a Mettler-Toledo A120 micro-balance (Mettler-Toledo, LLC, Columbus, Ohio). The sample was then mounted in the instrument and a 5 mN pre-load applied. The sample length was obtained from the calibrated DMA clamp position at 25° C. A sinusoidal strain with a true strain amplitude of 0.001 and frequency of 1 Hz was applied with an additional constant load just sufficient to maintain the sample in tension throughout the imposed sinusoidal strain. The sample was equilibrated at −50° C. for 10 minutes and then the temperature was ramped at 2° C./min to 150° C. The magnitude and phase angle of the resulting sinusoidal force acting on the sample was measured once a second throughout the heating ramp and used to calculate the storage and loss moduli. The desired matrix moduli were obtained by multiplying the storage and loss moduli by the ratio $\rho_{true}/\rho_{sample}$. $\rho_{true}$ was assumed to be that of crystalline poly(tetrafluoroethylene), 2.3 g/cm$^3$, while $\rho_{sample}$ was calculated from the measured sample dimensions and mass.

Air Filtration Performance Measurement

Particle Filtration Efficiency Membrane filtration efficiency testing was performed using dioctyl phthalate (DOP) aerosol on a TSI CERTITEST® Model 8160 Automated Filter Tester (TSI Incorporated, St. Paul, Minn.), according to the procedure specified in the CERTITEST® Model 8160 Automated Filter Tester Operation and Service Manual. The sample test area was 77.8 cm and face velocity was 5.32 cm/sec.

The Quality Factor $Q_f$ was determined using Equation (8):

$$Q_f = Ln(1/P)/\Delta p \qquad \text{Equation (8)}$$

The penetration, P, is the fraction of particles penetrating or passing through the sample and $\Delta p$ is the pressure drop in kPa at an air velocity of 5.33 cm/s. Higher quality factor values are associated with better filtration performance (see William C. Hinds, Aerosol Technology: Properties, Behavior, and Measurement of Airborne Particles, Second Ed., John Wiley & Sons; Hoboken, N.J. (1994)). Comparisons of the quality factor are made using the same face velocity and test aerosol particle size. Quality factor is defined in units of reciprocal pressure (kPa$^{-1}$). The efficiency, E (%)=100*(1−P).

Determination of Liquid Permeability and Retention with Bead Tests

The bead test measures permeability and bead retention of the membrane sample. The membrane sample was restrained in a 25 mm filter holder. The membrane was first wetted with an isopropyl alcohol (IPA)-DI water solution (70:30 v/v IPA:water). Air pressure was used to force this solution through the membrane. 7 grams of solution was flowed through the sample, followed by 10 grams of aqueous solution made of 1% by volume of the non-ionic surfactant TRITON™ X-100 (CAS 9002-93-1; Sigma Aldrich, St. Louis, Mo.) in DI water. The membrane was then challenged with a solution of 0.025 pm diameter polystyrene latex beads (Fluoro-Max R25 red fluorescent polymer microspheres; Thermo Fisher Scientific, Waltham, Mass.) dispersed in an aqueous solution made of 1% by volume of TRITON™ X-100 in DI water, such that the membrane was challenged with a quantity of beads sufficient to cover the membrane surface area with a single monolayer of beads. The concentration of the beads in the challenge solution and filtrate was determined using an Agilent Technologies Cary Eclipse Fluorescence Spectrophotometer (Agilent Technologies, Santa Clara, Calif.).

The permeability of the membrane was calculated using Equation (9):

$$k = \frac{g}{AtP} \quad \text{Equation (9)}$$

In Equation (9), k is the permeability of the membrane, g is the mass of an aliquot of filtrate, A is the physical area of the membrane sample in the filter holder, t is the time require to collect the aliquot of filtrate, and P is the pressure differential across the membrane. In Equation (9), g/t is the mass flow rate through the membrane and g/At is the mass flux through the membrane.

The percent of beads in the solution that were retained by the membrane was calculated using Equation (10):

$$\% \text{ Retention} = 100 \frac{C_{challenge} - C_{filtrate}}{C_{challenge}} \quad \text{Equation (10)}$$

In Equation (10), $C_{challenge}$ is the concentration of beads in the challenge solution and $C_{filtrate}$ is the concentration of beads in the filtrate.

EXAMPLES

Unless defined otherwise herein, all technical and scientific terms used herein have the same meaning as commonly understood by one of ordinary skill in the art to which this invention belongs. The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Example 1

The following example discloses the production of a single layer PTFE membrane having very low areal density (e.g., areal densities of less than 10 mg/m²).

Polytetrafluorethylene (PTFE) fine powder (E.I. DuPont de Nemours; Wilmington, DE) was blended with ISOPAR™ K isoparaffinic hydrocarbon lubricant (ExxonMobil Chemical; Spring, Tex.) at a target ratio of 110 mL per pound (~0.454 kg) of fine powder (0.156 g lube/g total) (grams lube/mass total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. to form dried tape (the "initial tape"). A 98 mm square was cut from the initial tape. The initial tape areal density (prior to pantograph expansion) was determined to be 1130 grams per square meter (g/m²). As used herein, all initial tape areal densities are meant to denote 1150+/−100 g/m². A summary of the process parameters used in Example 1 is provided in Table 1.

First Pass

Using a pantograph machine, the 98 mm square of dried tape was heated in an oven set to 300° C. for a target of 120 seconds and then expanded in the longitudinal direction (machine direction (MD)) and transverse direction (TD) simultaneously (biaxial expansion) at a target ratio of about 4:1 in each direction while maintaining a temperature of about 300° C. The average engineering strain rate target was set to 36%/second. The pantograph opened at a constant velocity target for approximately 8 seconds. The ePTFE membrane was allowed to cool to room temperature (~22° C.) under restraint of the pantograph.

Second Pass

A piece of the cooled ePTFE membrane from the first pass was harvested for further expansion, i.e. a "second pass." Using the same pantograph machine, the selected membrane was heated in an oven set to 300° C. for a target of 120 seconds and then expanded in the longitudinal direction and transverse direction simultaneously at a target ratio of 10:1 in each direction while maintaining a temperature of about 300° C. The average engineering strain rate target was set to 9%/second. The pantograph opened at a constant velocity target for approximately 100 seconds. The second pass ePTFE membrane was allowed to cool to room temperature (~22° C.) under restraint of the pantograph. Third Pass A piece of the cooled ePTFE membrane from the second pass was selected for further expansion, i.e. a "third pass." Using the same pantograph machine, the selected membrane was again heated in an oven set to 300° C. for 120 seconds and then expanded in the longitudinal direction and transverse direction simultaneously at a target ratio of 10:1 in each direction while maintaining a temperature of about 300° C. The average strain rate target was set to 1%/second. The pantograph opened at a constant acceleration rate set point for approximately 230 seconds.

The ePTFE membrane was allowed to cool to room temperature (~22° C.) under restraint of the pantograph. A summary of Example 1 process parameters is provided in Table 1.

Figure 2:
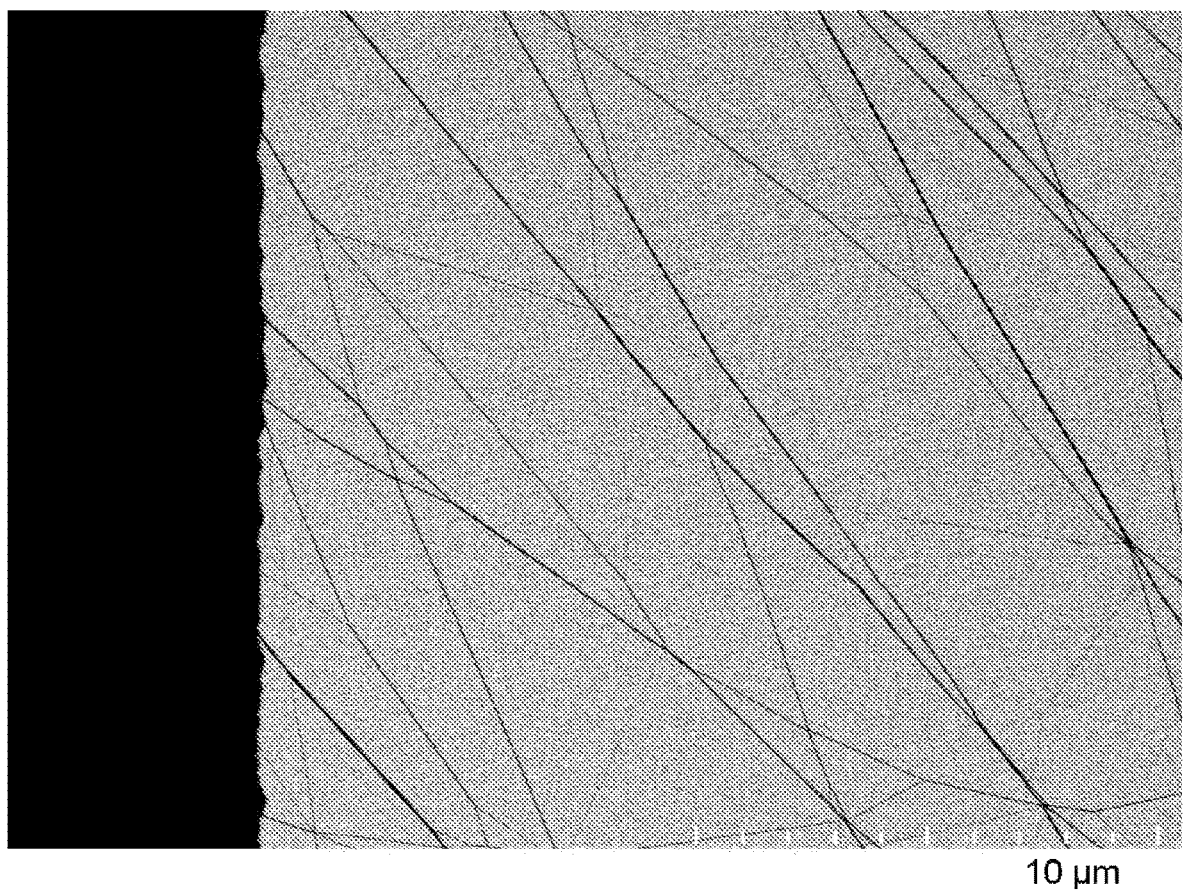
FIG. 2 is a STEM image of Sample E1G from Example 1 taken at 5,000× magnification with a full horizontal field width of approximately 25 microns in accordance with embodiments described herein.
Figure 3:
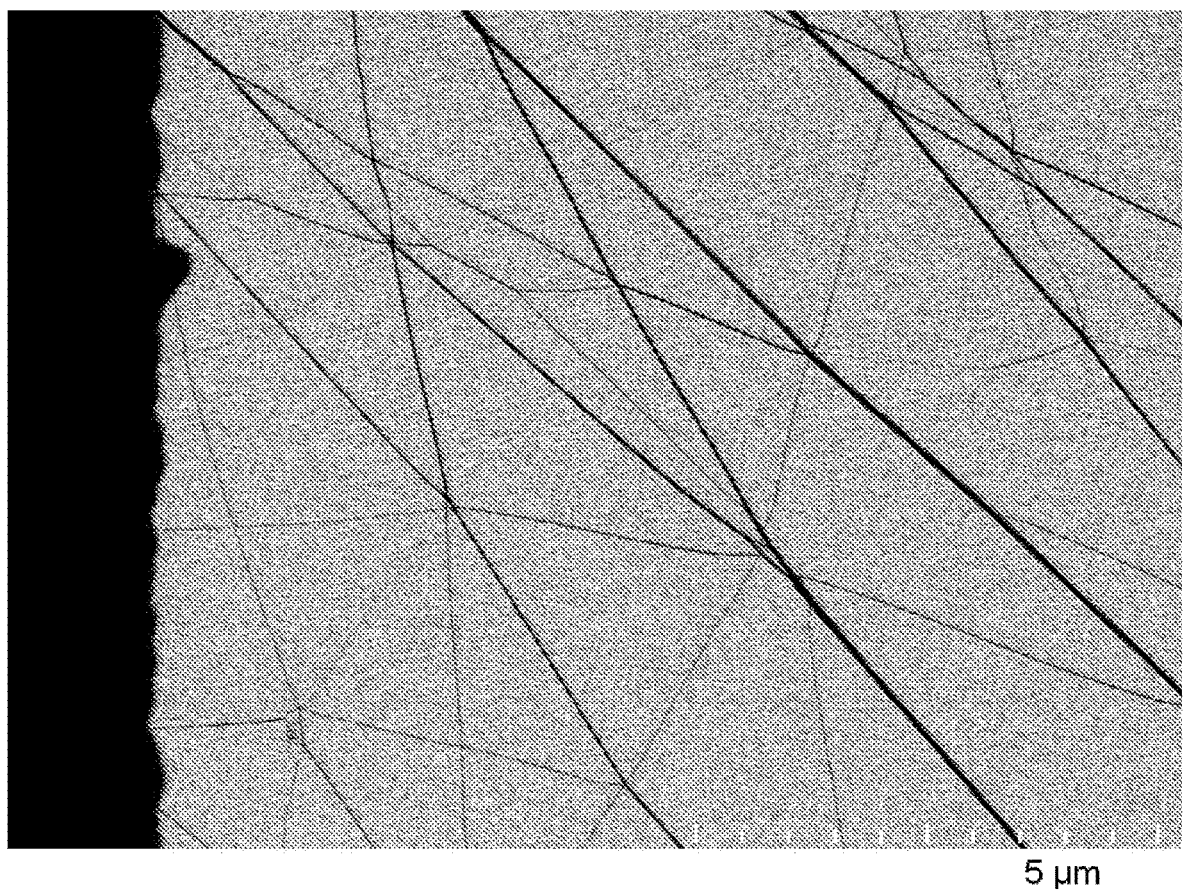
FIG. 3 is a STEM image of Sample E1G from Example 1 taken at 10,000× magnification with a full horizontal field width of approximately 12 microns in accordance with embodiments described herein.
Figure 4:
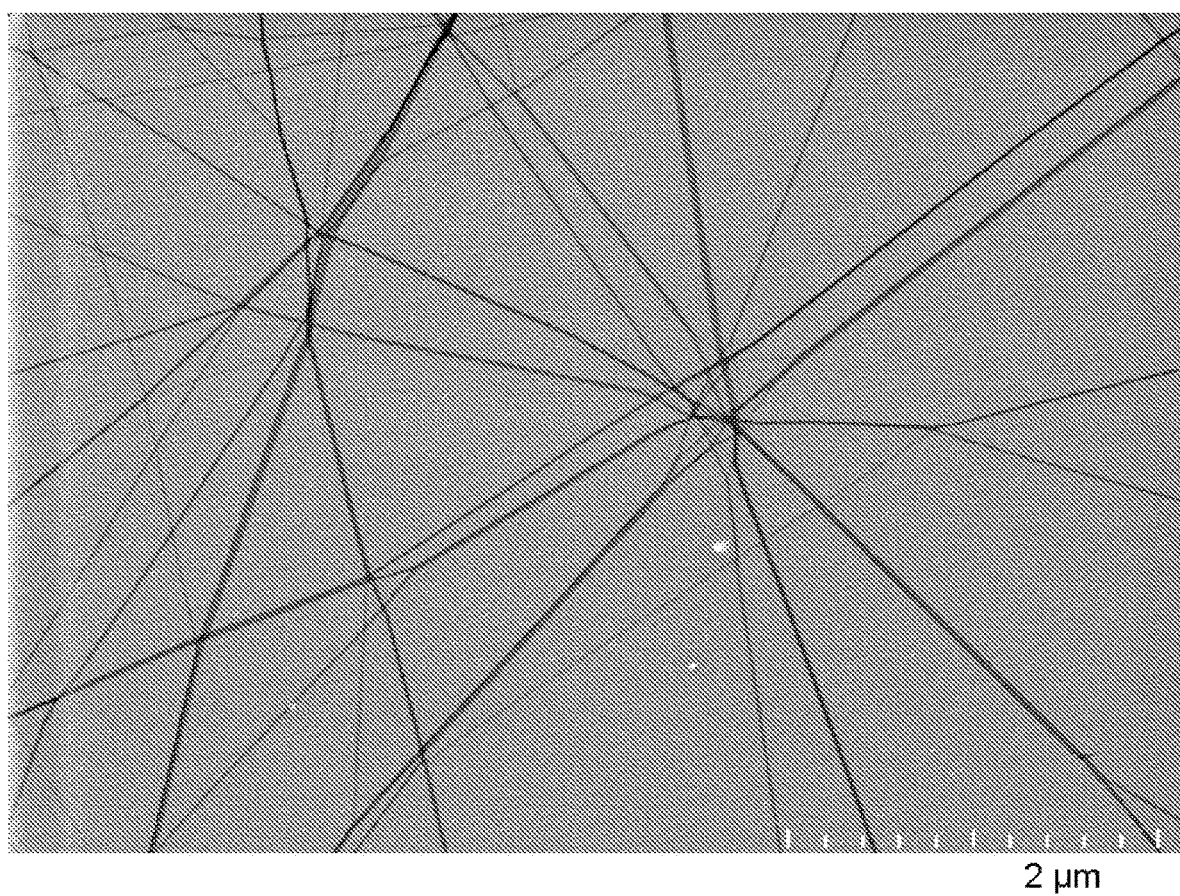
FIG. 4 is a STEM image of Sample E1H from Example 1 taken at 20,000× magnification with a full horizontal field width of approximately 6 microns in accordance with embodiments described herein.
Figure 5:
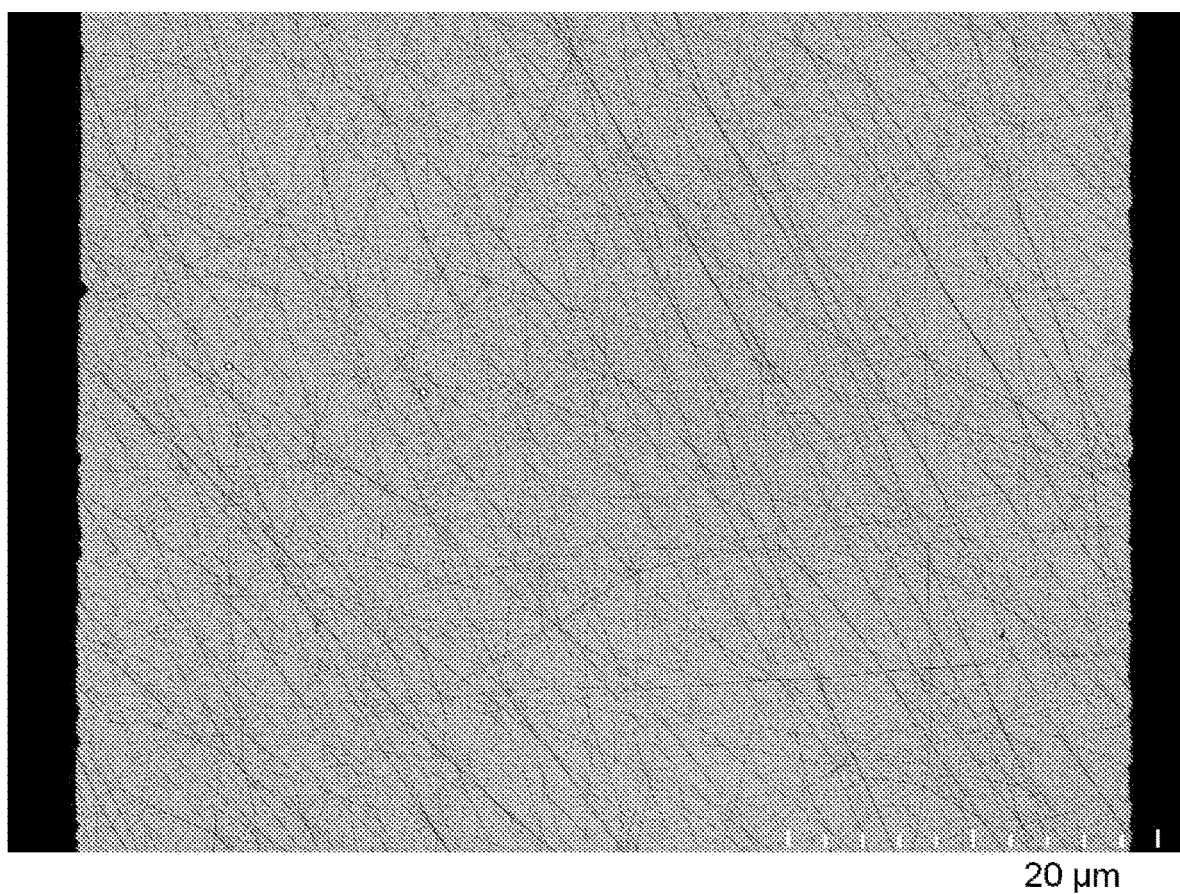
FIG. 5 is a STEM image of Sample E1I from Example 1 taken at 2,000× magnification with a full horizontal field width of approximately 63 microns in accordance with embodiments described herein.

The cooled expanded ePTFE membrane from the third pass was harvested from the pantograph and placed onto (152.4 mm×152.4 mm) adhesive backed frames. Using the frame as a cutting guide, the ePTFE membrane was weighed and the average areal density was calculated to be 4.3 mg/m² with the lightest sample weighing 2.4 mg/m² (Table 2). The area ratio is defined as the ratio of the areal density before and after the series of expansion operations. The ePTFE membrane from the third pass exhibited area ratios ranging from 122,690:1 to 459,273:1; depending upon process conditions (Table 2). FIGS. 1-3 are from the same sample (2.40 mg/m²; Sample E1G) at 3 different magnifications. No remaining primarily particles can be observed. FIG. 4 is from a second piece where the same strain path was used, while the oven was set to 322° C. (Sample E1H). A STEM image of Sample E1I is provided as FIG. 5. Table 1 consolidates the process parameters.

TABLE 1

Process Parameters Example 1

| | | First Pass | | | | | | Second Pass | | | | | | Third Pass | | | | | |
|---|---|---|---|---|---|---|---|---|---|---|---|---|---|---|---|---|---|---|---|
| Sample (FIG.) | Temp[2] ° C.) | n | Time (s) | $\lambda_{1sp}$ | $\lambda_{2sp}$ | Rate Input (%/s) | Rate Mode[1] | n | Time (s) | $\lambda_{1sp}$ | $\lambda_{2sp}$ | Rate Input (%/s) | Rate Mode[1] | n | Time (s) | $\lambda_{1sp}$ | $\lambda_{2sp}$ | Rate Input (%/s) | Rate Mode[1] |
| E1A | 300 | 1 | 120 | 4 | 4 | 36 | s | 1 | 120 | 10 | 10 | 9 | s | 1 | 120 | 10 | 10 | 1 | r |
| E1B | 300 | 1 | 120 | 4 | 4 | 36 | s | 1 | 120 | 10 | 10 | 9 | s | 1 | 120 | 10 | 10 | 1 | r |
| E1C | 300 | 1 | 120 | 4 | 4 | 36 | s | 1 | 120 | 10 | 10 | 10 | s | 1 | 120 | 10 | 10 | 1 | r |
| E1D | 300 | 1 | 120 | 4 | 4 | 36 | s | 1 | 120 | 10 | 10 | 10 | s | 1 | 120 | 10 | 10 | 1 | r |
| E1E | 300 | 1 | 120 | 4 | 4 | 36 | s | 1 | 120 | 10 | 10 | 9 | s | 1 | 120 | 10 | 10 | 1 | r |
| E1F | 300 | 1 | 120 | 4 | 4 | 36 | s | 1 | 120 | 10 | 10 | 9 | s | 1 | 120 | 10 | 10 | 1 | r |
| E1G (FIGS. 1-3) | 300 | 1 | 120 | 4 | 4 | 36 | s | 1 | 120 | 10 | 10 | 9 | s | 1 | 120 | 10 | 10 | 1 | r |
| E1H (FIG.) 4 | 322 | 1 | 120 | 4 | 4 | 36 | s | 1 | 120 | 10 | 10 | 9 | s | 1 | 120 | 10 | 10 | 1 | r |
| E1I (FIG. 5) | 320 | 1 | 120 | 4 | 4 | 36 | s | 1 | 120 | 10 | 10 | 9 | s | 1 | 120 | 10 | 10 | 1 | r |

[1]"s" = constant speed; "r" = constant acceleration rate set point.
[2]Set point

TABLE 2

Single Layer Sample Data after 3 Passes

| Sample | Areal Density (mg/m²) | Area Ratio | |
|---|---|---|---|
| E1A | 2.48 | 459273:1 | |
| E1B | 4.13 | 275564:1 | |
| E1C | 3.57 | 319494:1 | |
| E1D | 5.63 | 202249:1 | |
| E1E | 9.15 | 122690:1 | |
| E1F | 4.37 | 256995:1 | |
| E1G | 2.40 | 467013:1 | |
| | 4.53 | 300468:1 | Average |
| | 2.40 | 122690:1 | Minimum |
| | 9.15 | 467013:1 | Maximum |

Example 2

The following examples disclose the production of an ePTFE membrane having very low areal density per layer with layering up to 256 layers and area ratios up to about 34 million to 1.

PTFE fine powder (E.I. DuPont de Nemours) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating the tape to approximately 200° C. A 98 mm square was cut from the dry tape. A summary of the process parameters used in Example 2 is provided in Table 3.

First Pass

Using a pantograph machine, four squares of tape were heated in an oven set to about 300° C. at a target 240 seconds and then expanded in the longitudinal direction and transverse direction simultaneously at a target ratio of about 7:1 in each direction while maintaining a temperature of about 300° C. The average engineering strain rate target was set to 36%/second. The pantograph opened at a constant velocity target for approximately 16.7 seconds. The ePTFE membrane was allowed to cool to room temperature (~22° C.) under restraint of the pantograph. Four pieces (4 layers each) were harvested from the cooled ePTFE membrane and set aside for further expansion, i.e. a second pass. The first pass process was repeated 1 more time to create another 16 layers. Both 16 layer samples were combined to make a 32-layer sample.

Second Pass

Using the same pantograph machine, after both stacks of 16 layers (32 layers total) were heated in an oven to about 300° C. for a target of 240 seconds and then expanded in the longitudinal direction and transverse direction simultaneously at a target ratio of 7:1 in each direction while maintaining a temperature of about 300° C. The average engineering strain rate target was set to 5%/second. The pantograph opened at a constant velocity target for approximately 120 seconds. The ePTFE membrane was allowed to cool to room temperature (~22° C.) under restraint of the pantograph. Third Pass Four samples (32 layers each) were harvested from the cooled ePTFE membrane and layered (128 total layers) for further expansion, i.e. a third pass. Using the same pantograph machine, the membrane was again heated in an oven to about 300° C. for a target of 240 seconds and then expanded in the longitudinal direction and transverse direction simultaneously at a target ratio of 8:1 in each direction while maintaining a temperature of about 300° C. The simultaneous expansion was conducted at a constant acceleration rate set point of 1%/s for a target ratio of 8:1 in each direction. The pantograph opened for approximately 208 seconds for the third pass. The ePTFE membrane was allowed to cool to room temperature (~22° C.) under restraint of the pantograph.

Fourth Pass

A sample (128 layers) was harvested from the cooled ePTFE membrane and layered (128 total layers) for further expansion, i.e. a fourth pass. Using the same pantograph machine, the membrane was again heated in an oven set to about 300° C. for a target of 120 seconds and then expanded in the longitudinal direction and transverse direction simultaneously at a target ratio of 3:1 in each direction while maintaining a temperature of about 300° C. The simultaneous expansion was conducted at a constant acceleration rate set point of 1%/s for a target ratio of 3:1 in each direction. The pantograph opened for approximately 110 seconds for the fourth pass. The expanded ePTFE membrane was allowed to cool to room temperature (~22° C.) under restraint of the pantograph.

The ePTFE membrane was harvested from the machine onto (152.4 mm×152.4 mm) adhesive backed frames. Using the frame as a cutting guide, the ePTFE membrane was weighed to calculate an areal density of 0.00047 g/m²/layer, while the ePTFE membrane weighed 0.0605 g/m² (Sample E2A; Table 4). Area ratios and areal density (for both ePTFE membrane and stacks of the ePTFE membrane) for other ePTFE membranes were set and are set forth in Table 4.

Additionally three more ePTFE membranes were generated (E2B-D) for Example 2, each consisting of 128 layers using the first 3 passes described above. Each ePTFE membrane was individually loaded for a fourth and final expansion. Using the same pantograph machine, the membrane was again heated in an oven set to about 300° C. for a target of 120 seconds and then expanded in the longitudinal direction and transverse direction simultaneously at a target ratio of 4:1(E2B), 5:1(E2C) or 6:1(E2D), in each direction while maintaining a temperature of about 300° C. The simultaneous expansion was conducted at a constant acceleration rate set point of 1%/s for Examples E2B-D. The pantograph opened for approximately 139 (E2B), 161 (E2C) or 179 (E2D) seconds for the fourth pass. At the end of each expansion (E2B-E2D), the expanded ePTFE membrane was allowed to cool to room temperature (~22° C.) under restraint of the pantograph. The ePTFE membrane was harvested from the machine onto (152.4 mm×152.4 mm) adhesive backed frames. Using the frame as a cutting guide, the ePTFE membrane was weighed. Table 4 includes the fourth pass ratio settings, area ratio, areal density of the stack of ePTFE membranes, the areal density of each layer, and translation time during the final pass.

Figure 6:
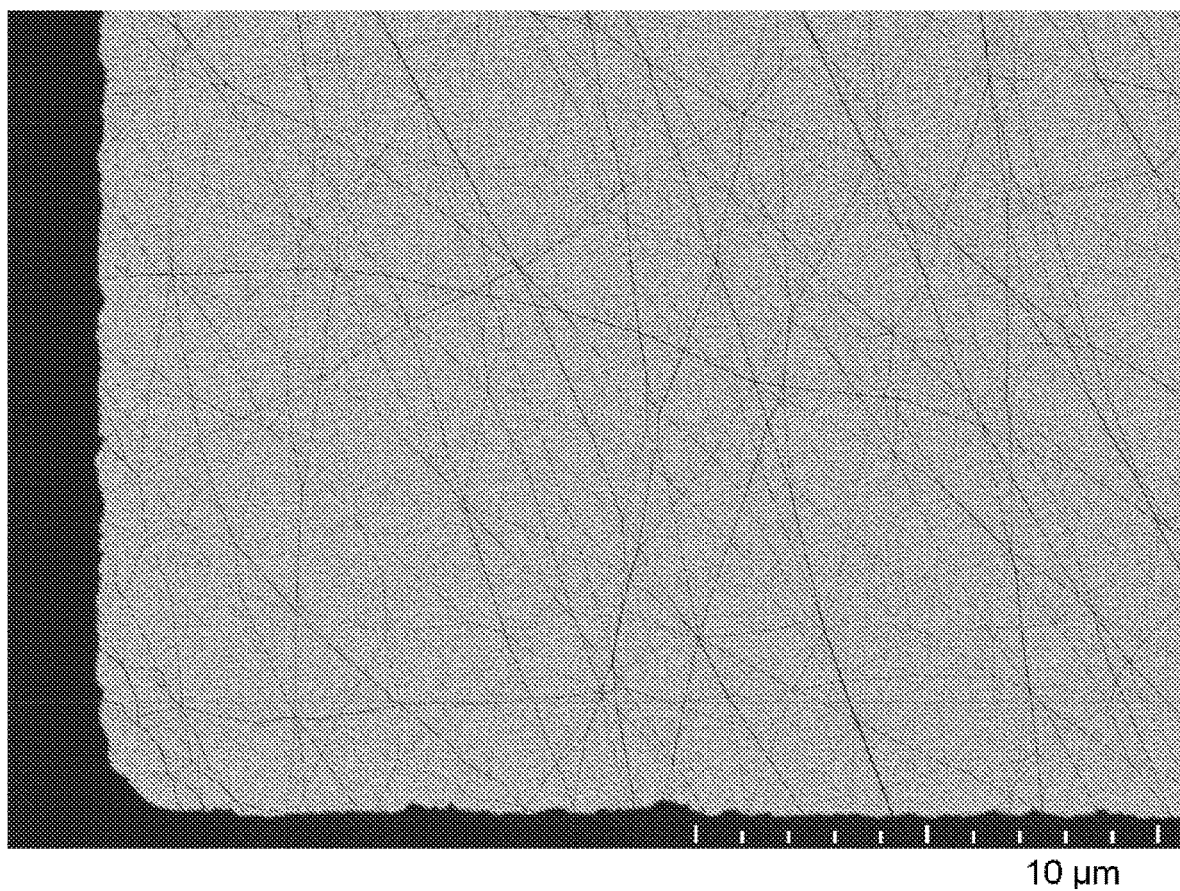
FIG. 6 is a STEM image of Sample E2E from Example 2 taken at 5,000× magnification with a full horizontal field width of approximately 25 microns in accordance with embodiments described herein.
Figure 7:
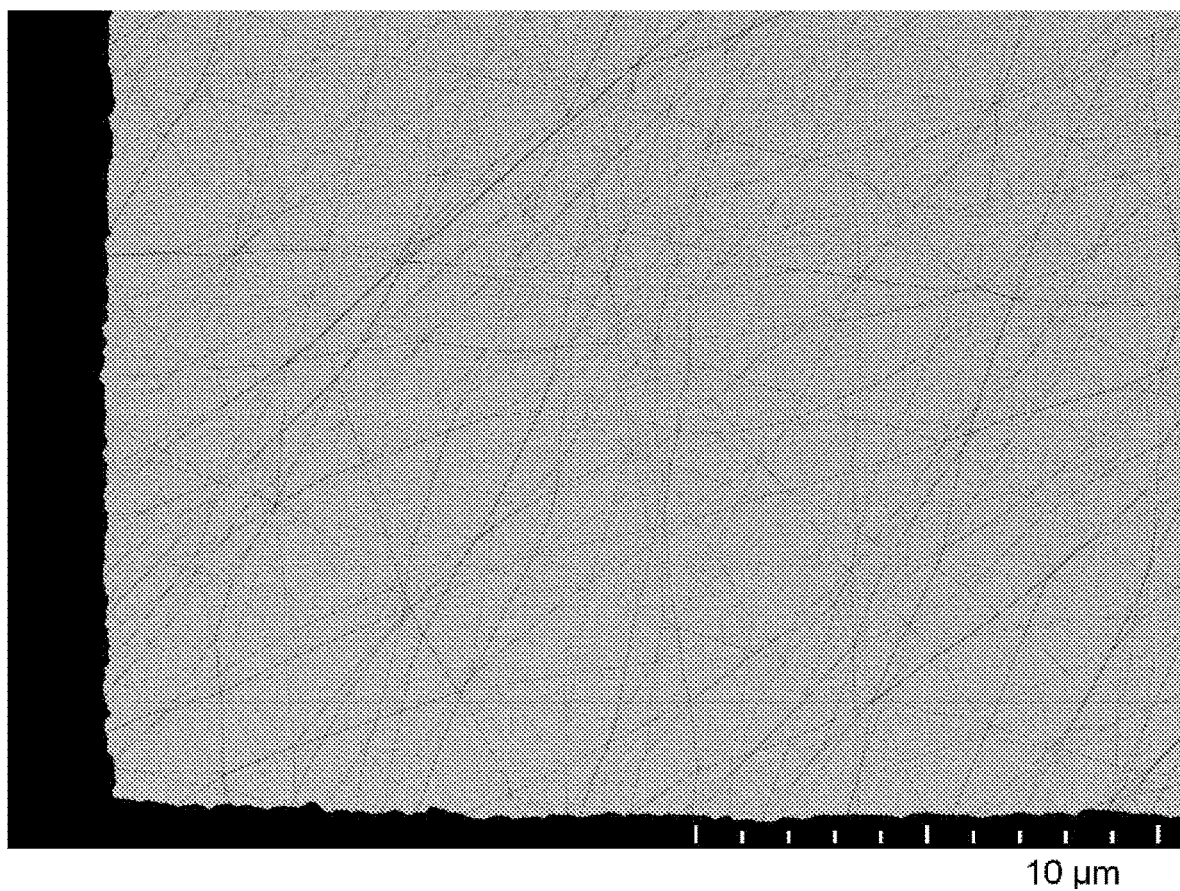
FIG. 7 is a STEM image of Sample E2F from Example 2 taken at 5,000× magnification with a full horizontal field width of approximately 25 microns in accordance with embodiments described herein.
Figure 8:
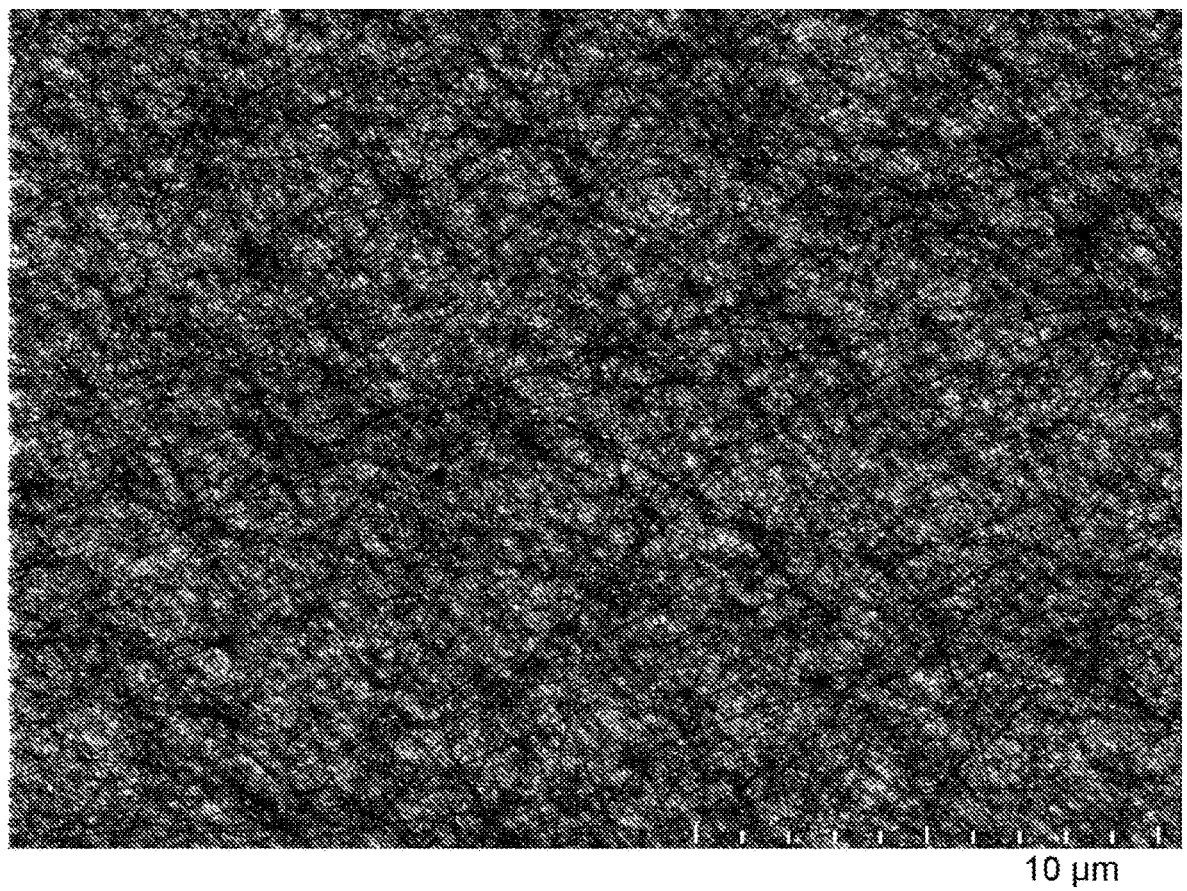
FIG. 8 is a STEM image of Sample E2G from Example 2 taken at 5,000× magnification with a full horizontal field width of approximately 25 microns in accordance with embodiments described herein.

Additionally three more ePTFE membranes were generated (E2E-G) for Example 2, primarily for observations of images from STEM (FIGS. 6-8).

Example E2E was processed using the same steps as Example E2D with the following 2 exceptions. The dwell time prior to expansion was reduced from 240 (E2D) to 120 (E2E) seconds prior to the third pass. The fourth pass target ratio was increased from a set point of 6:1 in both directions (E2D) to 8:1 in both directions (E2E). The pantograph opened for approximately 208 (E2E) seconds for the fourth pass. The expanded ePTFE membrane was allowed to cool to room temperature (~22° C.) under restraint of the pantograph. The ePTFE membrane was harvested from the machine onto (152.4 mm×152.4 mm) adhesive backed frames.

Example E2F was processed using the same steps as Example E2E with the following 2 exceptions. The number of layers loaded for the fourth expansion was increased from 128 (E2E) to 256 (E2F) and the fourth pass target ratio was increased from a set point of 8:1 in each direction (E2E) to 9:1 in each direction (E2F). The expanded ePTFE membrane was allowed to cool to room temperature (~22° C.) under restraint of the pantograph. The ePTFE membrane was harvested from the machine onto (152.4 mm×152.4 mm) adhesive backed frames.

Example E2G was processed using the same steps as Example E2E with the following 2 exceptions. The number of layers loaded for the second expansion was decreased from 32 (E2E) to 16 (E2G) and no fourth pass was used. The expanded ePTFE membrane was allowed to cool to room temperature (~22° C.) under restraint of the pantograph. The ePTFE membrane was harvested from the machine onto (152.4 mm×152.4 mm) adhesive backed frames. Using the frame as a cutting guide, the ePTFE membrane was weighed to calculate an areal density of 0.009 g/m²/layer, while the ePTFE membrane weighed 1.175 g/m² (Sample E2G; Table 4). Area ratios and areal density (for both ePTFE membrane and stacks of the ePTFE membrane) for these and other ePTFE membranes were calculated and are set forth in Table 4.

TABLE 3

Process Conditions for Example 2

| | | | First Pass | | | | | | Second Pass | | | | |
|---|---|---|---|---|---|---|---|---|---|---|---|---|---|
| Sample (FIG.) | Temp[2] (° C.) | n | Time (s) | $\lambda_{1sp}$ | $\lambda_{2sp}$ | Rate Input (%/s) | Rate Mode[1] | n | Time (s) | $\lambda_{1sp}$ | $\lambda_{2sp}$ | Rate Input (%/s) | Rate Mode[1] |
| E2A | 300 | 4 | 240 | 7 | 7 | 36 | S | 32 | 240 | 7 | 7 | 5 | s |
| E2B | 300 | 4 | 240 | 7 | 7 | 36 | S | 32 | 240 | 7 | 7 | 5 | s |
| E2C | 300 | 4 | 240 | 7 | 7 | 36 | S | 32 | 240 | 7 | 7 | 5 | s |
| E2D | 300 | 4 | 240 | 7 | 7 | 36 | S | 32 | 240 | 7 | 7 | 5 | s |
| E2E (FIG. 6) | 300 | 4 | 240 | 7 | 7 | 36 | S | 32 | 240 | 7 | 7 | 5 | s |
| E2F (FIG. 7) | 300 | 4 | 240 | 7 | 7 | 36 | S | 32 | 240 | 7 | 7 | 5 | s |
| E2G (FIG. 8) | 300 | 4 | 240 | 7 | 7 | 36 | S | 16 | 240 | 7 | 7 | 5 | s |

| | Third Pass | | | | | | Fourth Pass | | | | | |
|---|---|---|---|---|---|---|---|---|---|---|---|---|
| Sample (FIG.) | n | Time (s) | $\lambda_{1sp}$ | $\lambda_{2sp}$ | Rate Input (%/s) | Rate Mode[1] | n[3] | Time (s) | $\lambda_{1sp}$ | $\lambda_{2sp}$ | Rate Input (%/s) | Rate Mode[1] |
| E2A | 128 | 240 | 8 | 8 | 1 | r | 128 | 120 | 3 | 3 | 1 | r |
| E2B | 128 | 240 | 8 | 8 | 1 | r | 128 | 120 | 4 | 4 | 1 | r |
| E2C | 128 | 240 | 8 | 8 | 1 | r | 128 | 120 | 5 | 5 | 1 | r |
| E2D | 128 | 240 | 8 | 8 | 1 | r | 128 | 120 | 6 | 6 | 1 | r |
| E2E (FIG. 6) | 128 | 120 | 8 | 8 | 1 | r | 128 | 120 | 8 | 8 | 1 | r |

TABLE 3-continued

Process Conditions for Example 2

| | | | | | | | | | | | | |
|---|---|---|---|---|---|---|---|---|---|---|---|---|
| E2F (FIG. 7) | 128 | 120 | 8 | 8 | 1 | r | 256 | 120 | 9 | 9 | 1 | r |
| E2G (FIG. 8) | 128³ | 120 | 8 | 8 | 1 | r | na | | | | | |

[1]"s" = constant speed; "r" = constant acceleration rate set point;
[2]Set point;
[3]final number of layers in final pass.

TABLE 4

Fourth pass ratio set-point, area ratio
and areal density data for 128 layer samples

| Sample | Fourth Pass MD and TD ratio SP | Area Ratio (AR) | Areal Density for Stack of layers (g/m²) | Areal Density per layer (g/m²) | Fourth Pass Translation Times (s) |
|---|---|---|---|---|---|
| E2A | 3 × 3 | 2,452,746:1 | 0.060 | 0.0004729 | 110 |
| E2B | 4 × 4 | 8,289,810:1 | 0.018 | 0.0001399 | 139 |
| E2C | 5 × 5 | 8,452,355:1 | 0.018 | 0.0001372 | 161 |
| E2D | 6 × 6 | 34,485,608:1 | 0.004 | 0.0000336 | 179 |
| E2G | NA | 126,383:1 | 1.175 | 0.009178 | |

Example 3

The following example discloses the production of an ePTFE membrane having very low areal density per layer having up to 1024 ePTFE layers and area ratios of up to nearly 300 million to 1.

PTFE fine powder (EA. DuPont de Nemours) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating the tape to approximately 200° C. A 98 mm square was cut from the dry tape. A summary of the process parameters used in Example 3 is provided in Table 5.

First Pass

Using a pantograph machine, the four squares of tape were stacked upon each other and these four squares (layers) of tape were heated in an oven set to 322° C. to a target of 240 seconds and then expanded in the longitudinal direction and transverse direction simultaneously at a target ratio of about 10:1 in each direction while maintaining a temperature of about 322° C. The average engineering strain rate target was set to 36%/second. The pantograph opened at a constant velocity target for approximately 25 seconds. The ePTFE membrane was allowed to cool to room temperature (~22° C.) under restraint of the pantograph. The first pass process was repeated 1 more time to create another 32 layers.

Second Pass

Using the same pantograph machine, both stacks of 32 layers (64 layers total) were heated in an oven set to 322° C. for a target of 240 seconds and then expanded in the longitudinal direction and transverse direction simultaneously at a target ratio of 10:1 in each direction while maintaining a temperature of about 322° C. The average engineering strain rate target was set to 3.6%/second. The pantograph opened at a constant velocity target for approximately 250 seconds. The expanded membrane was allowed to cool to room temperature (~22° C.) under restraint of the pantograph.

Third Pass

Four samples (64 layers each) were harvested from the cooled ePTFE membrane and stacked (256 total layers) for further expansion, i.e. a third pass. Using the same pantograph machine, the stacked ePTFE membrane layers were again heated in an oven set to 322° C. for a target of 240 seconds and then expanded in the longitudinal direction and transverse direction simultaneously at a target ratio of 8:1 (E3B) or 10:1 (E3A) in each direction while maintaining a temperature of about 322° C. The simultaneous expansion was conducted at a constant acceleration rate set point of 1%/s until 400% strain ($\lambda_{sp}$=5:1 in both directions) as the pantograph accelerated to a velocity target of 3.5 mm/s, and the expansions were completed at a constant velocity target of 5%/s (3.5 mm/s in this specific case based on the original length input of 70 mm ("r/s" rate mode)). The pantograph opened for approximately 221 (E3B) or 261 (E3A) seconds for the third pass. The expanded membrane was allowed to cool to room temperature (~22° C.) under restraint of the pantograph.

Fourth Pass

A sample (256 layers) was harvested from the cooled ePTFE membrane and stacked (1024 total layers) for further expansion, i.e. a fourth pass. Using the same pantograph machine, the membrane was again heated in an oven set to 322° C. for a target of 120 seconds and then expanded in the longitudinal direction and transverse direction simultaneously at a target ratio of 7:1 in each direction while maintaining a temperature of about 322° C. The simultaneous expansion was conducted at a constant acceleration rate set point of 1%/s until 400% strain ($\lambda_{sp}$=5:1 in both directions) as the pantograph accelerated to a velocity set point of 3.5 mm/s, and the expansions were completed at a constant velocity target of 5%/s (3.5 mm/s in this specific case based on the original length input of 70 mm) ("r/s" rate mode). The pantograph opened for approximately 201 seconds for the fourth pass to a ($\lambda_{sp}$=7:1 in both directions). The expanded membrane was allowed to cool to room temperature (~22° C.) under restraint of the pantograph.

Figure 9:
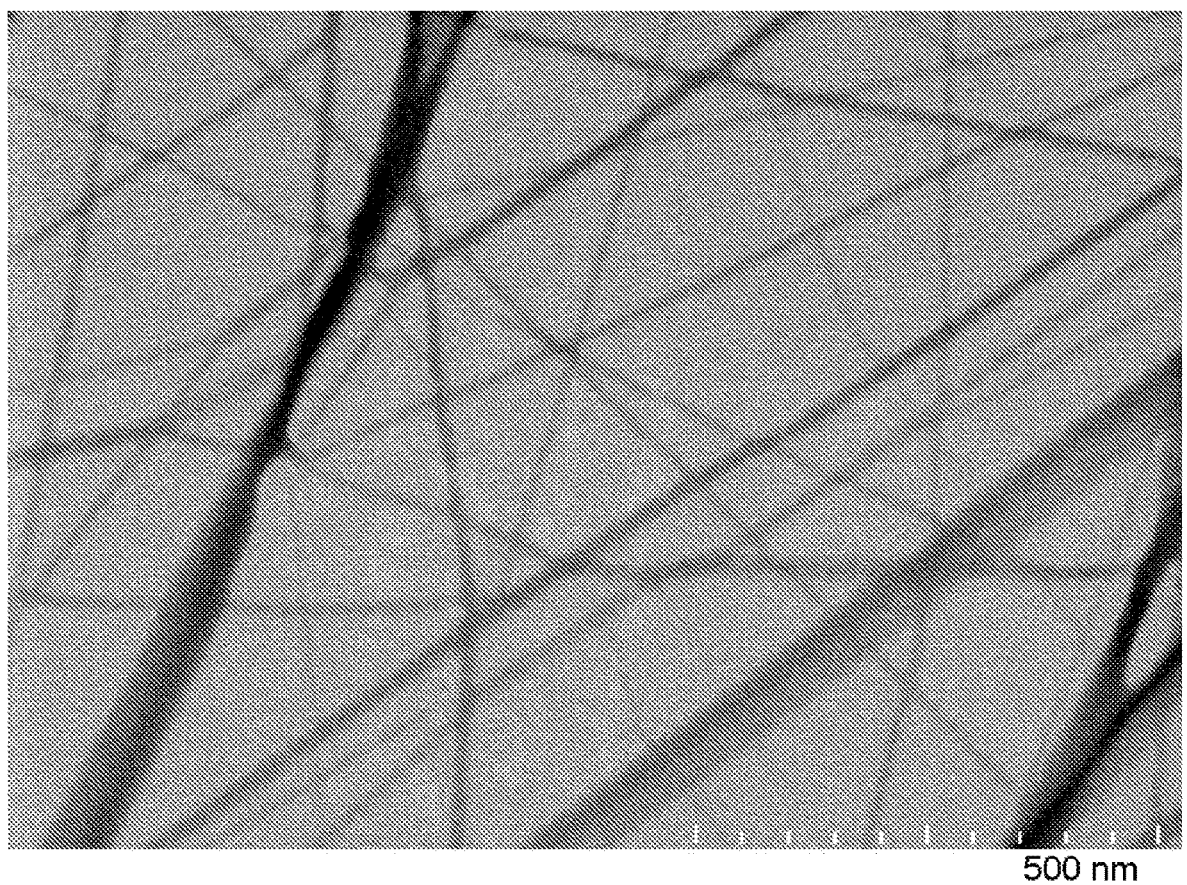
FIG. 9 is a STEM image of Sample E3A from Example 3 taken at 100,000× magnification with a full horizontal field width of approximately 1.27 microns in accordance with embodiments described herein.
Figure 10:
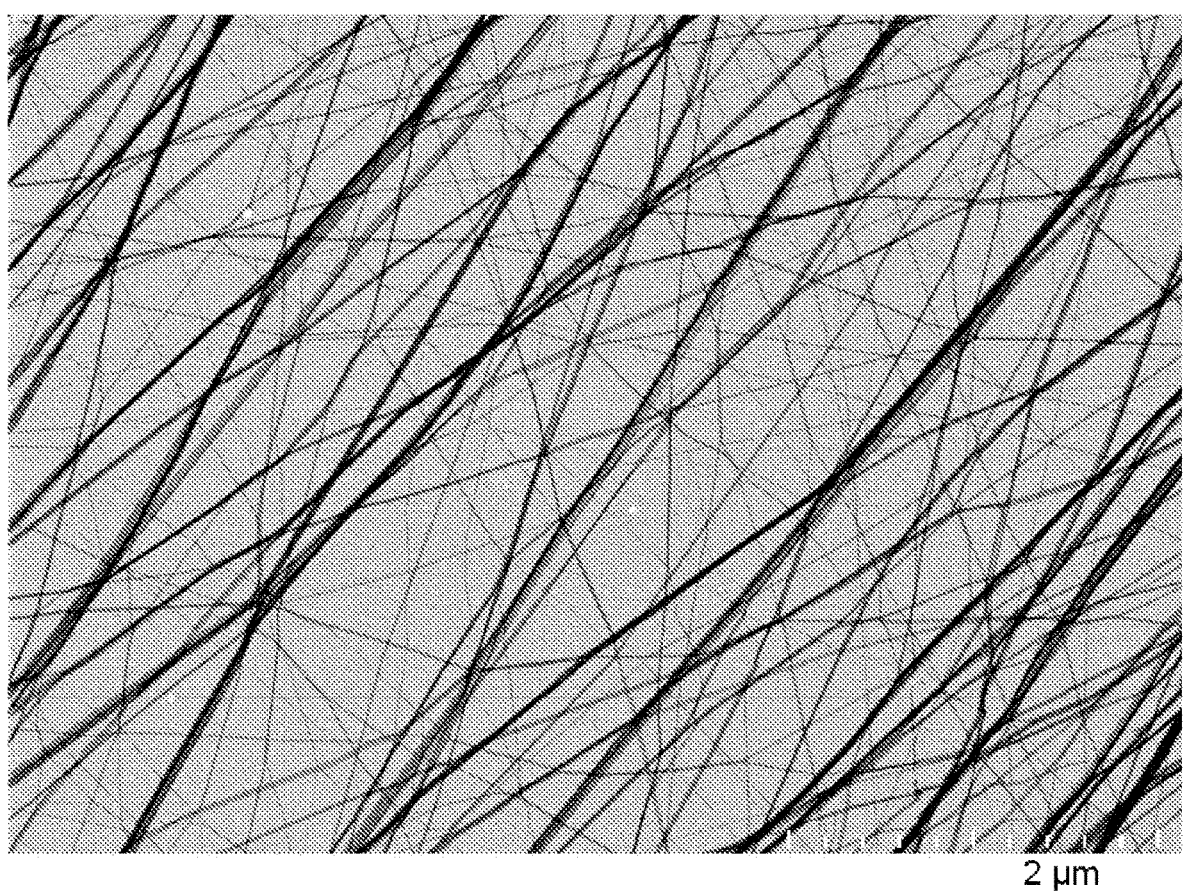
FIG. 10 is a STEM image of Sample E3B from Example 3 taken at 20,000× magnification with a full horizontal field width of approximately 6 microns in accordance with embodiments described herein.

The ePTFE membranes were harvested from the machine onto (152.4 mm×152.4 mm) adhesive backed frames. Using the frame as a cutting guide, the ePTFE membranes were weighed to calculate an areal density ranging from 0.005 to 0.016 mg/m²/layer, while the ePTFE membrane had a mass per area (MPA; areal density) ranging from 3.88 mg/m² to 16.6 mg/m² (Table 6). Two different locations were measured for sample E3A (i.e., E3A-1 and E3A-2) while three different locations were measured for sample E3B (i.e., E3B-1, E3B-2, and E3b-3). STEM imaging was conducted for samples E3A (FIG. 9) and E3B (FIG. 10).

Area ratios of up to 298,611,016:1 were possible (Table 6). The lowest areal density for a complete stack of ePTFE membranes was ~3.9 mg/m².

TABLE 5

Process Conditions Table for Example 3

| Sample (FIG.) | Temp[2] (° C.) | First Pass | | | | | | Second Pass | | | | | |
|---|---|---|---|---|---|---|---|---|---|---|---|---|---|
| | | n | Time (s) | $\lambda_{1sp}$ | $\lambda_{2sp}$ | Rate Input (%/s) | Rate Mode[1] | n | Time (s) | $\lambda_{1sp}$ | $\lambda_{2sp}$ | Rate Input (%/s) | Rate Mode[1] |
| E3A (FIG. 9) | 322 | 4 | 240 | 10 | 10 | 36 | s | 64 | 240 | 10 | 10 | 3.6 | s |
| E3B (FIG. 10) | 322 | 4 | 240 | 10 | 10 | 36 | s | 64 | 240 | 10 | 10 | 3.6 | s |

| Sample (FIG.) | Third Pass | | | | | | Fourth Pass | | | | | | |
|---|---|---|---|---|---|---|---|---|---|---|---|---|---|
| | n | Time (s) | $\lambda_{1sp}$ | $\lambda_{2sp}$ | Rate Input (%/s) | Rate Mode[1] | N[3] | Time (s) | $\lambda_{1sp}$ | $\lambda_{2sp}$ | Rate Input (%/s) | Rate Mode[1] |
| E3A (FIG. 9) | 256 | 120 | 10 | 10 | 1-5 | r/s | 1024 | 120 | 7 | 7 | 1-5 | r/s |
| E3B (FIG. 10) | 256 | 120 | 8 | 8 | 1-5 | r/s | 1024 | 120 | 7 | 7 | 1-5 | r/s |

[1] "s" = constant speed; "r" = constant acceleration rate set point; "r/s"—constant acceleration rate step followed by constant speed step;
[2] Set point;
[3] final number of layers in final pass.

TABLE 6

Area ratio, areal density, and areal density per layer data for Example 3

| Sample | Area Ratio (AR) | Areal Density Stack of layers (g/m$^2$) | Areal Density per layer (g/m$^2$) |
|---|---|---|---|
| E3A-1 | 233,800,735:1 | 0.00508 | 0.00000496 |
| E3A-2 | 162,285,216:1 | 0.00732 | 0.00000714 |
| E3B-1 | 298,611,016:1 | 0.00388 | 0.00000379 |
| E3B-2 | 83,984,348:1 | 0.01377 | 0.00001345 |
| E3B-3 | 69,624,330:1 | 0.01662 | 0.00001623 |

Example 4

The following example discloses production of ePTFE membranes with areal densities on the order of 0.6-2.0 grams/m$^2$ to facilitate membrane thickness measurements (per layer).

PTFE fine powder (E.I. DuPont de Nemours) was blended with ISOPAR™ K isoparaffinic hydrocarbon lubricant at a target ratio of 110 mL per pound (~0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. A 98 mm square was cut from the dry tape. A summary of the process parameters used in Example 4 is provided in Table 7.

First Pass

Using a pantograph machine, four squares of tape were heated in an oven set to 300° C. for a target of 120 (Sample E4B) or 240 (E4A, E4C and E4D) seconds and then expanded in the longitudinal direction and transverse direction simultaneously at a target ratio of about 7:1 in each direction while maintaining a temperature of about 300° C. The average engineering strain rate target was set to 36%/second. The pantograph opened at a constant velocity target for approximately 16.6 seconds. The ePTFE membrane was allowed to cool to room temperature (~22° C.) under restraint of the pantograph.

Second Pass

Using the same pantograph machine, stacks (16, 32 or 48 layers total—details in Table 7) were heated in an oven set to 300° C. for a target of 120 (E4B) or 240 (E4A, E4C and E4D) seconds and then expanded in the longitudinal direction and transverse direction simultaneously at a target ratio of 7:1 in each direction while maintaining a temperature of about 300° C. The average engineering strain rate target was set to 5%/second. The pantograph opened at a constant velocity target for approximately 120 seconds. The expanded membrane was allowed to cool to room temperature (~22° C.) under restraint of the pantograph.

Third Pass

Four samples were harvested from the cooled ePTFE membrane and stacked 128 (E4A-C) or 192 (E4D) total layers for further expansion, i.e. a third pass. Using the same pantograph machine, stacks of 128 or 192 layers were loaded. The ePTFE membrane was again heated in an oven set to 300° C. for a target of 120 (E4A-C) or 180 (E4D) seconds and then expanded in the longitudinal direction and transverse direction simultaneously at a target ratio of 8:1 in each direction while maintaining a temperature of about 300° C. The simultaneous expansion was conducted at a constant acceleration rate set point of 1%/s until 400% strain ($\lambda_{sp}$=5:1 in both directions) as the pantograph accelerated to a velocity set point of 3.5 mm/s, and the expansions (E4A, E4C-D) were completed at a constant velocity target of 5%/s (3.5 mm/s in this specific case based on the original length input of 70 mm). The pantograph opened for approximately 221 seconds during the expansions of E4A and E4C-D. The simultaneous expansion of example (E4B) was conducted at a constant acceleration rate set point of 1%/s to a target ratio of 8:1 in each direction. The entire third pass translation took approximately 210 seconds for Example E4B. The ePTFE membranes were allowed to cool to room temperature (~22° C.) under restraint of the pantograph. The ePTFE membranes were harvested from the machine onto (152.4 mm×152.4 mm) adhesive backed frames.

Using the frame as a cutting guide, ePTFE membranes E4A-E4D were weighed and measured. ePTFE membrane E4A was weighed to calculate an areal density of 0.0076 g/m²/layer, while the membrane weighed 0.974 g/m². The average total thickness measurement of the 128 layer ePTFE membrane was 7.76 microns which corresponded to approximately 60 nm per layer. Table 7 includes the process details for this and a similar sample which was exposed to approximately 350° C. for a target of 5 minutes (i.e., the "thermal treatment") to promote dimensional stability. ePTFE membrane E4B was weighed to calculate an areal density of 0.0049 g/m²/layer, while the membrane weighed 0.632 g/m². The average total thickness measurement of the 128 layer ePTFE membrane was 4.95 microns which corresponded to approximately 39 nm per layer. Table 7 includes the process details for two additional, similar samples which were compressed to reduce thickness using the methods described herein. ePTFE membrane E4C was a compressed region of ePTFE membrane E4A. ePTFE membrane E4C was placed in a laboratory press under 2.07 MPa (300 psi) for approximately 30 minutes at approximately 22° C. ePTFE membrane E4D was placed in an autoclave at 1.73 MPa (250 psi) for 40 minutes under pressure at approximately 200° C. ePTFE membrane E4C was weighed to calculate an areal density of 0.0076 g/m²/layer, while the membrane weighed 0.974 g/m². The average total thickness measurement of the 128 layer ePTFE membrane was 1.50 microns which corresponded to approximately 11.7 nm per layer. ePTFE membrane E4D was weighed to calculate an areal density of 0.016 g/m²/layer, while the membrane weighed 2.038 g/m². The average total thickness measurement of the 192 layer ePTFE membrane was 3.50 microns which corresponded to approximately 18.2 nm per layer.

Table 8 indicates that the 128 and 192 layer ePTFE membranes were heavy enough and thick enough for wall thickness measurements. The calculated thickness per layer of each uncompressed ePTFE membrane is consistent with approximately twice the width of a typical fibril as measured from microscopic images from the STEM to be approximately 20-30 nm. The solid volume fraction and porosity are calculated using 2.2 g/cc as the density of PTFE. The compressed ePTFE membrane indicated a reduced porosity and thickness per layer.

Densification Methods
Method 1: Lab Press ePTFE membrane E4C was placed in a Caver Laboratory Press Model M (Fred S. Carver Inc., Menomonee Falls, WI). The laboratory press was operated at room temperature (~22° C.) with a 3" diameter (0.0762 m) anvil on top of to generate approximately 300 psi (~2.07 MPa) for approximately 30 minutes.

Method 2: Lab Autoclave ePTFE membrane E4D was placed in an autoclave bag assembled from KAPTON® polyimide film (E.I. DuPont de Nemours Inc., Wilmington, Del.). The assembly was placed in an Econoclave™ 3 feet×5 feet laboratory autoclave (ASC Process Systems; Valencia, Calif.) using a temperature set point of 200° C. with an applied pressure of 250 psi (~1.72 MPa) for approximately 70 minutes.

TABLE 7

Process parameters for Example 4

| | | First Pass | | | | | | Second Pass | | | | | |
|---|---|---|---|---|---|---|---|---|---|---|---|---|---|
| Sample | Temp[2] (° C.) | N | Time (s) | $\lambda_{1sp}$ | $\lambda_{2sp}$ | Rate Input (%/s) | Rate Mode[1] | n | Time (s) | $\lambda_{1sp}$ | $\lambda_{2sp}$ | Rate Input (%/s) | Rate Mode[1] |
| E4A | 300 | 4 | 240 | 7 | 7 | 36 | s | 32 | 240 | 7 | 7 | 5 | s |
| E4B | 300 | 4 | 120 | 7 | 7 | 36 | s | 16 | 120 | 7 | 7 | 5 | s |
| E4C | 300 | 4 | 240 | 7 | 7 | 36 | s | 32 | 240 | 7 | 7 | 5 | s |
| E4D | 300 | 4 | 240 | 7 | 7 | 36 | s | 48 | 240 | 7 | 7 | 5 | s |

| | Third Pass | | | | | | Heat | | |
|---|---|---|---|---|---|---|---|---|---|
| Sample | N | Time (s) | $\lambda_{1sp}$ | $\lambda_{2sp}$ | Rate Input (%/s) | Rate Mode[1] | Heat Treatment (° C.)[2] | Treatment Time (s) | Densification Method |
| E4A | 128 | 120 | 8 | 8 | 1 | r/s | na | na | na |
| E4B | 128 | 120 | 8 | 8 | 1 | r | 350 | 300 | na |
| E4C | 128 | 120 | 8 | 8 | 1 | r/s | na | na | Method 1 |
| E4D | 192 | 180 | 8 | 8 | 1 | r/s | 350 | 300 | Method 2 |

[1] "s" = constant speed; "r" = constant acceleration rate set point; "r/s"—constant acceleration rate step followed by constant speed step;
[2] Set point;
[3] final number of layers in final pass.

TABLE 8

Example 4 sample data

| Sample | Stack thickness (μm) | n[1] | Areal Density (g/m²)[2] | Area Ratio | Heat Treatment | Layer thickness[3] (nm) | Bulk Density (g/cm³) | Solid Volume Fraction (SVF) | Porosity (1 − SVF) |
|---|---|---|---|---|---|---|---|---|---|
| E4A | 7.76 | 128 | 0.974 | 148,501:1 | N | 60.6 | 0.1256 | 0.06 | 0.94 |
| E4B | 4.95 | 128 | 0.632 | 228,861:1 | Y | 38.7 | 0.1276 | 0.06 | 0.94 |

TABLE 8-continued

Example 4 sample data

| Sample | Stack thickness (μm) | n[1] | Areal Density (g/m²)[2] | Area Ratio | Heat Treatment | Layer thickness[3] (nm) | Bulk Density (g/cm³) | Solid Volume Fraction (SVF) | Porosity (1 − SVF) |
|---|---|---|---|---|---|---|---|---|---|
| E4C | 1.50 | 128 | 0.974 | 148,501:1 | N | 11.7 | 0.6489 | 0.29 | 0.71 |
| E4D | 3.50 | 192 | 2.038 | 106,447:1 | Y | 18.2 | 0.5823 | 0.26 | 0.74 |

[1] number of layers in stack;
[2] Areal density of sample;
[3] per individual layer of final expanded sample.

Example 5

The following example discloses the production of stacked ePTFE membranes (stacks of up to 192 layers by layering and co-expansion) and the measurement of various membrane parameters including: mean fibril width, area weighted fibril width (AWFW), median fibril width, specific surface area, bubble point, airflow resistance, and areal density.

High permeability is shown by relatively high air flow at a particular pressure, or stated another way, less pressure is required for higher flow. Airflow resistance is a function of structure and most simple models use the solid volume fraction and a representative fibril radius as the primary factors. More sophisticated models address slip as fibril radii decrease such that they are a small fraction of the mean free path of air at standard conditions, taken here to be 65 nm. Other contributing factors to generate a membrane with high air flow are the uniformity of the distribution of the fibrils, fibril shape and orientation. Uniform distribution of fibrils would be maximized if each fibril was separated by an identical distance, where a less uniform distribution would be represented by clumped or aggregated collections of fibrils, the later exhibiting higher permeability. Fibril shape can alter air flow resistance as well.

Figure 12:
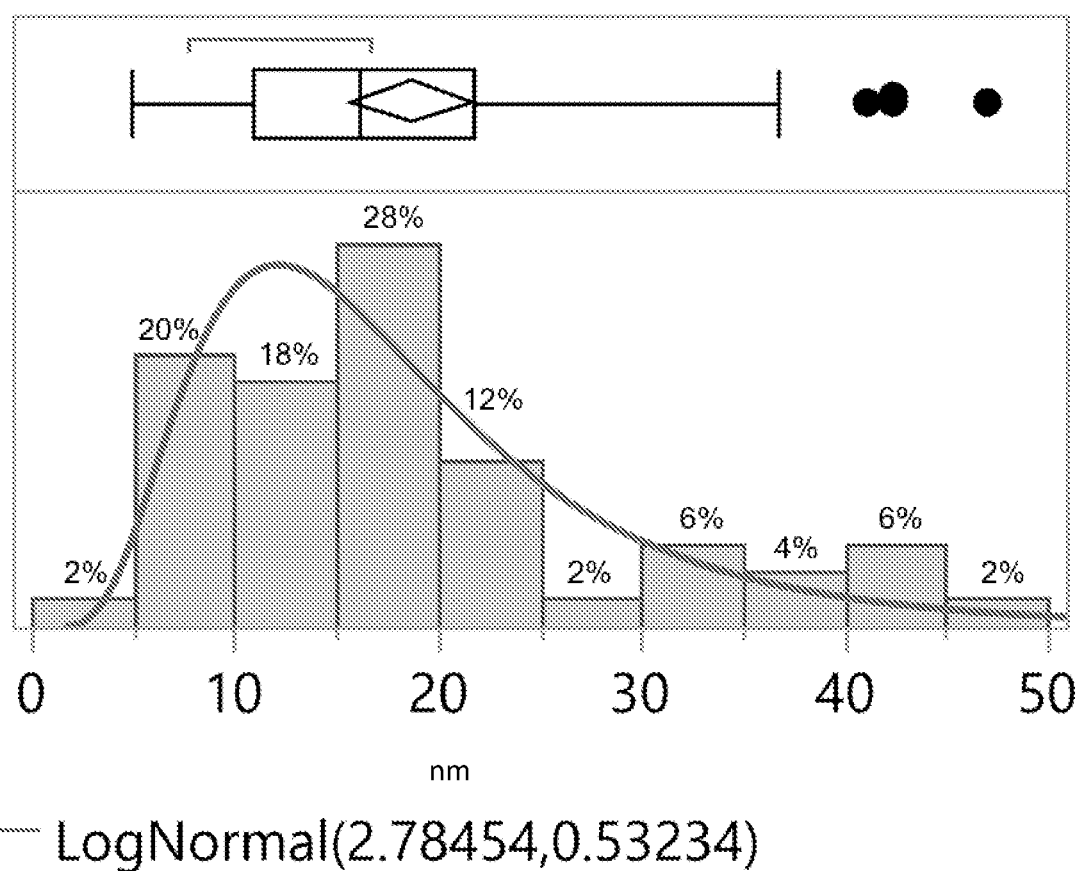
FIG. 12 is a histogram of the fibril width data in nanometers and a fit of a lognormal distribution from the manual image analysis of FIG. 11 of Example 5 in accordance with embodiments described herein.

One way to determine the average fibril width is to manually measure the width of fibrils within a representative sample. FIG. 4 (ePTFE membrane E1H) was used to manually measure the fibril widths (50 fibrils measured) to calculate average width and median width (FIG. 11). The fibril measurements were in nanometers (nm). From FIG. 11 (ePTFE membrane E1H), it is obvious due to grey scale intensity changes across the width of the fibril, that indeed, the projected width is an over simplification as smaller fibrils are observed aggregating or clumping on larger fibrils. A histogram of the fibril measurements from FIG. 11 is provided as FIG. 12 where the data was fitted to a lognormal distribution.

PTFE fine powder (E.I. DuPont de Nemours) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. The dry tape was cut in to 98 mm squares. A summary of the process parameters used in Example 5 is provided in Table 9.

First Pass

Using a pantograph machine, up to four squares of tape were heated in an oven set to 300° C. for a target of between 120 (E5A-G) or 240 (E5H-J) seconds and then expanded in the longitudinal direction and transverse direction simultaneously at a target ratio ($\lambda_{sp}$) of 4:1, 7:1 or 9:1 in each direction (Table 9) while maintaining a temperature of about 300° C. The average engineering strain rate target was set to 36%/second. The pantograph opened at a constant velocity target for approximately 8.3, 16.6 or 22 seconds based on the target ratio (Table 9). The expanded ePTFE membrane was allowed to cool to room temperature (~22° C.) under restraint of the pantograph.

Second Pass

Samples were harvested from the cooled ePTFE membrane for further expansion, i.e. a second pass. The specific number of layers stacked for the second pass of each sample are provided in Table 9. Using the same pantograph machine, the stacks of layers of ePTFE were heated in an oven set to 300° C. for a target of 120 (E5A-G) or 240 (E5H-J) seconds and then expanded in the longitudinal direction and transverse directions simultaneously at a target ratio of 6.35:1 (E5J), 7:1 (E5H-I) or 10:1(E5A-G) in each direction while maintaining a temperature of about 300° C. The average engineering strain rate target ranged from 4%/s to 9%/s (Table 9). The pantograph opened at a constant velocity target for approximately 100 (E5A-BG), 150 (E5H), 120 (E5I) and 134 (E5J) seconds (Table 9). The ePTFE membrane was allowed to cool to room temperature (~22° C.) under restraint of the pantograph.

Third Pass

Samples were harvested from the cooled ePTFE membrane and stacked if needed for further expansion, i.e. a third pass. Using the same pantograph machine, the membrane was again heated in an oven set to 300° C. for a target of 120 (E5A-G), 180 (E5I) or 240 (E5H and E5J) seconds and then expanded in the longitudinal direction and transverse directions simultaneously at a target ratio of 7:1 (E5H and E5J), 8:1 (E5I) or 10:1 (E5A-G) in each direction (Table 9) while maintaining a temperature of about 300° C. The biaxial expansions were conducted at a constant acceleration rate set point of 1%/s (E5A-E5H and E5J). For Example E5I, the biaxial expansion was conducted at a constant acceleration rate set point of 1%/s until 400% strain target ($\lambda$hd sp=5:1 in both directions) as the pantograph accelerated to a velocity target of 3.5 mm/s, and the expansion was completed at a constant velocity target of 5%/s (3.5 mm/s in this specific case based on the original length input of 70 mm) ("r/s" rate mode) to the target ratio, $X_{sp}$=8:1 in both directions. The pantograph opened for approximately 221 (E5I), 230 (E5A-G) and 195 (E5H and E5J) seconds. Selected samples (E5E-G and E5I) were thermally conditioned (heat treated) in an oven at a set point of 350° C. for a target of 300 seconds while restrained on the pantograph. The ePTFE membrane was allowed to cool to room temperature (~22° C.) under restraint of the pantograph.

The cooled expanded ePTFE membrane from the third pass was harvested from the pantograph and placed onto (152.4 mm×152.4 mm) adhesive backed frames. The mean fibril width, area weighted fibril width (AWFW), median fibril width, specific surface area, bubble point, airflow resistance, and areal density are set forth in Table 10.

TABLE 9

Process parameters for Example 5

Figure 13:
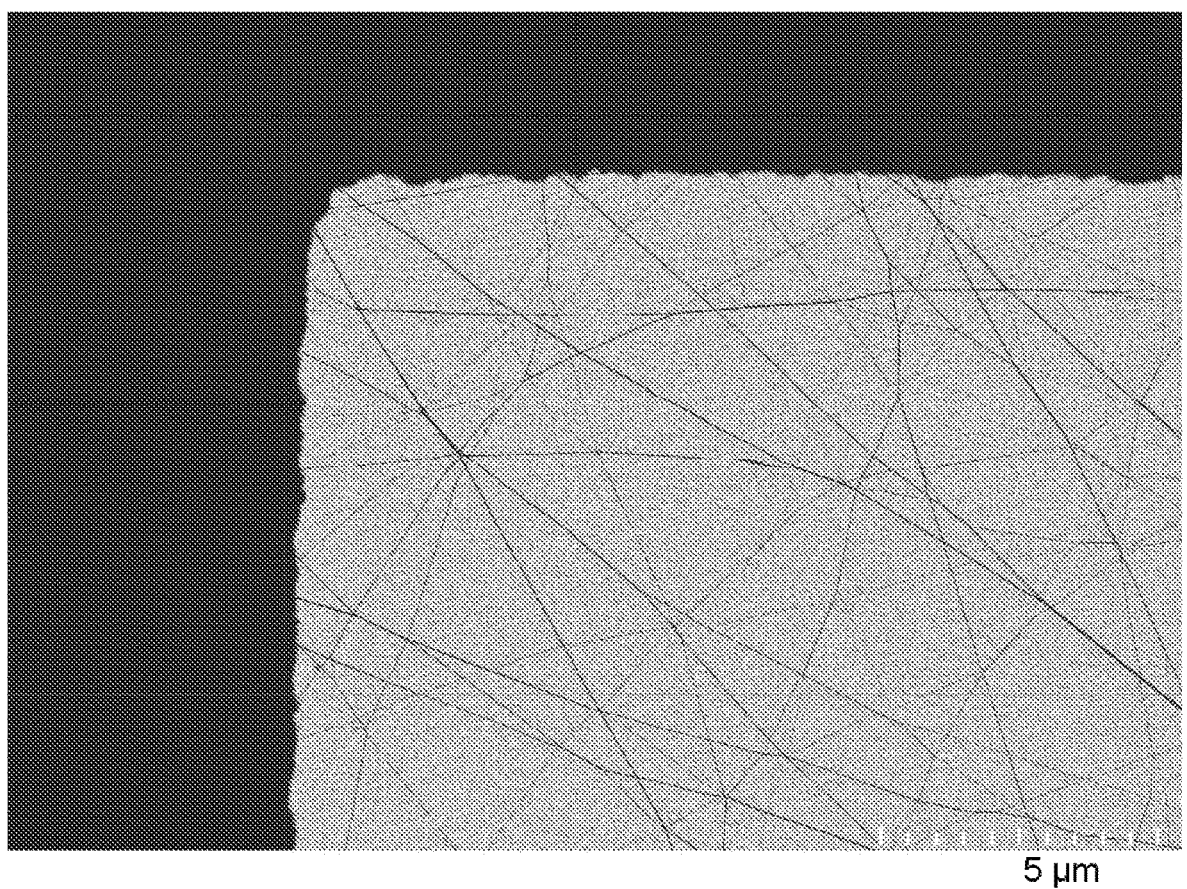
FIG. 13 is a STEM image of Sample E5A from Example 5 taken at 6,000× magnification with a full horizontal field width of approximately 21 microns in accordance with embodiments described herein.
Figure 14:
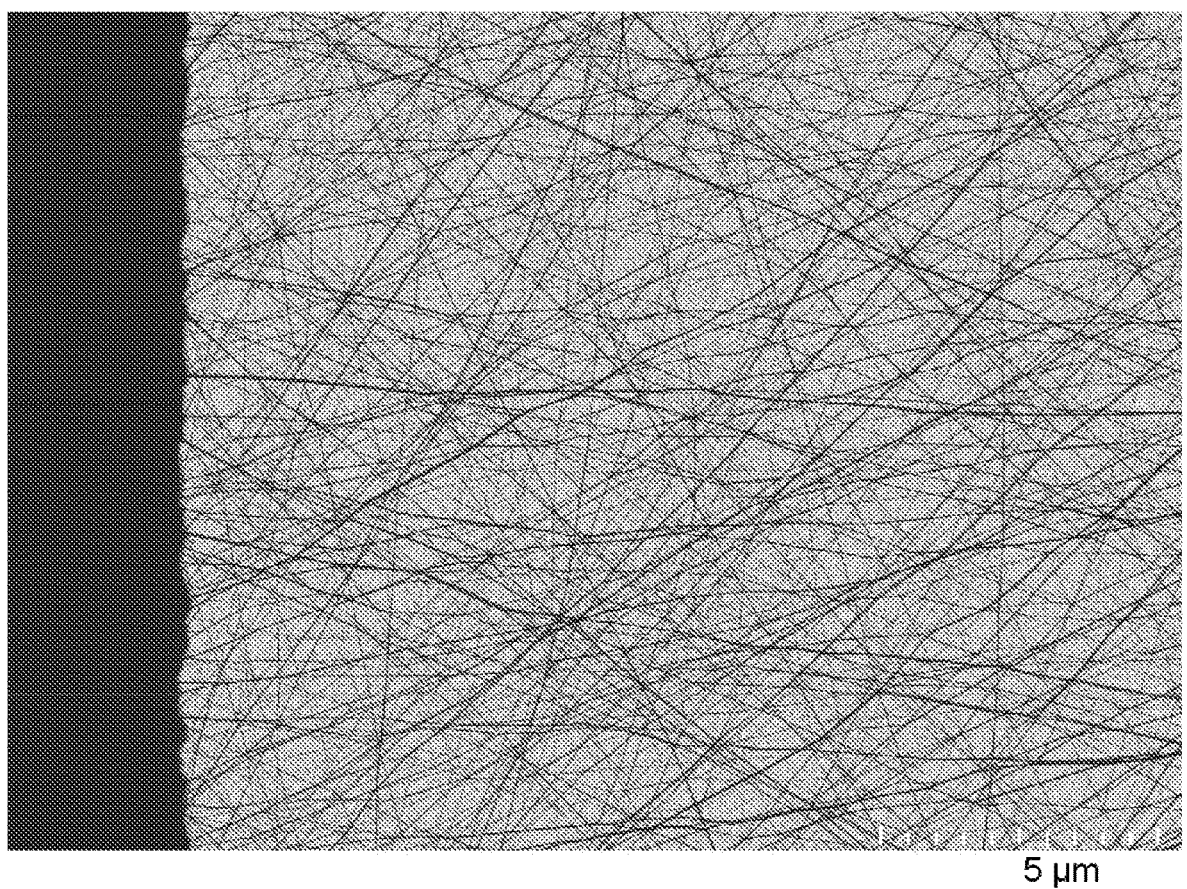
FIG. 14 is a STEM image of Sample E5B from Example 5 taken at 6,000× magnification with a full horizontal field width of approximately 21 microns in accordance with embodiments described herein.
Figure 15:
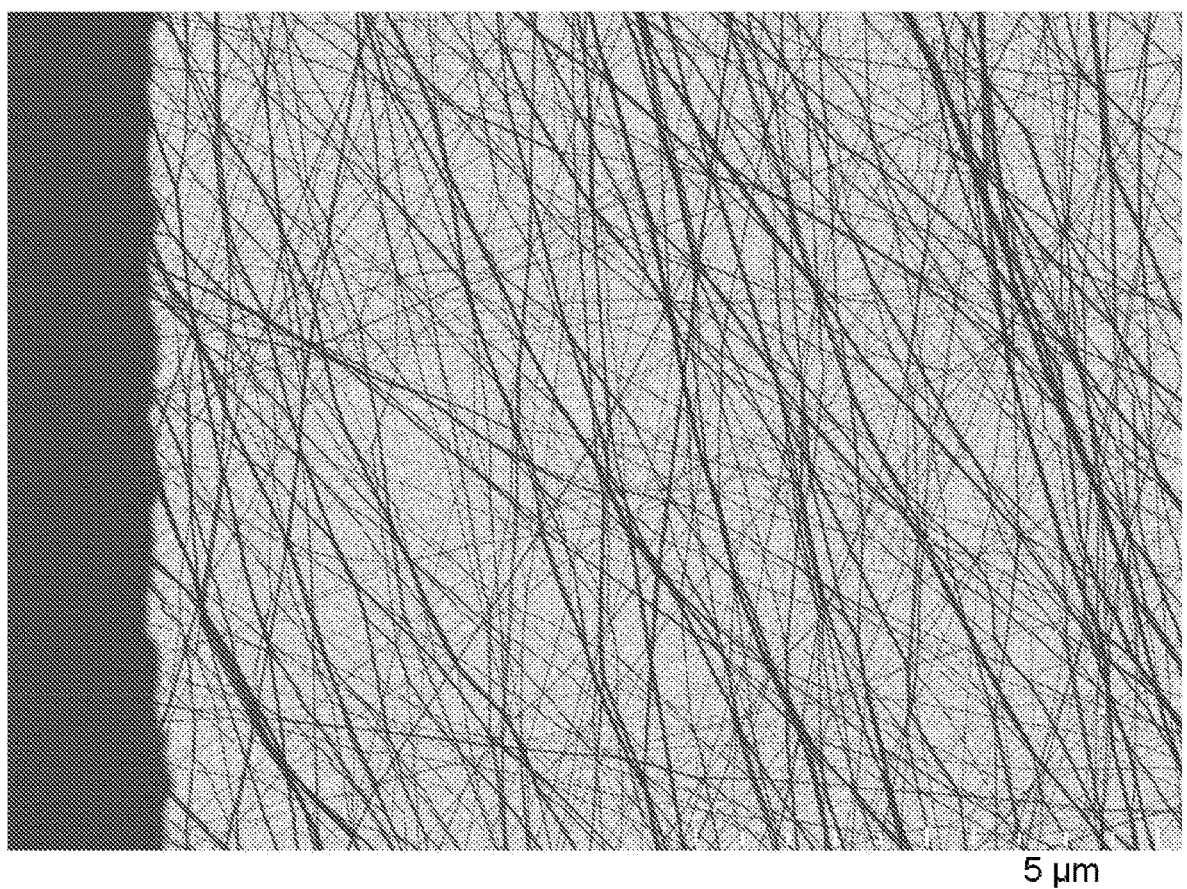
FIG. 15 is a STEM image of Sample E5C from Example 5 taken at 10,000× magnification with a full horizontal field width of approximately 12 microns in accordance with embodiments described herein.
Figure 16:
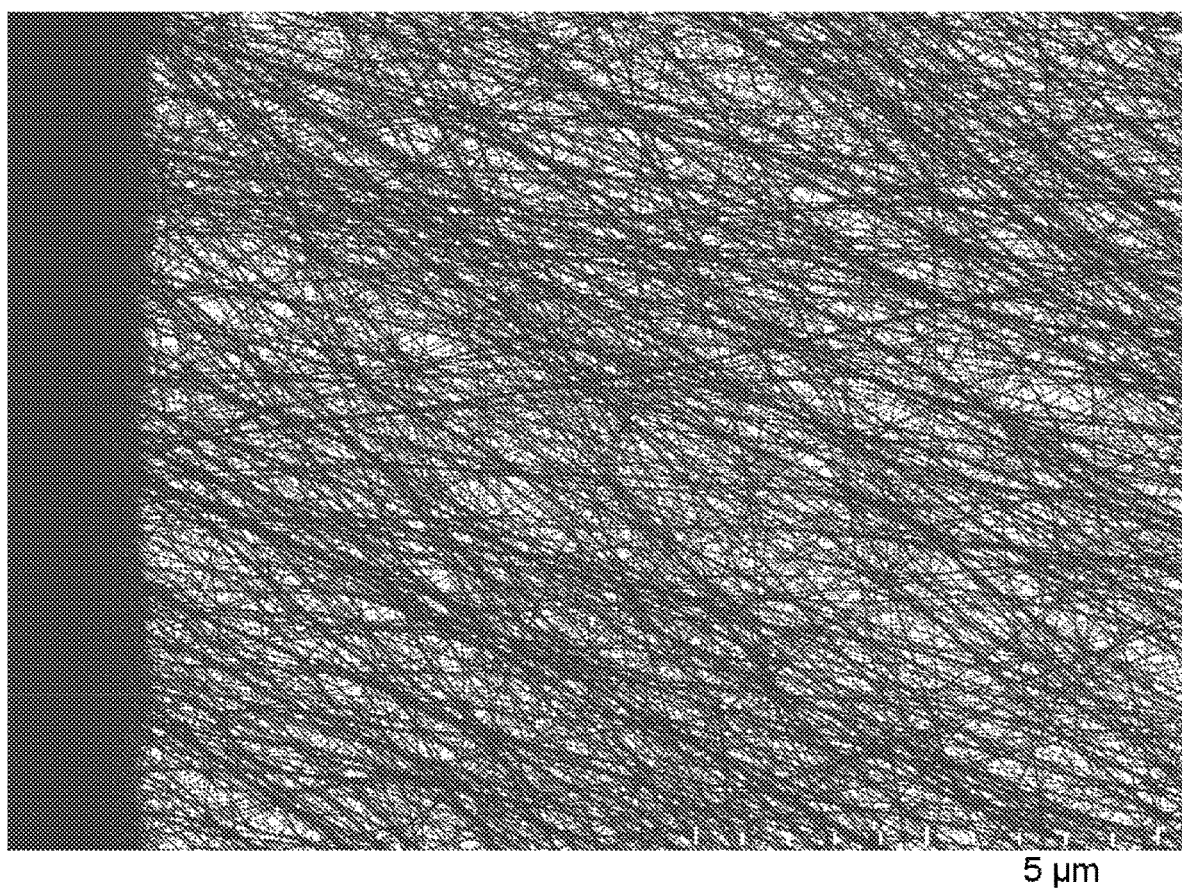
FIG. 16 is a STEM image of Sample E5D from Example 5 taken at 10,000× magnification with a full horizontal field width of approximately 12 microns in accordance with embodiments described herein.
Figure 17:
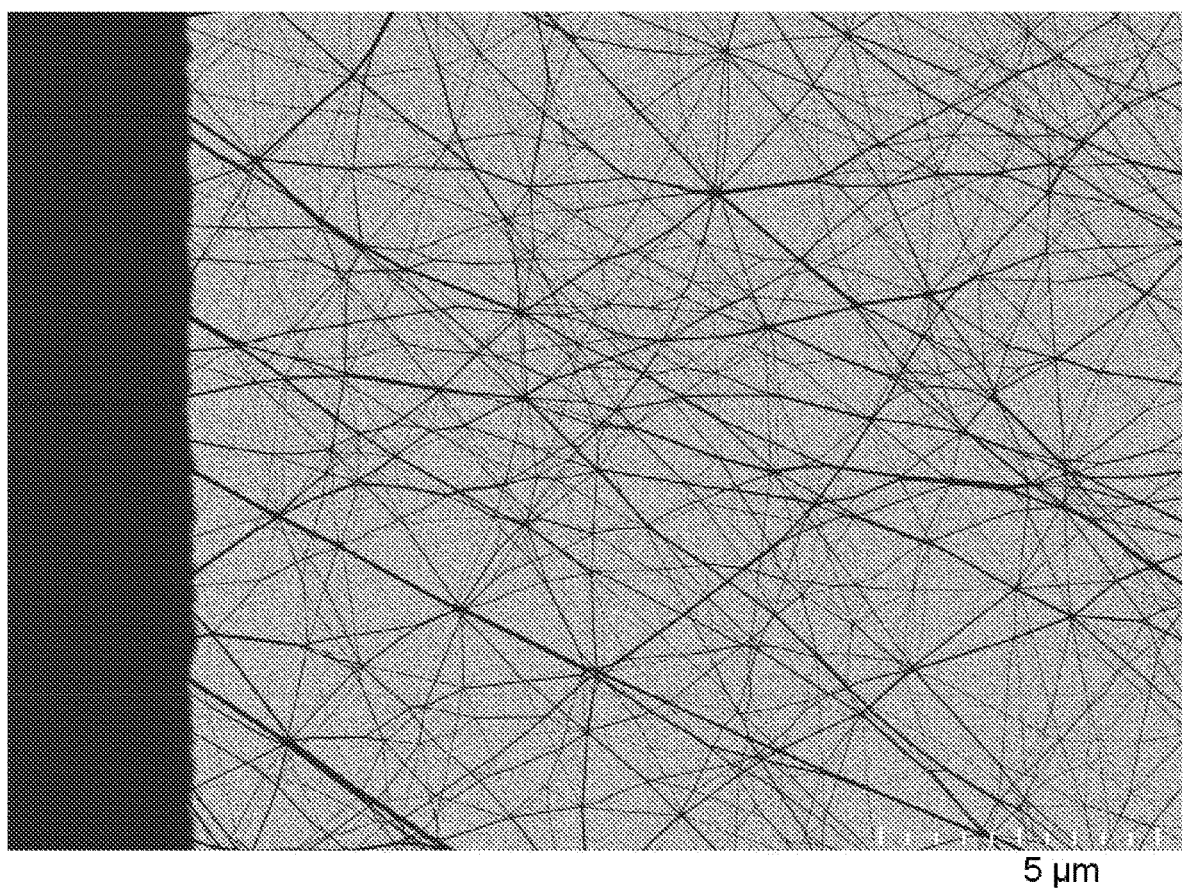
FIG. 17 is a STEM image of Sample E5E from Example 5 taken at 6,000× magnification with a full horizontal field width of approximately 21 microns in accordance with embodiments described herein.
Figure 18:
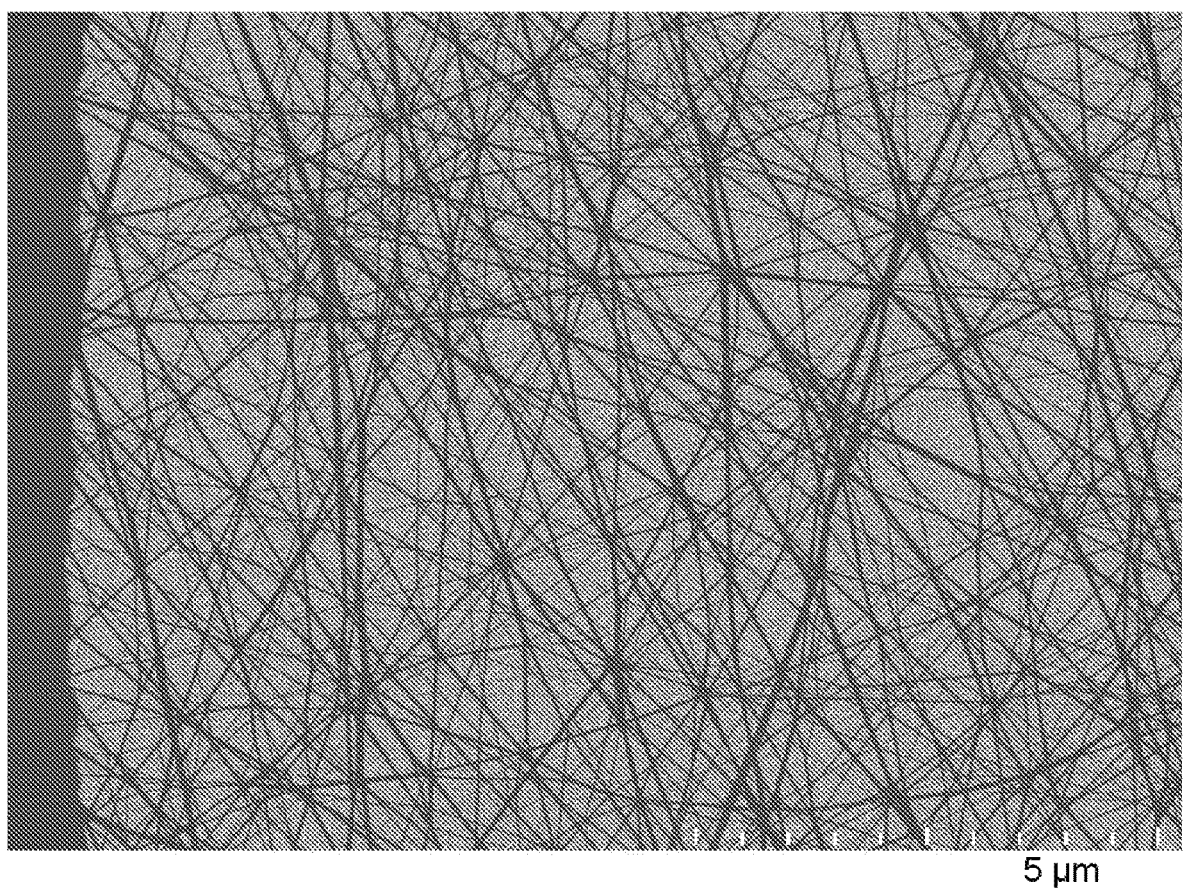
FIG. 18 is a STEM image of Sample E5F from Example 5 taken at 10,000× magnification with a full horizontal field width of approximately 12 microns in accordance with embodiments described herein.
Figure 19:
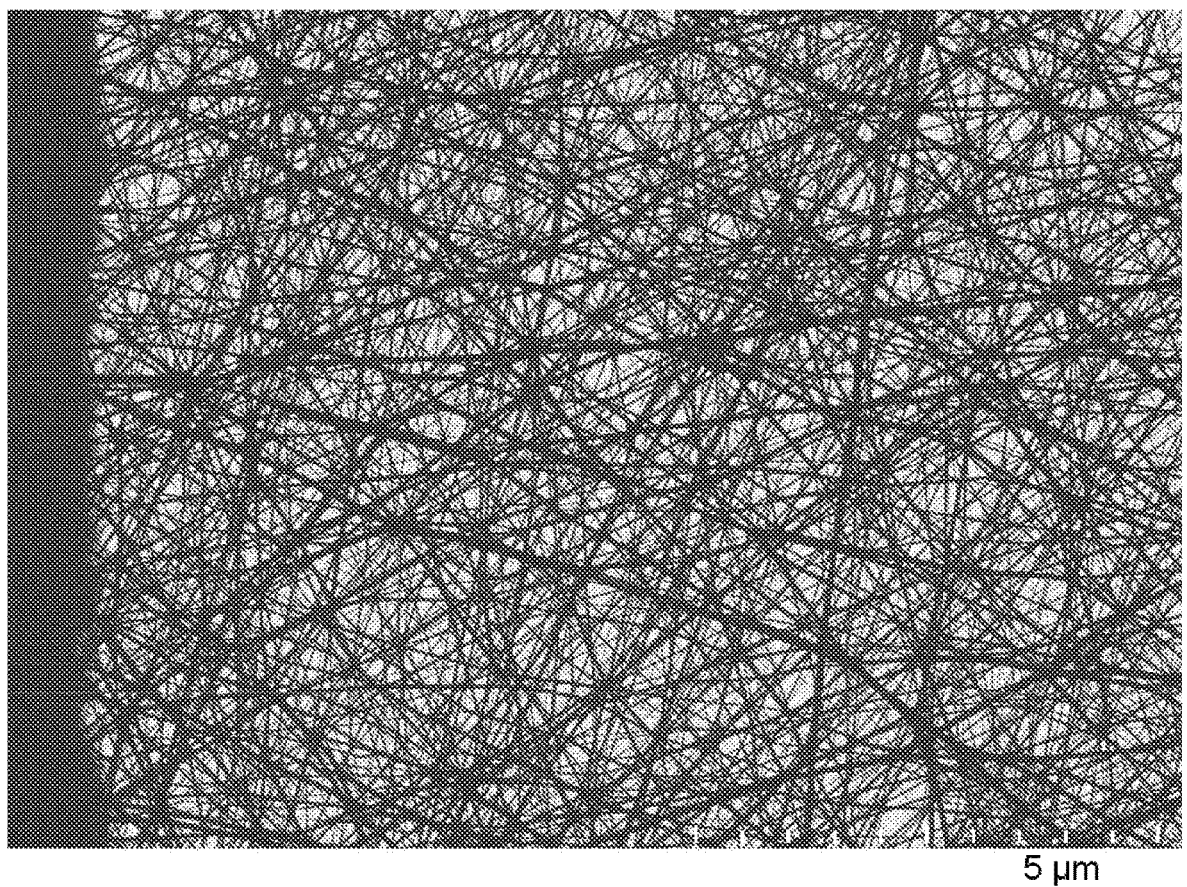
FIG. 19 is a STEM image of Sample E5G from Example 5 taken at 10,000× magnification with a full horizontal field width of approximately 12 microns in accordance with embodiments described herein.
Figure 20:
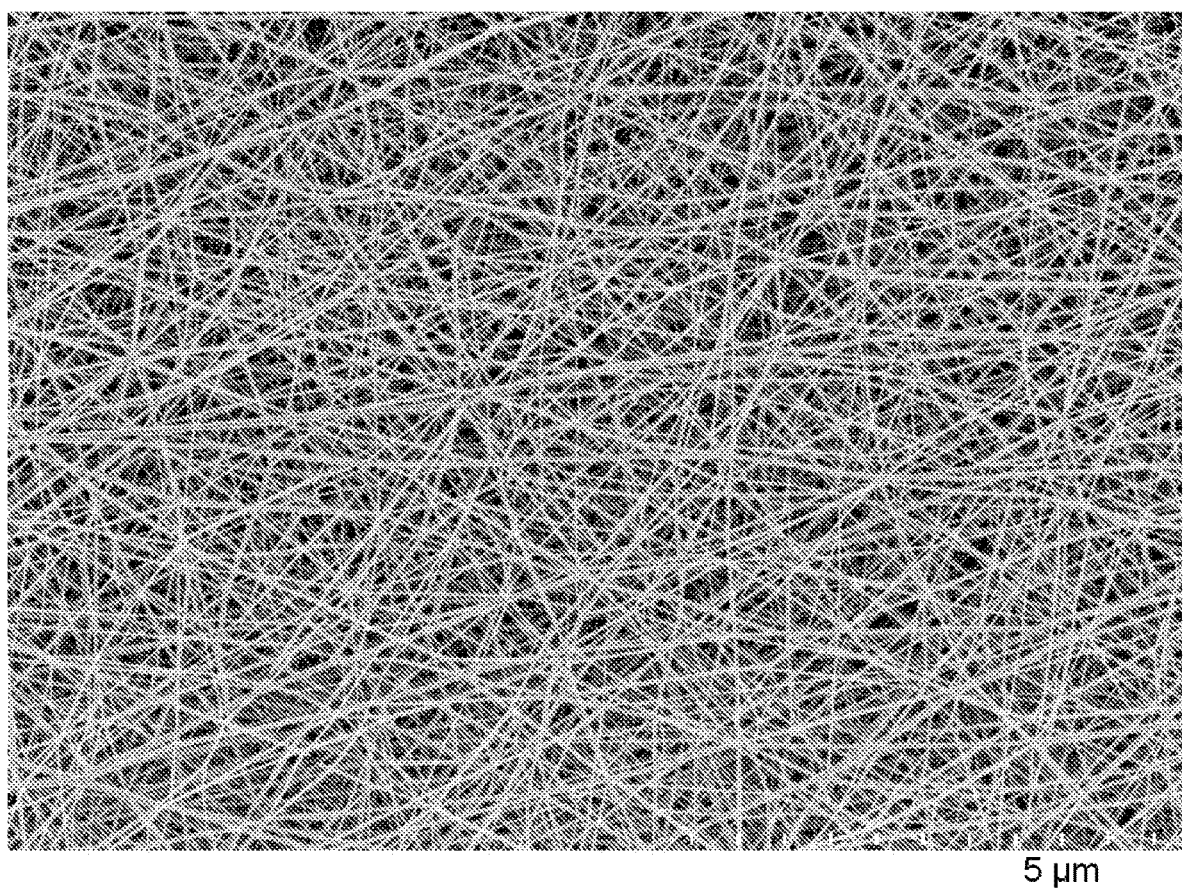
FIG. 20 is a scanning electron microscope (SEM) image of Sample E5H from Example 5 taken at 10,000× magnification with a full horizontal field width of approximately 21 microns in accordance with embodiments described herein.
Figure 21:
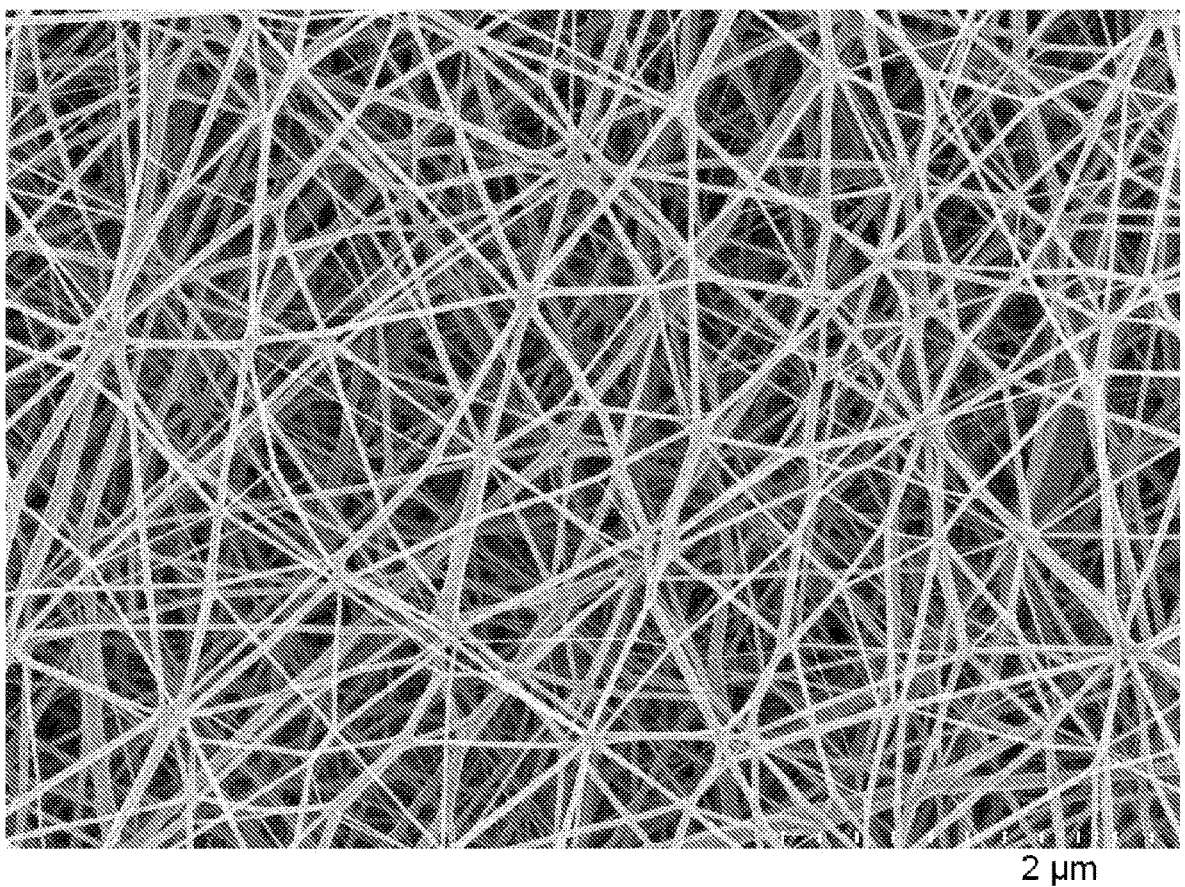
FIG. 21 is an SEM image of Sample E5I from Example 5 taken at 20,000× magnification with a full horizontal field width of approximately 6 microns in accordance with embodiments described herein.
Figure 22:
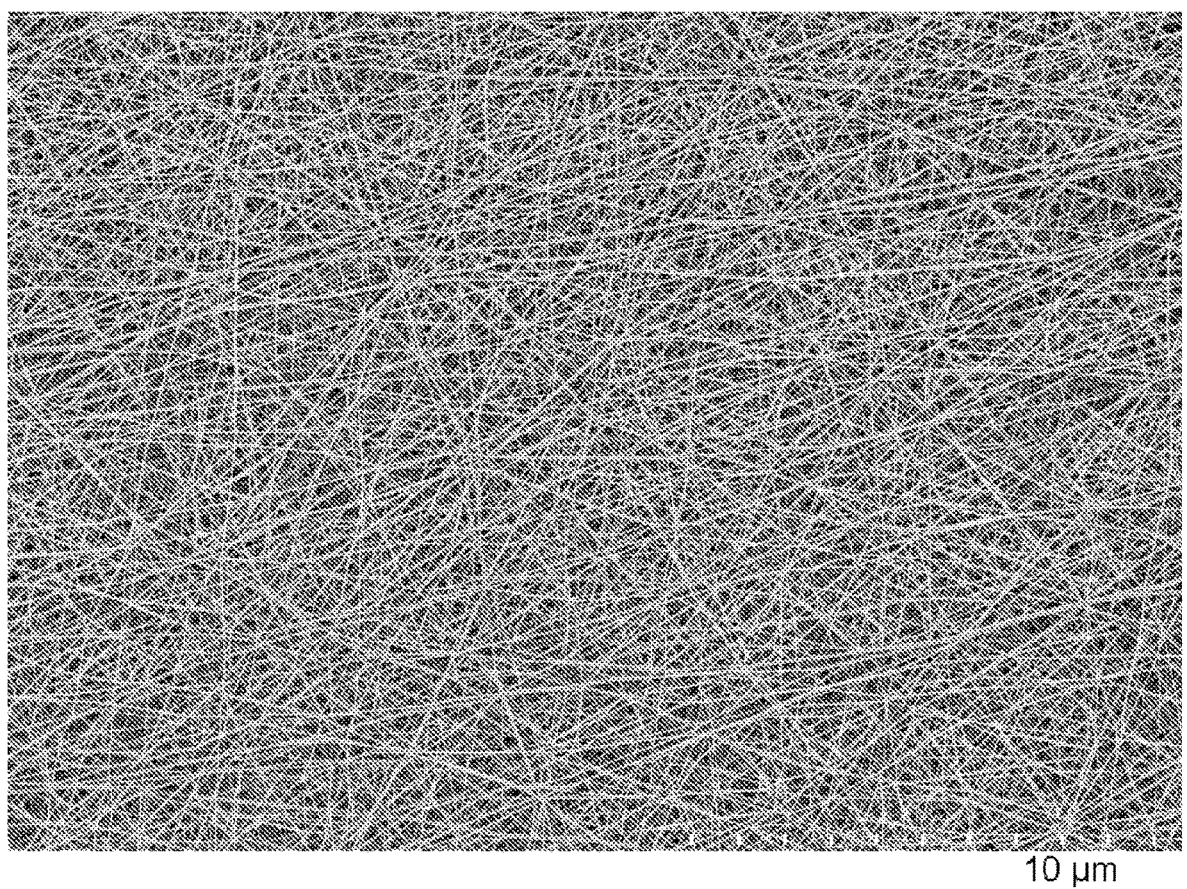
FIG. 22 is an SEM image of Sample E5H from Example 5 taken at 5,000× magnification with a full horizontal field width of approximately 25 microns in accordance with embodiments described herein.
Figure 23:
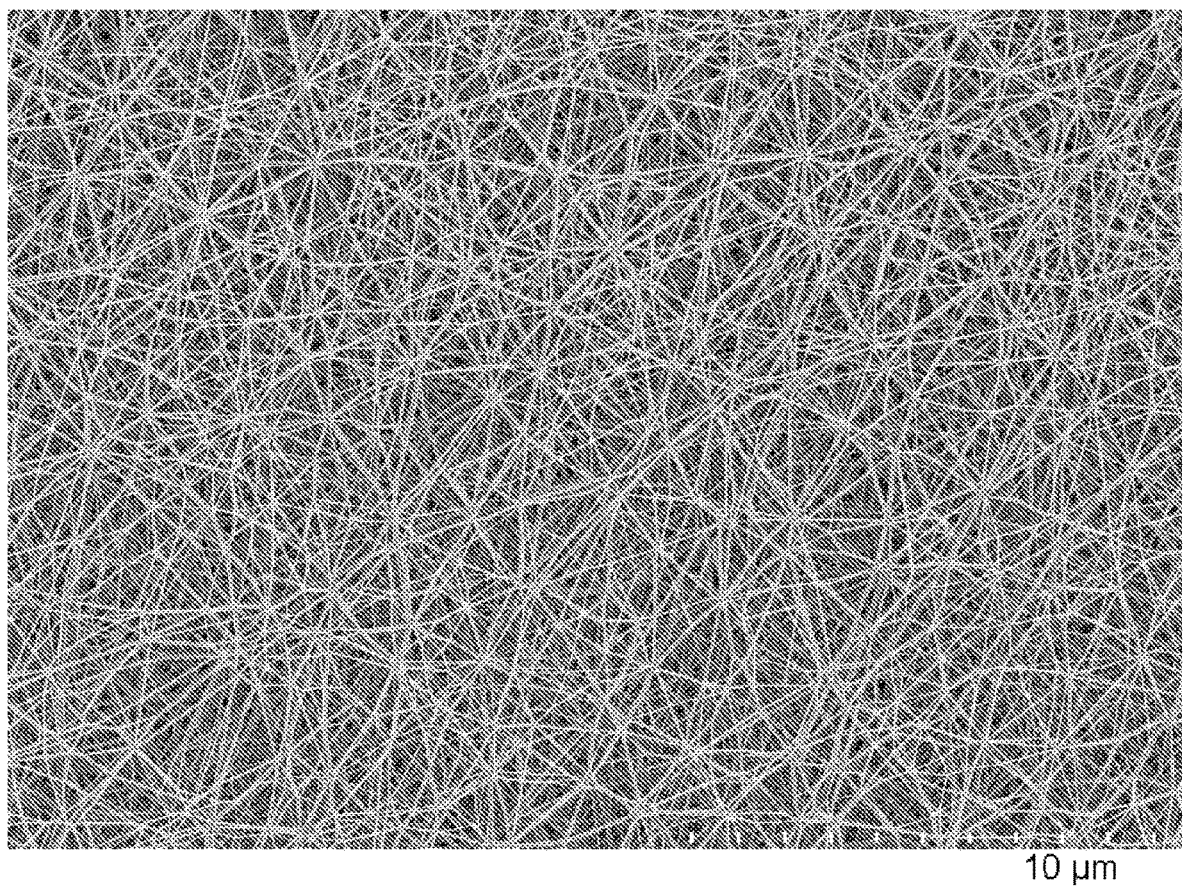
FIG. 23 is an SEM image of Sample E5I from Example 5 taken at 5,000× magnification with a full horizontal field width of approximately 25 microns in accordance with embodiments described herein.

| | | First Pass | | | | | | Second Pass | | | |
|---|---|---|---|---|---|---|---|---|---|---|---|
| | | | | | | Rate | | | | | |
| Sample | Temp[2] (° C.) | n | Time (s) | $\lambda_{1sp}$ | $\lambda_{2sp}$ | Input (%/s) | Rate Mode[1] | n | Time (s) | $\lambda_{1sp}$ | $\lambda_{2sp}$ |
| E5A (FIG. 13) | 300 | 1 | 120 | 4 | 4 | 36 | s | 1 | 120 | 10 | 10 |
| E5B (FIG. 14) | 300 | 2 | 120 | 4 | 4 | 36 | s | 4 | 120 | 10 | 10 |
| E5C (FIG. 15) | 300 | 2 | 120 | 4 | 4 | 36 | s | 8 | 120 | 10 | 10 |
| E5D (FIG. 16) | 300 | 2 | 120 | 4 | 4 | 36 | s | 16 | 120 | 10 | 10 |
| E5E (FIG. 17) | 300 | 2 | 120 | 4 | 4 | 36 | s | 4 | 120 | 10 | 10 |
| E5F (FIG. 18) | 300 | 2 | 120 | 4 | 4 | 36 | s | 8 | 120 | 10 | 10 |
| E5G (FIG. 19) | 300 | 2 | 120 | 4 | 4 | 36 | s | 16 | 120 | 10 | 10 |
| E5H (FIGS. 20 & 22) | 300 | 4 | 240 | 9 | 9 | 36 | s | 32 | 240 | 7 | 7 |
| E5I (FIGS. 21 & 23) | 300 | 4 | 240 | 7 | 7 | 36 | s | 48 | 240 | 7 | 7 |
| E5J | 300 | 4 | 240 | 9 | 9 | 36 | s | 32 | 240 | 6.35 | 6.35 |

| | Second Pass | | Third Pass | | | | | | | Heat | Treat. |
|---|---|---|---|---|---|---|---|---|---|---|---|
| Sample | Rate Input (%/s) | Rate Mode[1] | n[3] | Time (s) | $\lambda_{1sp}$ | $\lambda_{2sp}$ | Rate Input (%/s) | Rate Mode[1] | Heat Treat.[2] (° C.) | Treat. Time (s) | |
| E5A (FIG. 13) | 9 | s | 1 | 120 | 10 | 10 | 1 | r | na | na | |
| E5B (FIG. 14) | 9 | s | 4 | 120 | 10 | 10 | 1 | r | na | na | |
| E5C (FIG. 15) | 9 | s | 8 | 120 | 10 | 10 | 1 | r | na | na | |
| E5D (FIG. 16) | 9 | s | 16 | 120 | 10 | 10 | 1 | r | na | na | |
| E5E (FIG. 17) | 9 | s | 4 | 120 | 10 | 10 | 1 | r | 350 | 300 | |
| E5F (FIG. 18) | 9 | s | 8 | 120 | 10 | 10 | 1 | r | 350 | 300 | |
| E5G (FIG. 19) | 9 | s | 16 | 120 | 10 | 10 | 1 | r | 350 | 300 | |
| E5H (FIGS. 20 & 22) | 4 | s | 128 | 240 | 7 | 7 | 1 | r | na | na | |
| E5I (FIGS. 21 & 23) | 5 | s | 192 | 180 | 8 | 8 | 1 | r/s | 350 | 300 | |
| E5J | 4 | s | 128 | 240 | 7 | 7 | 1 | r | na | na | |

[1] "s" = constant speed; "r" = constant acceleration rate set point; "r/s"—constant acceleration rate step followed by constant speed step
[2] Set point;
[3] final number of layers in final pass.

TABLE 10

Fibril Width, Area Weighted Fibril Width, Specific Surface Area, and Bubble Point

| | Samples | | | | | | | | | |
|---|---|---|---|---|---|---|---|---|---|---|
| | E1H (FIGS. 11 & 12) | E5A | E5B | E5C | E5D | E5E | E5F | E5G | E5H | E5I |
| Fibril Width Mean (nm) | 18.7 | 16.7 | 19.3 | 19.9 | 19.2 | 25.8 | 22.7 | 27.1 | 37.4 | 31.9 |
| Standard Deviation | 10.4 | 7.7 | 10.2 | 9.9 | 7.2 | 14.3 | 13.9 | 14.9 | 14.1 | 10.5 |

TABLE 10-continued

Fibril Width, Area Weighted Fibril Width, Specific Surface Area, and Bubble Point

| | Samples | | | | | | | | | |
|---|---|---|---|---|---|---|---|---|---|---|
| | E1H (FIGS. 11 & 12) | E5A | E5B | E5C | E5D | E5E | E5F | E5G | E5H | E5I |
| Min(nm) | 4.9 | 2.9 | 7.2 | 5.2 | 6.4 | 8.1 | 2.5 | 7.2 | 18.1 | 10.3 |
| Max(nm) | 47.0 | 34.1 | 73.0 | 59.5 | 44.7 | 79.2 | 67.8 | 87.7 | 67.5 | 64.2 |
| Area Weighted Fibril Width (AWFW) (nm) | 24.4 | 19.9 | 24.7 | 24.8 | 21.9 | 33.7 | 31.2 | 35.3 | 42.7 | 35.4 |
| Ln mean (mu) | 2.78 | 2.66 | 2.87 | 2.89 | 2.89 | 3.12 | 2.91 | 3.17 | 3.55 | 3.41 |
| ln sigma | 0.53 | 0.55 | 0.42 | 0.43 | 0.36 | 0.49 | 0.71 | 0.51 | 0.37 | 0.33 |
| mu (nm) | 16.19 | 14.29 | 17.6 | 17.99 | 17.98 | 22.7 | 18.27 | 23.82 | 34.93 | 30.26 |
| Median (nm) | 16.17 | 14.60 | 17.7 | 16.23 | 17.83 | 22.3 | 18.70 | 24.63 | 34.96 | 30.63 |
| Specific Surface Area ($m^2$/g) (AWFW) | 71 | 87 | 70 | 70 | 79 | 52 | 56 | 49 | 41 | 49 |
| Specific Surface Area ($m^2$/g) (Median) | 108 | 119 | 98 | 107 | 98 | 78 | 93 | 71 | 50 | 57 |
| Mass per Area (g/$m^2$) | | 0.0038 | 0.0158 | 0.0363 | 0.0460 | 0.0103 | 0.0231 | 0.0332 | 0.771 | 2.132 |
| Air Resistance (Pas/m) | na | 125 | 317 | 1225 | 1933 | 202 | 276 | 432 | 22026 | 28695 |
| dP (Pa) | na | 5 | 20 | 125 | 125 | 22 | 45 | 75 | 125 | 125 |
| PMI Parameter Bubflow (mL/min) | na | na | 10 | 10 | 10 | 10 | 10 | 10 | na | 127 |
| Bubble Point [BPP] psi (MPa) | na | na | 4.2 (0.029) | 8.2 (0.057) | 40.6 (0.280) | na | 2.2 (0.015) | 14.9 (0.103) | na | 80.1 (0.552) |
| mg/$m^2$/layer | | 3.8 | 4.0 | 4.5 | 2.9 | 2.6 | 2.9 | 2.1 | 6.0 | 11.1 |
| # of layers (n) | 1 | 1 | 4 | 8 | 16 | 4 | 8 | 16 | 128 | 192 |
| Heat Treatment Used (yes/no) | n | n | n | n | n | y | y | y | n | y |

Bubble Point [BPP] psi (MPa) E5J = 129 psi (0.889 MPa)

Example 6

The following example discloses the production of ePTFE membranes and the measurement of various membrane parameters including: Quality Factor, airflow resistance, areal density, particle capture efficiency and penetration. Air filtration performance was measured as described in Test Methods section.

PTFE fine powder (E.I DuPont de Nemours) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. The dry tape was cut in to 98 mm squares. A summary of the process parameters used in Example 6 is provided in Table 11.

First Pass

Using a pantograph machine, a single (E6A-C) layer or up to four (E6D) squares of tape were layered and heated in an oven set to 300° C. for a target of 120 (E6A-C) or 240 (E6D) seconds and then expanded in the longitudinal direction and transverse directions simultaneously at a selected target ratio ($\lambda_{sp}$) of 4:1, 7:1, or 9:1 in each direction while maintaining a temperature of about 300° C. The average engineering strain rate target was set to 36%/second. The pantograph opened at a constant velocity target for approximately 8.3, 16.6, or 22 seconds based on the target ratio (Table 11). The ePTFE membrane was allowed to cool to room temperature (~22° C.) under restraint of the pantograph.

Second Pass

Samples were harvested from the cooled membrane for further expansion, i.e. a second pass. The specific number of ePTFE membranes loaded for the second pass of each sample is provided in Table 11. Using the same pantograph machine, stacks of ePTFE membranes were heated in an oven set to 300° C. for a target of 120 (E6A-C) or 240 (E6D) seconds and then expanded in the longitudinal direction and transverse directions simultaneously at selected target ratio of 7:1 or 10:1 in each direction while maintaining a temperature of about 300° C. The average engineering strain rate target was 5%/s, 9%/s or 4%/s (Table 11). The pantograph opened at a constant velocity target for approximately 120 (E6A-B), 100 (E6C) and 150 (E6D) seconds. The expanded membrane was allowed to cool to room temperature (~22° C.) under restraint of the pantograph.

Third Pass

Samples were harvested from the cooled membrane and layered if needed for further expansion, i.e. a third pass. Using the same pantograph machine, the membrane was again heated in an oven set to 300° C. for a target of 120 (E6A-C) or 240 (E6D) seconds and then expanded in the longitudinal direction and transverse direction simultaneously at target ratios of 8:1 (E6A-B), 10:1 (E6C) or 7:1 (E6D) in both longitudinal and transverse directions while maintaining a temperature of about 300° C. The average strain rate target was 1%/s. The pantograph opened at a constant acceleration rate set point for approximately 208 (E6A-B), 230 (E6C) or 195 (E6D) seconds. Two samples, E6B and E6D were exposed to heat approximately 350° C. for 5 minutes. The expanded membrane was allowed to cool to room temperature (~22° C.) under restraint of the pantograph.

Figure 24:
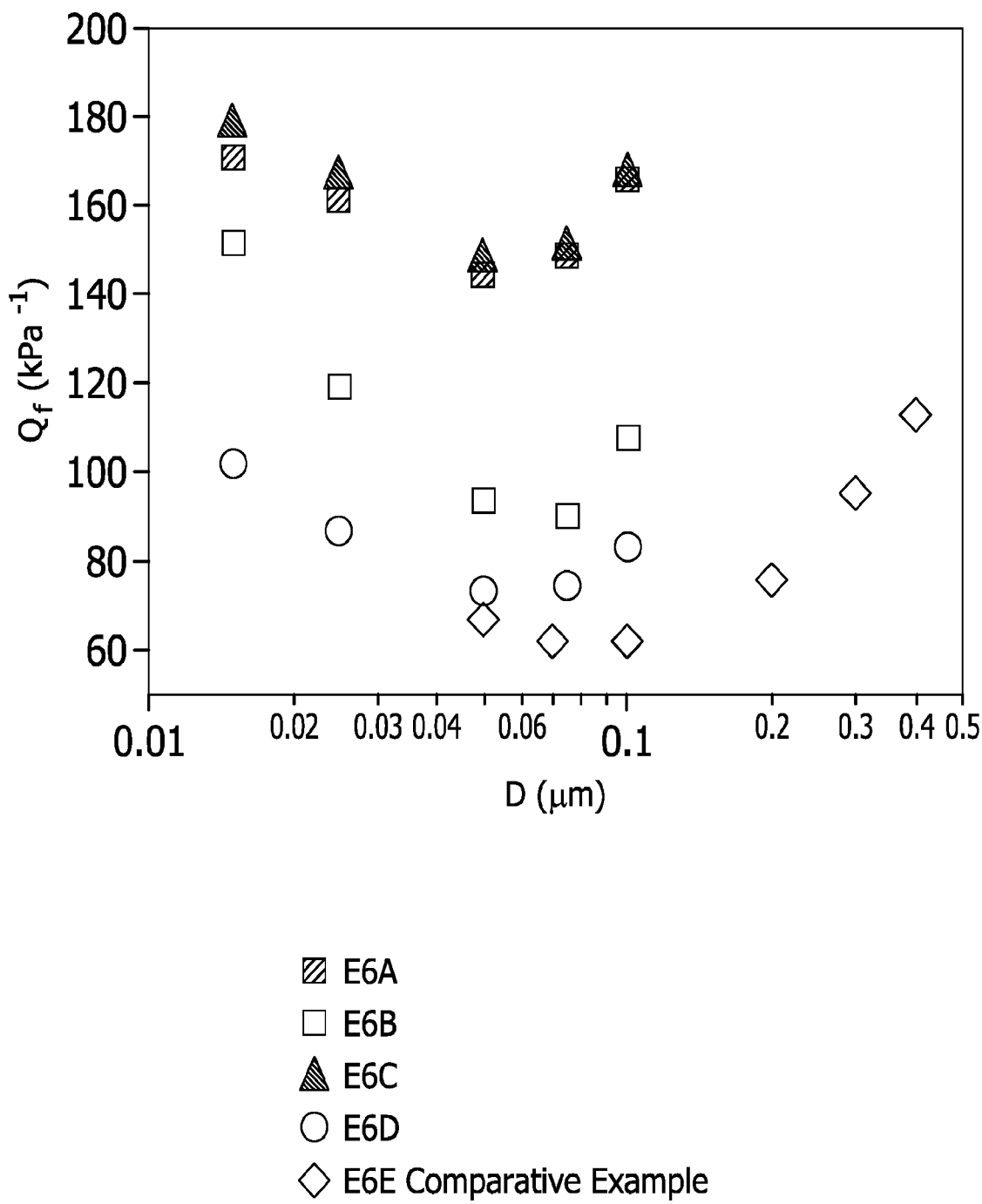
FIG. 24 is a graphical illustration of the quality factor vs. the particle diameter for Samples E6A, E6B, E6D, and E6E from Example 6 in accordance with embodiments described herein.

Samples of the ePTFE membrane were harvested from the machine onto (152.4 mm×152.4 mm) adhesive backed for further testing. Samples were tested for air flow resistance and filtration efficiency as described in the Test Method section. The air filtration results are provided in Table 12. A plot of particle diameter versus quality factor ($Q_f$) for samples E6A, E6B, E6C, E6D, and E6E (Comparative Example 1) is provided as FIG. 24. FIG. 24 shows the improvement in quality factor for Samples E6A through E6D relative to the comparative example, E6E.

Figure 25:
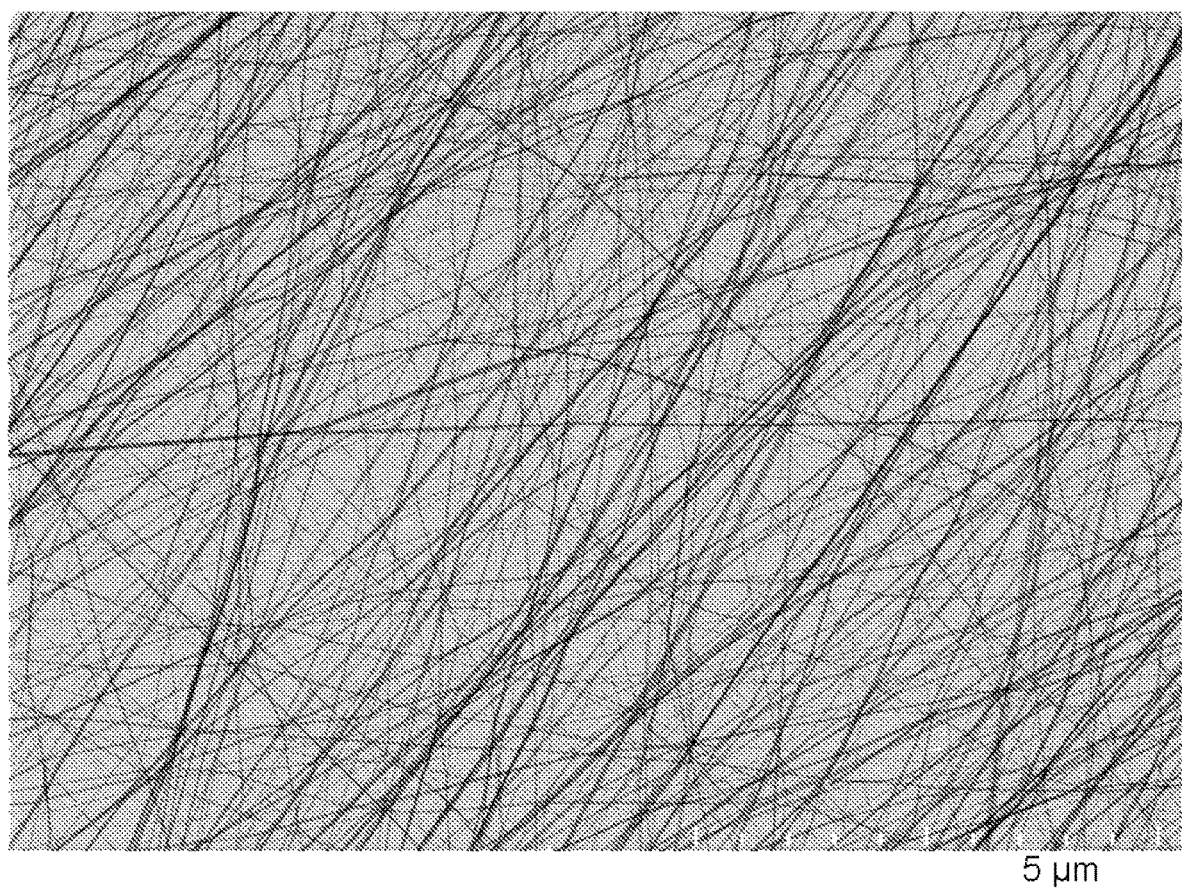
FIG. 25 is a STEM image of Sample E6A from Example 6 taken at 10,000× magnification with a full horizontal field width of approximately 12 microns in accordance with embodiments described herein.
Figure 26:
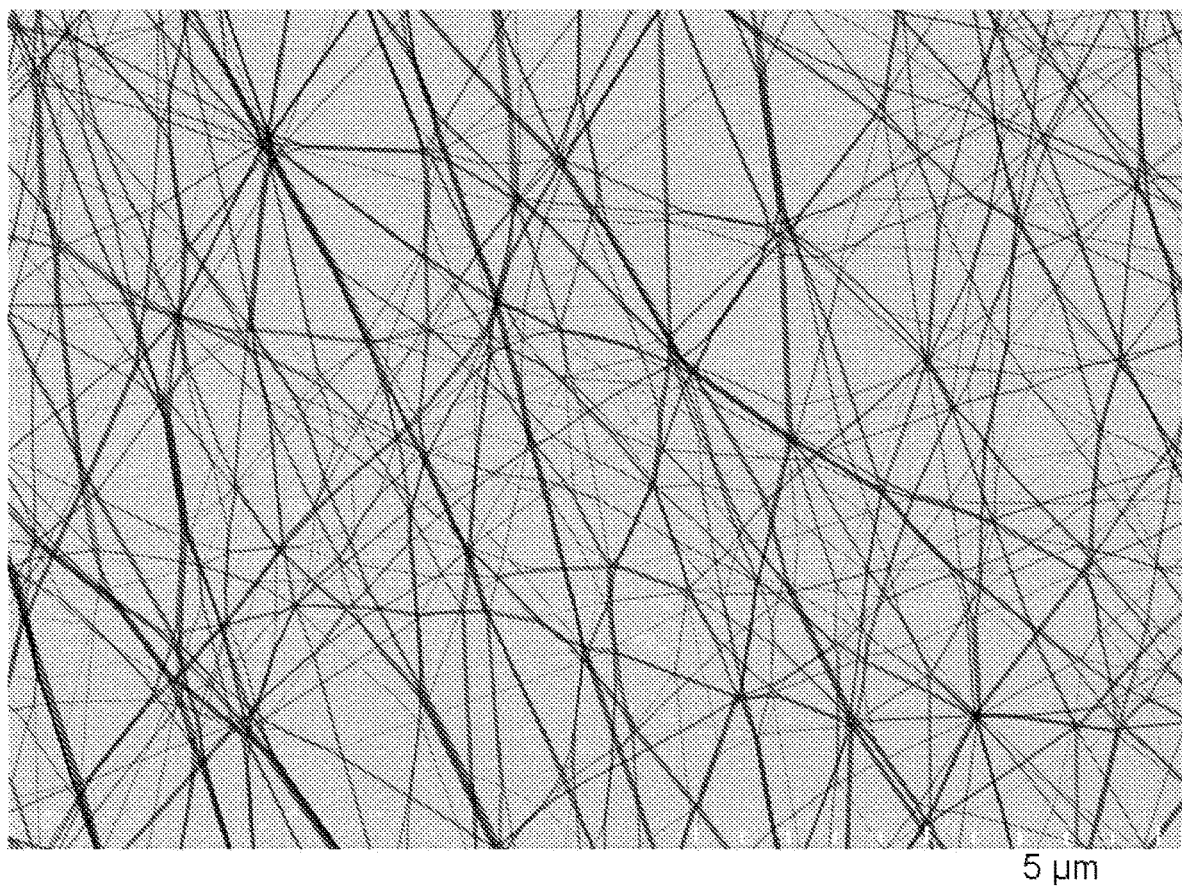
FIG. 26 is a STEM image of Sample E6B from Example 6 taken at 10,000× magnification with a full horizontal field width of approximately 12 microns in accordance with embodiments described herein
Figure 27:
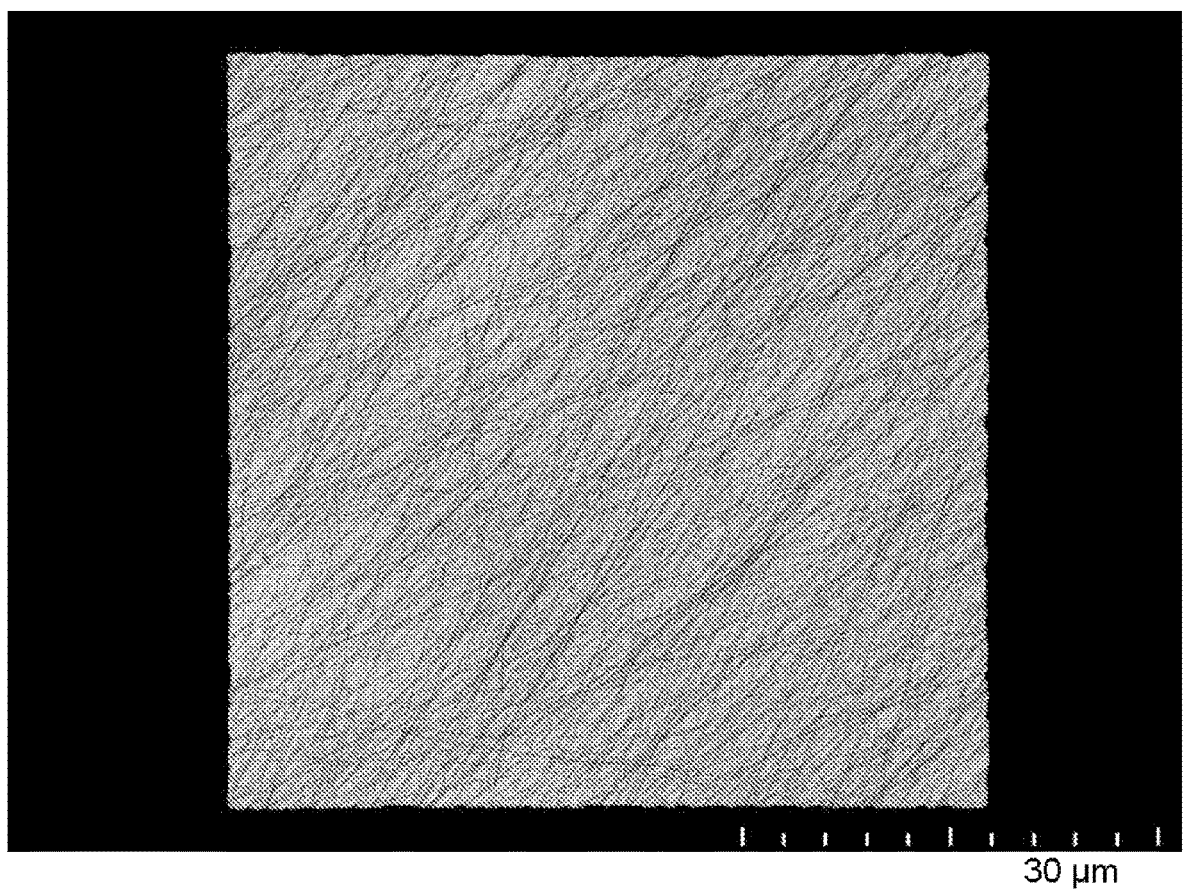
FIG. 27 is a STEM image of Sample E6A from Example 6 taken at 1500× magnification with a full horizontal field width of approximately 84 microns in accordance with embodiments described herein.
Figure 28:
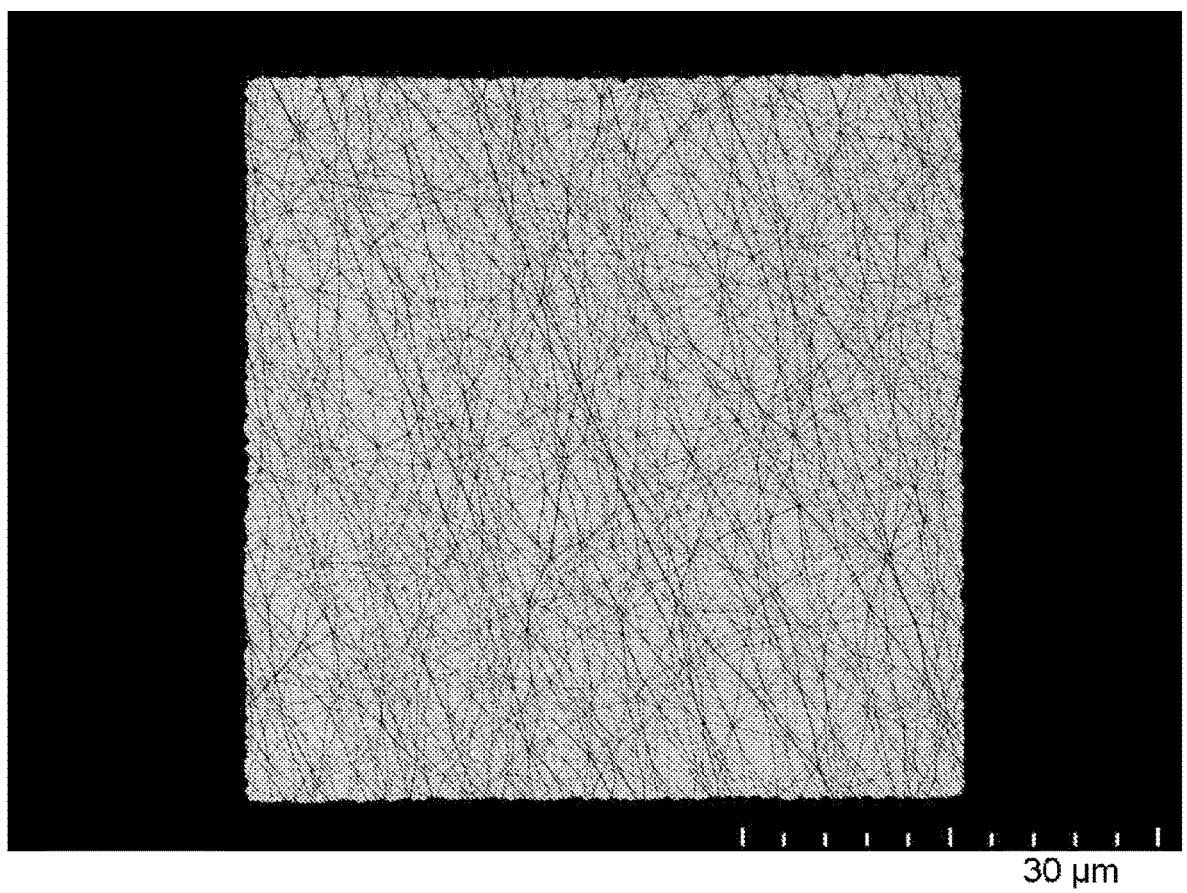
FIG. 28 is a STEM image of Sample E6B from Example 6 taken at 1500× magnification with a full horizontal field width of approximately 84 microns in accordance with embodiments described herein.

The ePTFE samples were cut free from the tape and weighed on a Mettler Toledo AT 20. The fibril width was measured for Samples E6A and E6B and shown in FIGS. 25 and 26. FIGS. 27 and 28 show Samples E6A and E6B at lower magnification, respectively. Fibril width measurement results are provided in Table 13.

Comparative Example 1

An ePTFE membrane was manufactured according to the general teachings described in U.S. Pat. No. 3,953,566 to Gore. The ePTFE membrane (Sample E6E) had a mass per area of 5.6 g/m$^2$, an air flow resistance of 6.68 mm H20, and a particle capture efficiency of 98.344% for 0.1 micron DOP challenge particles tested with a face velocity of 5.33 cm/s (Table 12).

TABLE 11

Process parameters for Example 6

| | | First Pass | | | | | | Second Pass | | |
|---|---|---|---|---|---|---|---|---|---|---|
| | | | | | | Rate | | | | |
| Sample (FIG.) | Temp (° C.)[2] | n | Time (s) | $\lambda_{1sp}$ | $\lambda_{2sp}$ | Input (%/s) | Rate Mode[1] | n | Time (s) | $\lambda_{1sp}$ | $\lambda_{2sp}$ |
| E6A (FIGS. 24 & 26) | 300 | 1 | 120 | 7 | 7 | 36 | s | 4 | 120 | 7 | 7 |
| E6B (FIGS. 25 & 27) | 300 | 1 | 120 | 7 | 7 | 36 | s | 4 | 120 | 7 | 7 |
| E6C | 300 | 1 | 120 | 4 | 4 | 36 | s | 1 | 120 | 10 | 10 |
| E6D | 300 | 4 | 240 | 9 | 9 | 36 | s | 16 | 240 | 7 | 7 |

| | Second Pass | | Third Pass | | | | | | |
|---|---|---|---|---|---|---|---|---|---|
| Sample (FIG.) | Rate Input (%/s) | Rate Mode[1] | n[3] | Time (s) | $\lambda_{1sp}$ | $\lambda_{2sp}$ | Rate Input (%/s) | Rate Mode[1] | Heat Treat? |
| E6A (FIGS. 24 & 26) | 5 | s | 4 | 120 | 8 | 8 | 1 | r | n |
| E6B (FIGS. 25 & 27) | 5 | s | 4 | 120 | 8 | 8 | 1 | r | y |
| E6C | 9 | s | 3 | 120 | 10 | 10 | 1 | r | n |
| E6D | 4 | s | 16 | 240 | 7 | 7 | 1 | r | y |

[1]"s" = constant speed; "r" = constant acceleration rate set point;
[2]Set point;
[3]final number of layers in final pass.

TABLE 12

Air Filtration Data

| | Sample | | | | |
|---|---|---|---|---|---|
| | E6A | E6B | E6C | E6D | E6E (Comparative Example 1) |
| Mass per area (g/m$^2$) | 0.0320 | 0.0290 | 0.0330 | 0.0925 | 5.6000 |
| Air Resistance (Pa s/m) | 955 | 280 | 804 | 1273 | 1248 |
| MPA/Layer (mg/m$^2$/n) | 8.00 | 7.25 | 11.00 | 5.78 | 5600 |
| Number of layers (n) | 4 | 4 | 3 | 16 | 1 |
| Heat treatment | n | y | n | y | na |

TABLE 12-continued

Air Filtration Data

| | Sample | | | | |
|---|---|---|---|---|---|
| | E6A | E6B | E6C | E6D | E6E (Comparative Example 1) |
| Pressure Drop (mm H2O) | 5.198 | 1.522 | 4.363 | 7.204 | 6.784 |
| Penetration % (0.1 μm) | 0.056 | 24.877 | 0.150 | 0.552 | 1.656 |

TABLE 12-continued

Air Filtration Data

| | Sample | | | | |
|---|---|---|---|---|---|
| | E6A | E6B | E6C | E6D | E6E (Comparative Example 1) |
| E (%) | 99.944 | 75.123 | 99.850 | 99.448 | 98.344 |
| QF @ 5.33 cm/s with 0.1 μm (kPa$^{-1}$) | 147 | 93 | 152 | 74 | 62 |

TABLE 13

Fibril Properties

| | Sample | |
|---|---|---|
| | E6A | E6B |
| Mean (nm) | 18.3 | 35.2 |
| Standard Deviation | 8.2 | 21.3 |
| Min (nm) | 3.5 | 7.7 |
| Max (nm) | 40.8 | 101.0 |
| Area Weighted Fibril Width (nm) | 22.0 | 48.1 |
| Ln mean (mu) | 2.80 | 3.39 |
| ln sigma | 0.49 | 0.59 |
| mu nm | 16.46 | 29.68 |
| Median (nm) | 17.47 | 29.67 |
| Specific Surface Area (m$^2$/g) (AWFW) | 79 | 36 |
| Specific Surface Area (m$^2$/g) (Median) | 100 | 59 |

Example 7

The following example discloses the production of ePTFE membranes subsequently used for optical transmittance measurements.

PTFE fine powder (E.I DuPont de Nemours) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. The dry tape was cut into 98 mm squares. A summary of the process parameters used in Example 7 is provided in Table 14.

First Pass

Using a pantograph machine, one or four squares of tape were heated in an oven set to 300° C. for a target of 240 (E7A) or 120 (E7B) seconds then expanded in the longitudinal direction and transverse directions simultaneously at various target ratios (Table 13). The average engineering strain rate target was determined for samples E7A and E7B (Table 13). The pantograph opened at a constant velocity target for approximately 16.6 (E7A) or 8.4 (E7B) seconds. The ePTFE membrane was allowed to cool to room temperature (~22° C.) under restraint of the pantograph.

Second Pass

Samples were harvested from the cooled ePTFE membrane for further expansion, i.e. a second pass. Using the same pantograph machine, a single layer (E7B) or a stack of 16 layers (E7A) were heated in an oven set to 300° C. for a target of 120 (E7B) or 240 (E7A) seconds then expanded in the longitudinal direction and transverse directions simultaneously at a target ratio of 7:1 (E7A) or 10:1 (E7B) in each direction while maintaining a temperature of about 300° C. The average engineering strain rate target was set to 5%/s (E7A) or 9%/s (E7B). The pantograph opened at a constant velocity target for approximately 120 (E7A) or 100 (E7B) seconds. The ePTFE membrane was allowed to cool to room temperature (~22° C.) under restraint of the pantograph.

Third Pass

Samples were harvested from the cooled ePTFE membrane and stacked as needed for further expansion, i.e. a third pass. Using the same pantograph machine, a 3 layer (E7B) and a 48 (E7A) layer sample were heated in an oven set to 300° C. for a target of 120 seconds then expanded in the longitudinal direction and transverse directions simultaneously at a target ratio of 7:1 (E7B) or 8:1 (E7A) (Table 14) in each direction, while maintaining a temperature of about 300° C. The average strain rate target was set to 1%/s. The pantograph opened at a constant acceleration rate set point for approximately 208 (E7A) or 195 (E7B) seconds. The ePTFE membrane was allowed to cool to room temperature (~22° C.) under restraint of the pantograph.

Figure 29:
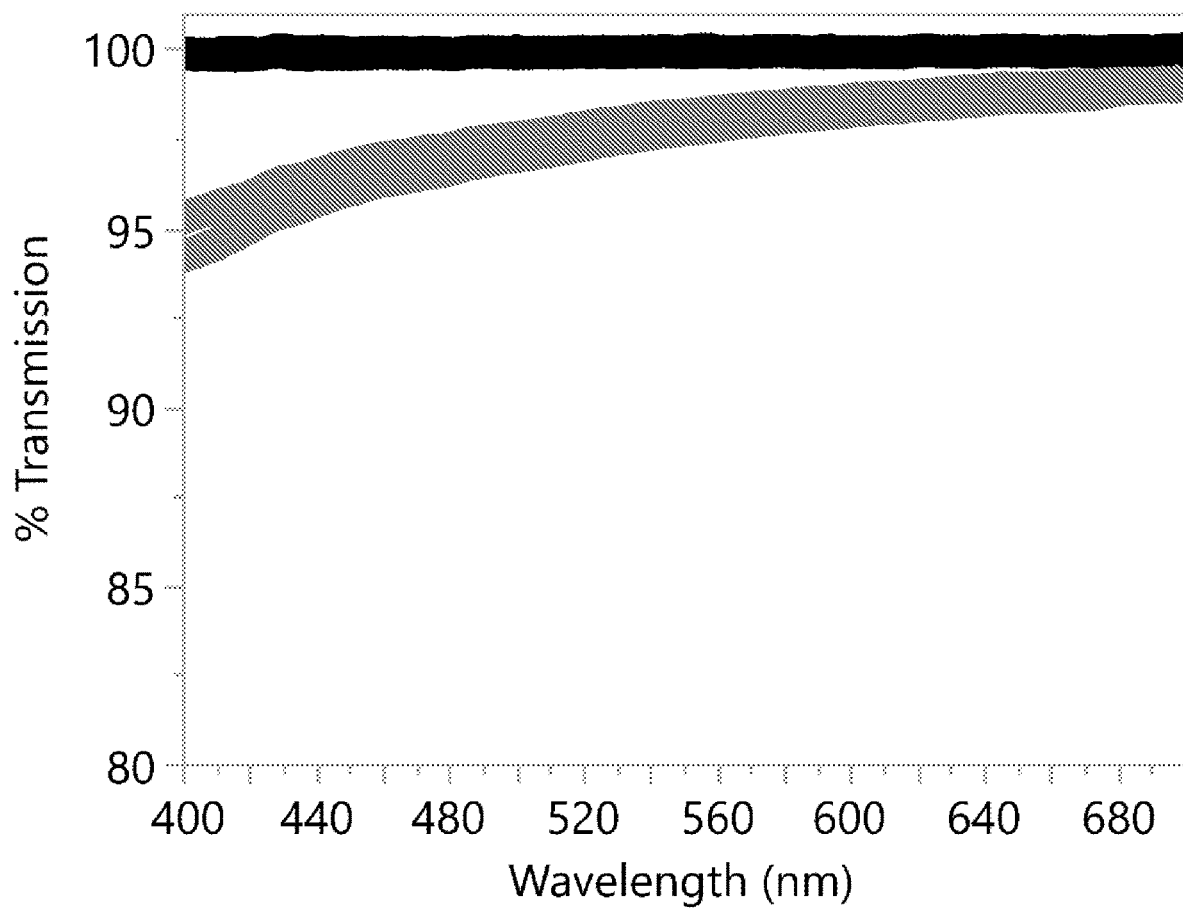
FIG. 29 is a graphical illustration of % transmission vs. wavelength for Sample E7A (grey line; 48 layers) and Sample E7B (black line; 3 layers) in accordance with embodiments described herein.

The ePTFE membranes were harvested from the machine onto (152.4 mm×152.4 mm) adhesive backed frames for further testing. Samples were tested for air flow resistance as described in the Test Method section. The ePTFE membrane was cut free from the tape and weighed on a Mettler Toledo AT 20. Selected samples were also tested for optical transmission as described in the Test Method section. The results of optical transmission testing are provided in Table 15 and FIG. 29. FIG. 29 is a plot of wavelength vs. % transmission for both a 3-layer sample (E7B; black line) and a 48-layer sample (E7A; grey line).

TABLE 14

Process parameters for Example 7

| | First Pass | | | | | | | | Second Pass | |
|---|---|---|---|---|---|---|---|---|---|---|
| | | | | | | Rate | Rate | | | |
| Sample (FIG.) | Temp$^2$ (° C.) | n | Time (s) | $\lambda_{1sp}$ | $\lambda_{2sp}$ | Input 1 (%/s) | Input 2 (%/s) | Rate Mode$^1$ | n | Time (s) |
| E7A (FIG. 29 - grey line) | 300 | 4 | 240 | 7 | 7 | 36 | 36 | s | 16 | 240 |
| E7B (FIG. 29 - black line) | 300 | 1 | 120 | 3.38 | 4.79 | 28.5 | 44.8 | s | 1 | 120 |

| | Second Pass | | | | Third Pass | | | | | |
|---|---|---|---|---|---|---|---|---|---|---|
| | | | Rate Input (%/s) | Rate Mode$^1$ | | | | | Rate Input (%/s) | Rate Mode$^1$ |
| Sample (FIG.) | $\lambda_{1sp}$ | $\lambda_{2sp}$ | | | n$^3$ | Time (s) | $\lambda_{1sp}$ | $\lambda_{2sp}$ | | |
| E7A (FIG. 29 - grey line) | 7 | 7 | 5 | s | 48 | 120 | 8 | 8 | 1 | r |

TABLE 14-continued

Process parameters for Example 7

| E7B (FIG. 29 - black line) | 10 | 10 | 9 | s | 3 | 120 | 7 | 7 | 1 | r |

[1]"s" = constant speed; "r" = constant acceleration rate set point;
[2]Set point;
[3]final number of layers in final pass.

TABLE 15

Optical Measurements for Example 7

| | Sample | |
|---|---|---|
| | E7A | E7B |
| MPA (g/m$^2$) | 0.4388 | 0.0237 |
| Air Resistance (Pa s/m) | 10606 | 726 |
| mg/m$^2$/layer | 9.1 | 7.9 |
| Layers (n) | 48 | 3 |
| Heat Treatment | n | n |
| Total Luminous % Transmittance (380-780 nm) | 98.0 | 99.9 |
| UVA % Transmittance (315-400 nm) | 92.7 | 99.8 |
| UVB % Transmittance (280-315 nm) | 88.5 | 99.6 |

Example 8

This example highlights the enhanced strength to weight ratio for relatively balanced ePTFE membranes consisting of extremely slender and similar fibrils exhibiting exceptionally high crystallinity index that is at least 94%. Stacking and co-expansion was employed to generate ample mass for bulk mechanical characterization and to reduce the time in the synchrotron for structural characterization. The amorphous content and relative strength balance was determined using x-ray diffraction (XRD).

PTFE fine powder (DuPont) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. The dry tape was cut in to 98 mm squares. A summary of the process parameters used in this example is provided in Table 16.

First Pass

Using a pantograph machine, up to four squares of tape were heated in an oven set to 300° C. (Samples E8A and E8B) or 322° C. (Samples E8C and E8D) for a target of 240 seconds and then expanded in the longitudinal direction and transverse directions simultaneously at a target ratio of either 7:1 (E8C-D) or 9:1 (E8A-B) in each direction (Table 16). The average engineering strain rate target was set to 36%/s. The pantograph opened at a constant velocity target for approximately 16.6 (E8C-D) and 22.2 (E8A-B) seconds. The ePTFE membrane was allowed to cool to room temperature (~22° C.) under restraint of the pantograph.

Second Pass

Samples were harvested from the cooled ePTFE membrane for further expansion, i.e. a second pass. Table 16 lists the specific number of layers loaded for the second pass of each condition. Using the same pantograph machine, samples having 16 (E8B) or 32 (E8A and E8C-D) layers were heated in an oven set to 300° C. (E8A-B) or 322° C. (E8C-D) for a target of 240 seconds and then expanded in the longitudinal direction and transverse directions simultaneously at a ratio 7:1 each in direction while maintaining the set point temperature. The average engineering strain rate target was 4%/s (E8A-B) or 5%/s (E8C-D) (Table 16). The pantograph opened at a constant velocity target for approximately 150 (E8A-B) or 120 (E8C-D) seconds. The expanded membrane was allowed to cool to room temperature (-22° C.) under restraint of the pantograph.

Third Pass

Samples were harvested from the ePTFE membrane and stacked if needed for further expansion, i.e. a third pass. Using the same pantograph machine, the ePTFE membrane (using 64 (E8B) or 128 (E8A and E8C-D) layers) was again heated in an oven set to 300° C. (E8A-B) or 322° C. (E8C-D) for a target of 120 (E8C-D) or 240 (E8A-B) seconds, respectively, and then expanded in the longitudinal direction and transverse directions simultaneously at a ratio target of 7:1 (E8A-B) or 8:1 (E8C-D) in each direction while maintaining the set point temperature (Table 16). The average strain rate target was 1%/s. The pantograph opened at a constant acceleration rate target for approximately 195 (E8A-B) or 208 (E8C-D) seconds. Samples E8B and E8D were thermally conditioned in an oven at a set point of 350° C. for a target of 300 seconds while restrained on the pantograph. The ePTFE membrane was allowed to cool to room temperature (~22° C.) under restraint of the pantograph.

Figure 30:
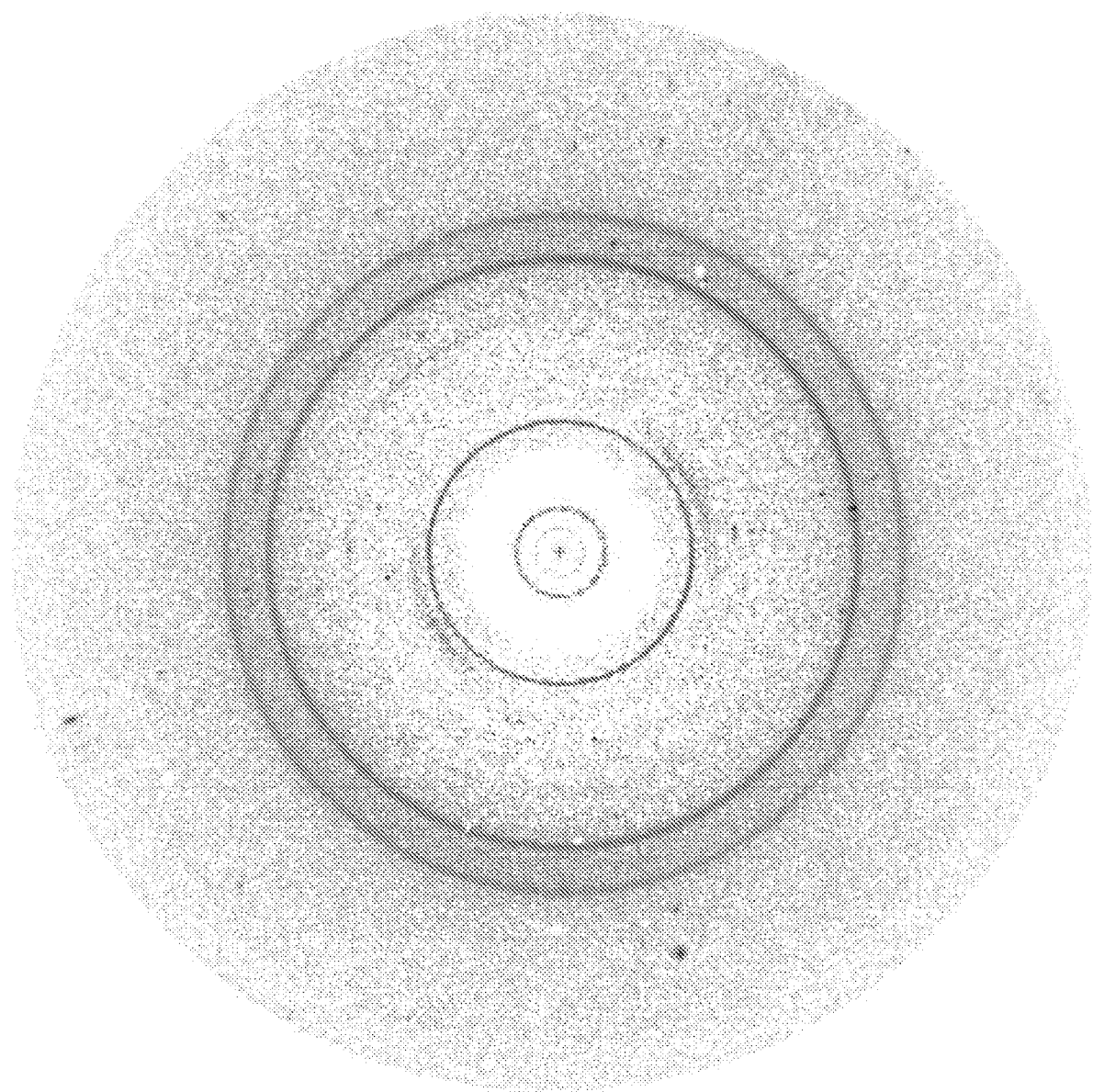
FIG. 30 is an x-ray diffraction (XRD) pattern for Sample E8C from Example 8 in accordance with embodiments described herein.
Figure 31:
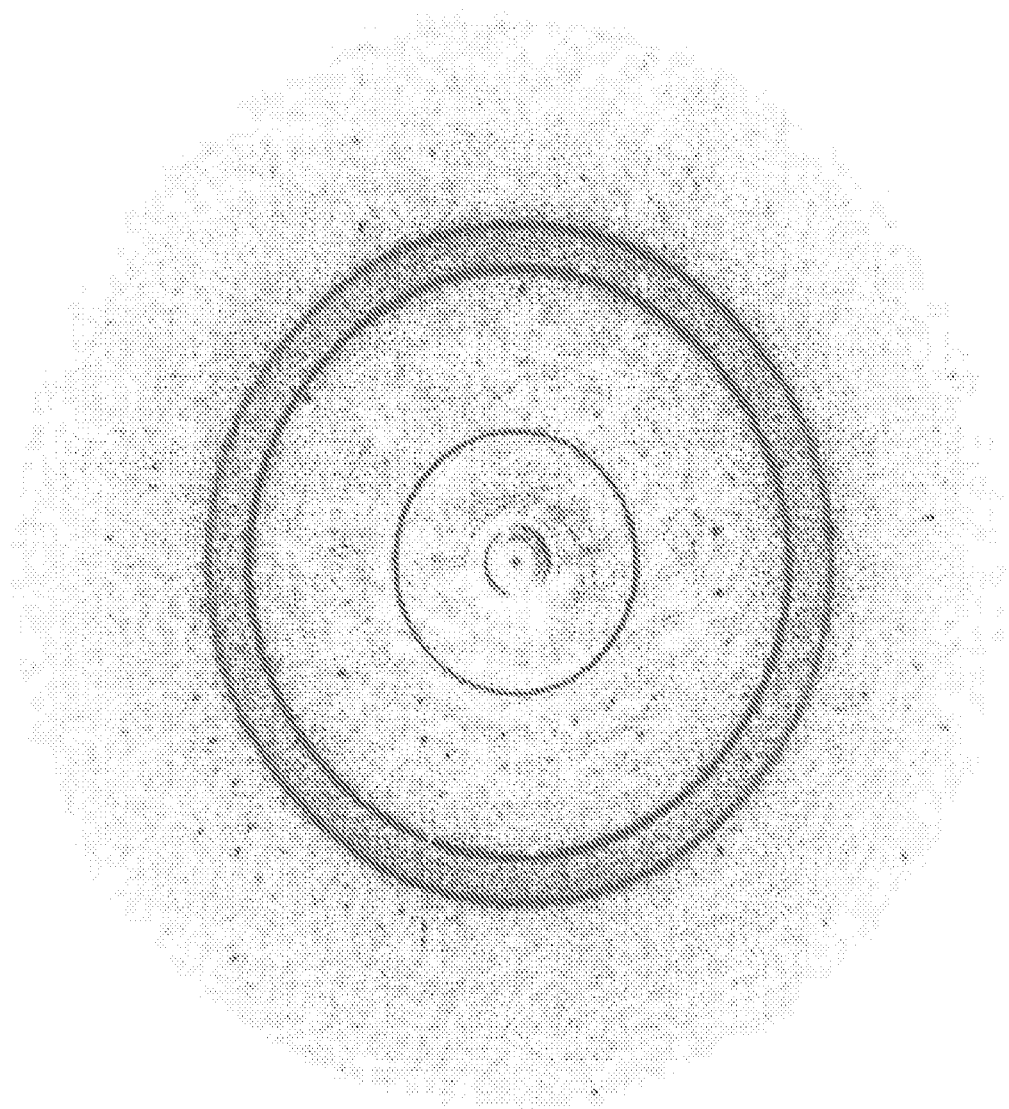
FIG. 31 is an x-ray diffraction pattern (XRD) for Sample E8 D (heat treated) from Example 8 in accordance with embodiments described herein.
Figure 32:
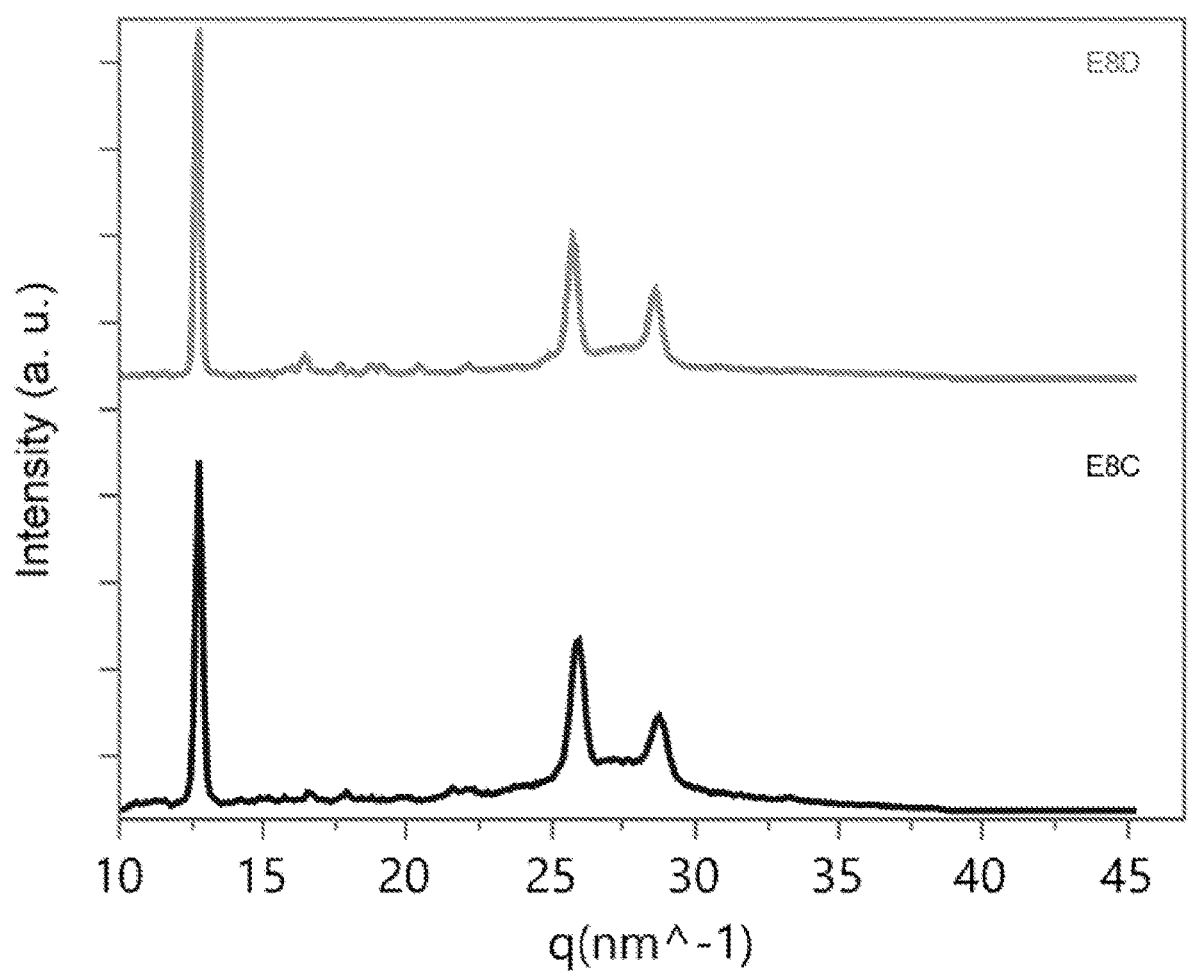
FIG. 32 is a graphical illustration of q (nm$^{-1}$) versus intensity (10-45 nm$^{-1}$) for Samples E8C (bottom trace—not heat treated) and E8D (top trace—heat treated) from Example 8 in accordance with embodiments described herein.
Figure 33:
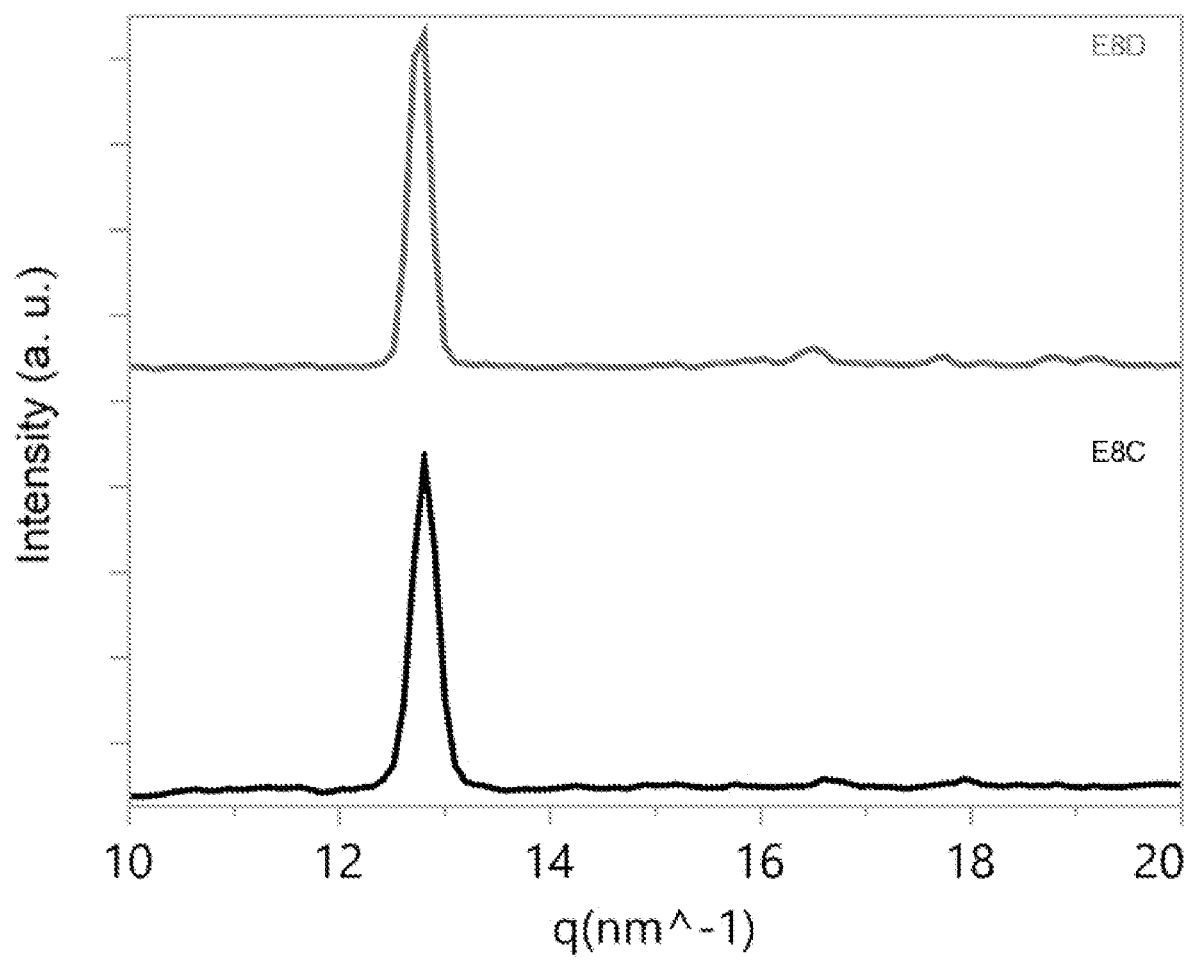
FIG. 33 is a graphical illustration of q(nm$^{-1}$) versus intensity (focusing on 10-20 nm$^{-1}$ range) for Samples E8C (bottom trace —not heat treated) and E8D (top trace—heat treated) from Example 8 in accordance with embodiments described herein.

The ePTFE membranes were harvested from the machine onto (152.4×152.4 mm) adhesive backed frames for further testing. Tensile test results included in Table 17 show the intrinsic strength to weight metrics exceed values previously reported in the art (see Comparative Examples—Table 18). Samples E8C and E8D were further characterized by X-ray diffraction (XRD) (FIG. 30, Sample E8C (not heat treated) and FIG. 31, Sample E8D (heat treated) and the results are consistent with isotropic orientation in the MD-TD plane. These results are consistent with the balanced strength results. FIG. 32 is a plot of q(nm$^{-1}$) vs. intensity over a range of 10-45 nm$^{-1}$ for both a heat treated sample (Sample E8D; top trace) and a sample that was not heat treated (Sample E8C; bottom trace). FIG. 32 is a plot of q (nm$^{-1}$) vs. intensity (10-20 nm$^{-1}$) over a range of 10-20 nm$^{--1}$ for samples E8D (heat treated, top trace) and E8C (not heat treated, bottom trace). FIGS. 32 and 33 demonstrate that the ePTFE membranes have a very high crystallinity index. In addition, the narrowness of the peaks centered at q=12.8 nm$^{-1}$ (FIG. 33) suggest that the crystalline packing of these ePTFE membranes have few defects. Example E8C had a crystallinity index of 99%. Example E8D had a crystallinity index of 99.2%.

TABLE 16

Process parameters for Example 8

| | | First Pass | | | | Rate | | Second Pass | | | |
|---|---|---|---|---|---|---|---|---|---|---|---|
| Sample | Temp (° C.)[2] | n | Time (s) | $\lambda_{1sp}$ | $\lambda_{2sp}$ | Input (%/s) | Rate Mode[1] | n | Time (s) | $\lambda_{1sp}$ | $\lambda_{2sp}$ |
| E8A | 300 | 4 | 240 | 9 | 9 | 36 | s | 32 | 240 | 7 | 7 |
| E8B | 300 | 4 | 240 | 9 | 9 | 36 | s | 16 | 240 | 7 | 7 |
| E8C (FIG. 30) | 322 | 4 | 240 | 7 | 7 | 36 | s | 32 | 240 | 7 | 7 |
| E8D (FIG. 31) | 322 | 4 | 240 | 7 | 7 | 36 | s | 32 | 240 | 7 | 7 |

| | Second Pass | | Third Pass | | | | | | |
|---|---|---|---|---|---|---|---|---|---|
| Sample | Rate Input (%/s) | Rate Mode[1] | n[3] | Time (s) | $\lambda_{1sp}$ | $\lambda_{2sp}$ | Rate Input (%/s) | Rate Mode[1] | Heat Treat. (y/n) |
| E8A | 4 | s | 128 | 240 | 7 | 7 | 1 | r | n |
| E8B | 4 | s | 64 | 240 | 7 | 7 | 1 | r | y |
| E8C (FIG. 30) | 5 | s | 128 | 120 | 8 | 8 | 1 | r | n |
| E8D (FIG. 31) | 5 | s | 128 | 120 | 8 | 8 | 1 | r | y |

[1]"s" = constant speed; "r" = constant acceleration rate set point;
[2]Set point;
[3]final number of layers in final pass.

TABLE 17

Properties of Example 8 ePTFE Membranes

| Sample | Direction | MTS Psi (MPa) | MD × TD (MPa²) | Area Ratio | Areal Density (g/m²) | Thickness (μm) | Bulk Density (g/cm³) | Solid Volume Fraction (SVF) | Porosity (1 − SVF) | Layers (n) | Tenacity (gf/d) |
|---|---|---|---|---|---|---|---|---|---|---|---|
| E8A | MD | 92761 (640) | 449238 | 153893:1 | 0.929 | 9.67 | 0.096 | 0.044 | 0.96 | 128 | 3.23 |
| | TD | 101876 (702) | | | | | | | | | 3.55 |
| E8B | MD | 91382 (630) | 469092 | 140647:1 | 0.518 | 3.76 | 0.138 | 0.063 | 0.94 | 64 | 3.19 |
| | TD | 107985 (745) | | | | | | | | | 3.76 |

Comparative Examples 2-4

The matrix tensile strength of Comparative ePTFE Examples 2-4 are set forth in Table 18.

TABLE 18

Strength to Weight Metrics-Comparative Examples 2-4

| Comparative Example | MD MTS (MPa) | TD MTS (MPa) | MD × TD (MPa²) | Source |
|---|---|---|---|---|
| 2 | 414 | 460 | 190,440 | Example 4 of U.S. Pat. No. 7,306,729 to Bacino, et al. |
| 3 | 586 | 552 | 323,472 | Example 2 of U.S. Patent Publication No. 2013/0231733 to Knisley, et al. |
| 4 | 705 | 385 | 271,425 | Example 1 of U.S. Patent Publication No. 2014/0172083 to Bruchman, et al. |

Example 9

The following example describes the preparation and analysis of uniaxially orientated ePTFE membranes having low mass with high intrinsic strength in the fibril direction.

PTFE fine powder (E.I DuPont de Nemours) was blended with ISOPAR™ K isoparaffinic hydrocarbon lubricant at a target ratio of 110 mL per pound (~0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. A set of 98 mm square was cut from the dry tape. A summary of the process parameters used in Example 9 is provided in Table 19.

First Pass

Using a pantograph machine, two different samples, each having four layers of tape were heated in an oven set to 300° C. (set point) for a target of 240 seconds and then expanded in the longitudinal direction (machine direction) and transverse direction simultaneously ata target ratio of about 10:1 in each direction while maintaining a temperature of about 300° C. The average engineering strain rate target was set to 36%/second. The pantograph opened at a constant velocity target for approximately 25 seconds. The ePTFE membranes were allowed to cool to room temperature (~22° C.) under restraint of the pantograph.

Second Pass

Four pieces (4 layers each) were harvested from the cooled membrane for further expansion, i.e. a second pass. Using the same pantograph machine, samples containing a stack of 16 layers were heated in an oven set to 300° C. for a target of 240 seconds and then expanded in the longitudinal direction and transverse direction simultaneously at a target ratio of 10:1 in each direction while maintaining a temperature of about 300° C. The average engineering strain rate target was set to 3.6%/second. The pantograph opened at a constant velocity target for approximately 250 seconds. The ePTFE membrane was allowed to cool to room temperature (~22° C.) under restraint of the pantograph.

Third Pass

Four samples (16 layers each) were harvested from the cooled membrane and 2 stacks of 16 layers (32 layers total) were loaded for further expansion, i.e. a third pass. Using the same pantograph machine, the membrane was heated in an oven set to 300° C. for a target of 120 seconds and then stretched in the longitudinal direction and transverse directions simultaneously at a target ratio of 3:1 (Example E9A) or 5:1 (Example E9B) in each direction (specific details for each example are included in Table 19) while maintaining a temperature of about 300° C. The average strain rate target was set to 1%/second. The pantograph opened at a constant acceleration rate target for approximately 110 (E9A) or 161 (E9B) seconds. The ePTFE membrane was allowed to cool to room temperature (~22° C.) under restraint of the pantograph.

Optional Fourth Pass

Using the same pantograph machine, for Sample E9B, the 32 layer sample was again heated in an oven set to 300° C. for a target of 120 seconds and then stretched in the longitudinal direction and transverse direction simultaneously at a target ratio of 3:1 in each direction while maintaining a temperature of about 300° C. The simultaneous expansion was conducted at a constant acceleration rate set point of 1%/s. The pantograph opened at a constant acceleration rate for approximately 110 (E9B) seconds.

Second from Last Pass

Using the same pantograph machine, the ePTFE membrane was freed from constraint in the transverse direction, while remaining fixed in the machine direction. The ePTFE membrane was heated in an oven set to 300° C. for a target of 120 seconds and then stretched only in the longitudinal direction at a target ratio of 6:1 (in the machine direction) while the ePTFE membrane in the transverse direction was allowed to neck down (i.e., narrow) freely. The pantograph opened with a constant acceleration rate set point for approximately 170 seconds (E9A-B). The expansion was conducted at a constant acceleration rate set point of 1%/s.

Last Pass

Using the same pantograph machine the 32 layer sample was heated in an oven set to 350° C. for a target of 300 seconds and then stretched at a target ratio of 1.5:1 (Sample E9A) or 1.67:1 (Sample E9B) only in the machine (longitudinal) direction while maintaining a temperature of about 350° C. The expansion was conducted with a constant acceleration rate set point of 1%/s. The pantograph opened with a constant acceleration rate set point for approximately 40 (E9A) or 51 (E9B) seconds.

Figure 34:
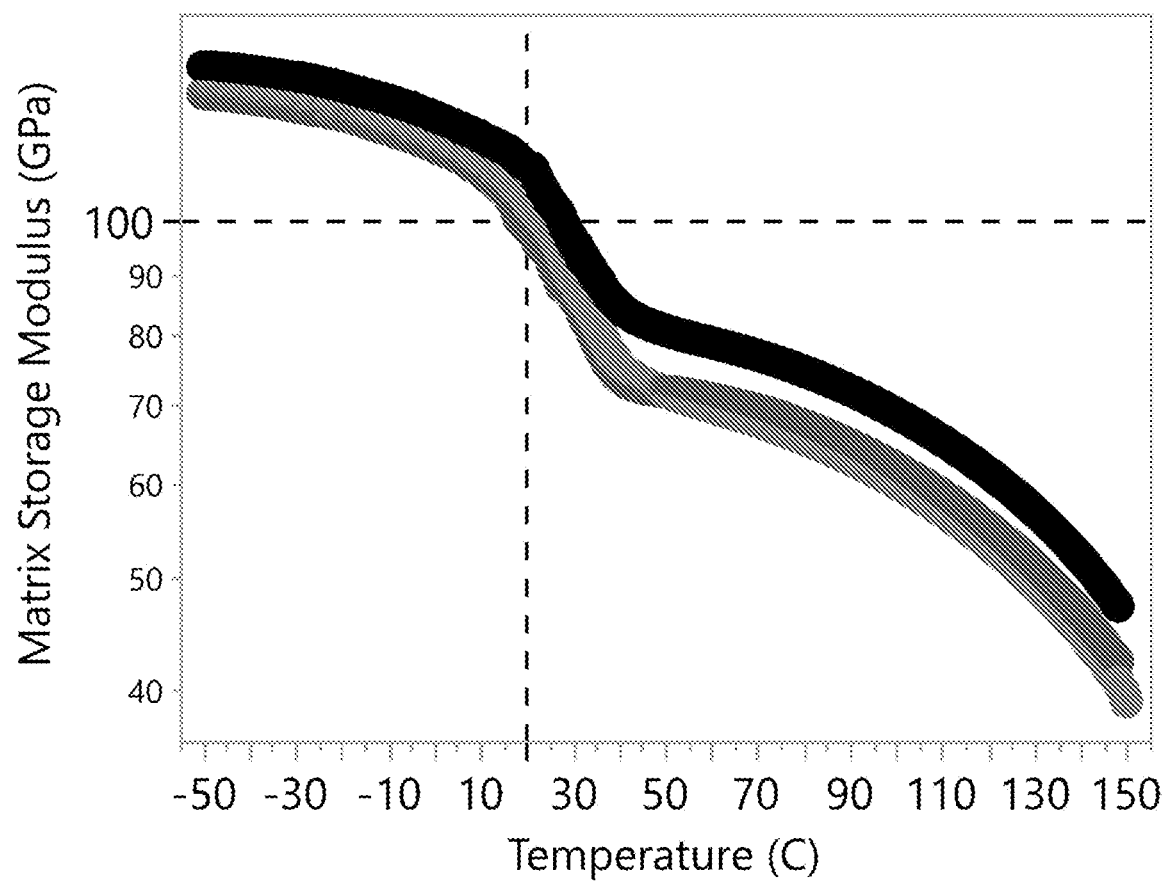
FIG. 34 is a graphical illustration of matrix storage modulus vs. temperature for Sample E9A from Example 9 in accordance with embodiments cescribed herein.
Figure 35:
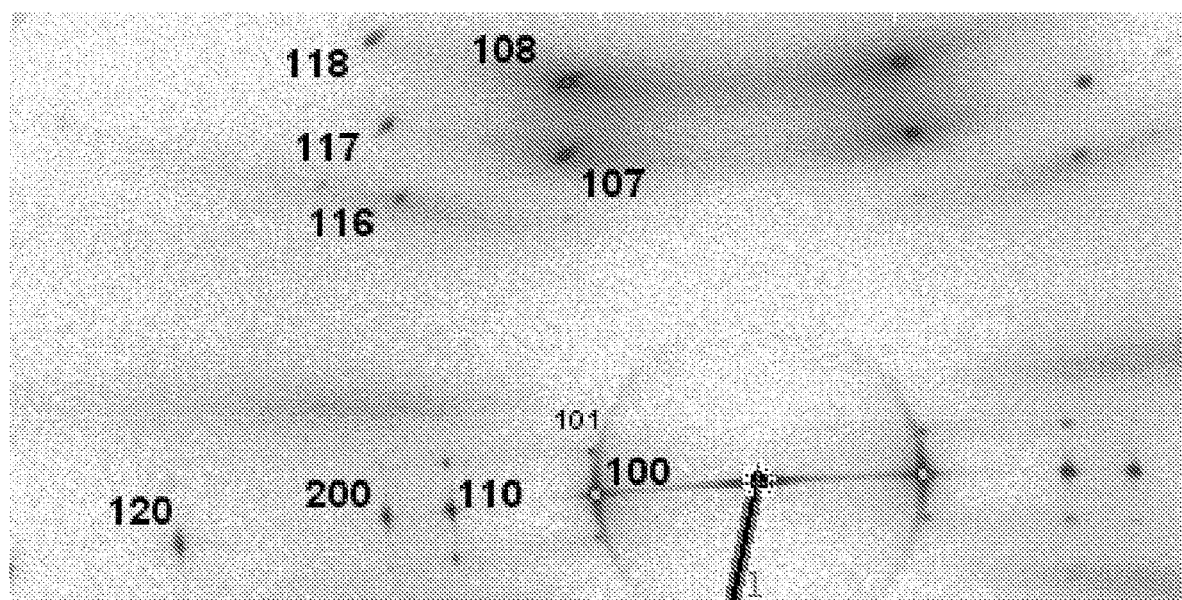
FIG. 35 is an x-ray diffraction pattern (XRD) for Sample E9A from Example 9 in accordance with embodiments described herein.
Figure 36:
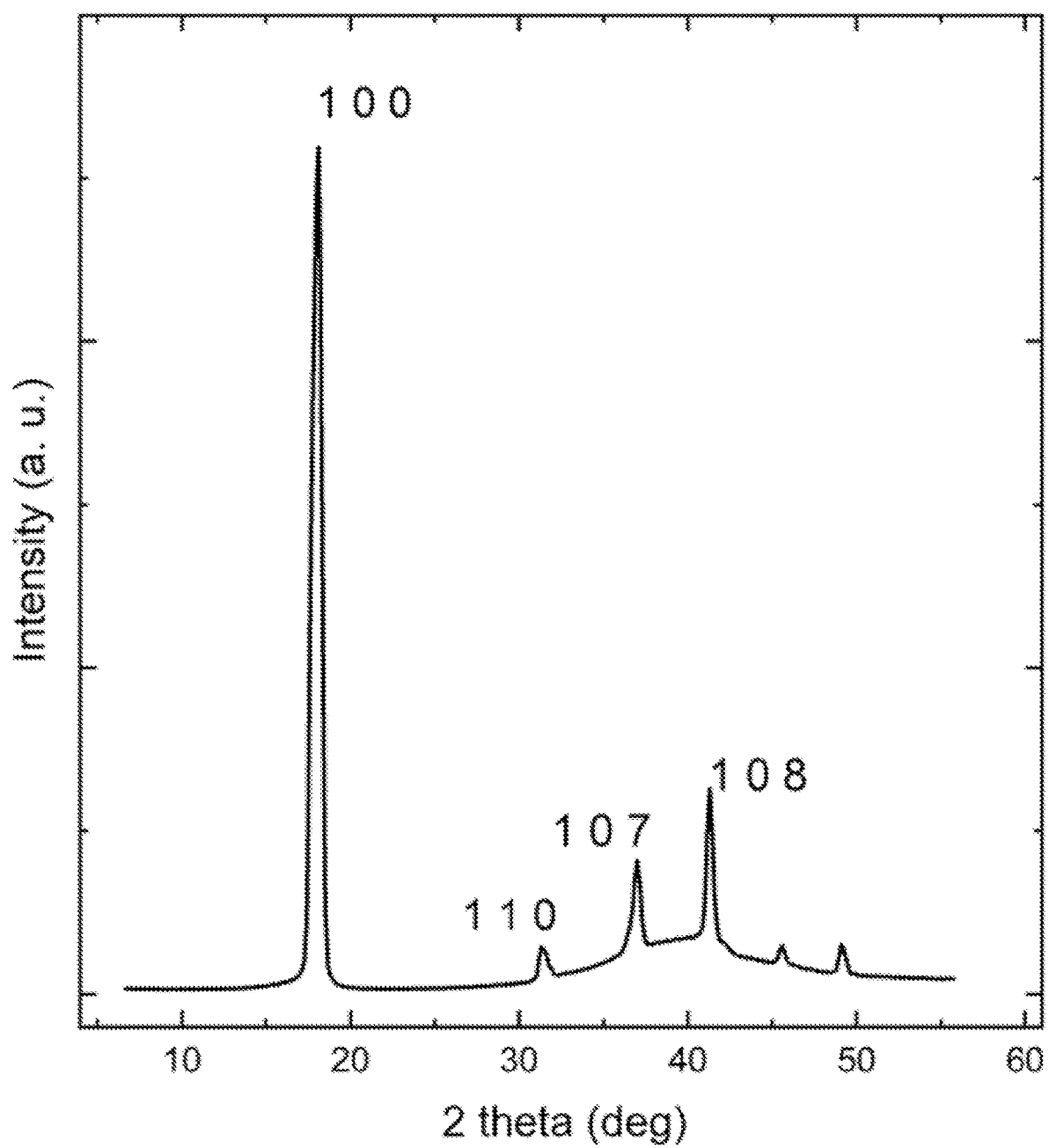
FIG. 36 is a graphical illustration of intensity vs 2-theta for Sample E9A from Example 9 in accordance with embodiments described herein.
Figure 37:
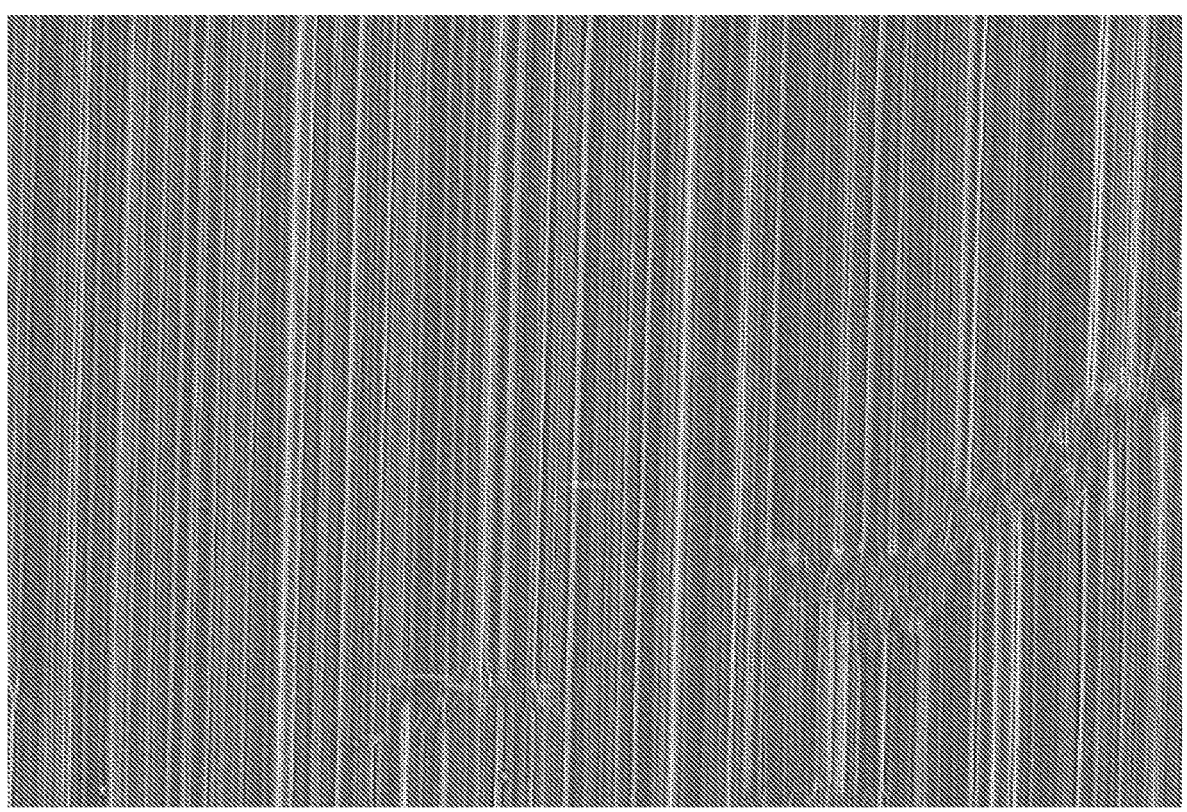
FIG. 37 is an SEM image of Sample E9A from Example 9 taken at 5000× with a full horizontal field width of approximately 23 microns in accordance with embodiments described herein.

The membranes were harvested from the machine onto adhesive backed frames of known dimensions (152.4 mm×152.4 mm). Using the frame as a cutting guide, the ePTFE membranes were weighed to calculate the linear density (bulk denier) and mechanical data was collected using the Matrix Tensile Test from the Test Methods section set forth above. Sample E9A was also characterized using dynamic mechanical analysis (DMA) indicating a matrix modulus of 100 GPa at ambient temperature (i.e., about 20° C.) (FIG. 33). Sample E9A was further characterized by XRD (FIG. 34) which is consistent with an extremely high degree of crystalline orientation, where the <P2> orientation function is 0.989 where 1.0 would be consistent with perfect parallel alignment (FIG. 35). The crystallinity index was determined to be 94.6%. An SEM of Sample E9A is provided as FIG. 36.

TABLE 19

Process Parameters for Example 9 Membranes

| Sample (FIGS.) | Pass | Temp[2] (° C.) | n | Time (s) | $\lambda_{1sp}$ | $\lambda_{2sp}$ | Rate Input (%/s) | Rate Mode[1] |
|---|---|---|---|---|---|---|---|---|
| E9A | 1 | 300 | 4 | 240 | 10 | 10 | 36 | s |
| (FIGS. | 2 | 300 | 16 | 240 | 10 | 10 | 3.6 | s |
| 34-37) | 3 | 300 | 32 | 120 | 3 | 3 | 1 | r |
| | 2nd from last pass | 300 | 32 | 120 | 6 | na | 1 | r |
| | Last | 350 | 32[3] | 300 | 1.5 | na | 1 | r |
| E9B | 1 | 300 | 4 | 240 | 10 | 10 | 36 | s |
| | 2 | 300 | 16 | 240 | 10 | 10 | 3.6 | s |
| | 3 | 300 | 32 | 120 | 5 | 5 | 1 | r |
| | 4 | 300 | 32 | 120 | 3 | 3 | 1 | r |
| | 2nd from last pass | 300 | 32 | 120 | 6 | na | 1 | r |
| | Last | 350 | 32[3] | 300 | 1.67 | na | 1 | r |

[1]"s" = constant speed; "r" = constant acceleration rate set point;
[2]Set point;
[3]final number of layers in final pass.

TABLE 20

Properties of the Uniaxially Oriented Membranes

| Sample | Direction | Matrix Tensile Strength Psi (MPa) | Tenacity (gf/d) | Bulk Denier (g/9000 m) | Areal Density (g/m$^2$) | Thickness (μm) | Bulk density (g/cm$^3$) | Solid Volume Fraction (SVF) | Porosity (1 − SVF) | Layers (n) |
|---|---|---|---|---|---|---|---|---|---|---|
| E9A | Uniaxial | 167,474 (1155) | 5.9 | 160 | 6 | 3.81 | 1.58 | 0.716 | 0.284 | 32 |
| E9B | Uniaxial | 202,649 (1397) | 7.2 | 431 | 16 | 8.61 | 1.86 | 0.845 | 0.155 | 32 |

Example 10

The following example discloses the production of multilayered ePTFE membranes having very low mass with high intrinsic strength and the measurement of nanoparticle retention. Nanoparticle retention is tested using the bead test disclosed in the methods section which measures permeability and bead retention of the membrane sample.

PTFE fine powder (E.I DuPont de Nemours) was blended with ISOPAR™ K isoparaffinic hydrocarbon lubricant at a target ratio of 110 mL per pound (0.454 kg) of fine powder (0.156 g lube/g total) (grams lube/mass of total mixture). The lubricated powder was compressed into a cylinder and was ram extruded at 49° C. to provide a tape. The tape was 16.2 cm wide and 0.762 mm thick. The ISOPAR™ K was removed by heating to approximately 200° C. The dry tape was cut in to 98 mm squares. A summary of the process parameters used in Example 10 is provided in Table 21.

First Pass

Using a pantograph machine, four squares of tape were layered and heated in an oven set to 300° C. for a target of 120 (E10A-C) seconds and then expanded in the longitudinal direction and transverse direction simultaneously at a selected target ratio (in each direction) ($\lambda_{sp}$) of 7:1 (E10A and E10C) or 2:1 for E10B in each direction, while maintaining a temperature of about 300° C. The average engineering strain rate target was set to 36%/second. The pantograph opened at a constant velocity target for approximately 16.6 (E10A and E10C) or about 2.8 (E10B) seconds based on the target ratio (Table 21). The expanded membrane was allowed to cool to room temperature (~22° C.) under restraint of the pantograph. The first pass is repeated until 64 (E10A), or 16 (E10B) or 32 (E10C) layers are available for the second pass.

Second Pass

The specific number of layers, 64 (E10A), 16 (E10B) or 32 (E10C) were loaded for the second pass of each condition as provided in Table 21. Using the same pantograph machine, stacks of layers were heated in an oven set to 300° C. fora target of 240 (E10A and B) or 120 (E10C) seconds and then expanded in the longitudinal direction and transverse direction simultaneously at selected target of 7:1 (E10A) or 10:1 (E10B) or 6:1 (E10C) in each direction while maintaining a temperature of about 300° C. The average engineering strain rate target was 5%/s (E10A and E10C) or 18%/s (E10B) (Table 22). The pantograph opened at a constant velocity target for approximately 120 (E10A), 50 (E10B) and 100 (E10C) seconds. The expanded membrane was allowed to cool to room temperature (~22° C.) under restraint of the pantograph.

Third Pass

Samples were harvested from the cooled membrane and layered if needed for further expansion, i.e. a third pass. The specific number of layers, 256 (E10A), 120 (E10B) or 128 (E10C) were loaded for the second pass of each condition as provided in Table 21. Using the same pantograph machine, the membrane was again heated in an oven set to 300° C. for a target of 120 (E10A-C) seconds and then expanded in the longitudinal direction and transverse direction simultaneously at target ratios of 8:1 (E10A), 10:1 (E10B) or 6:1 (E10C) in both longitudinal and transverse directions while maintaining a temperature of about 300° C. The average constant acceleration rate set point was 1%/s. The pantograph opened at a constant acceleration rate set point for approximately 221 (E10A), 261 (E10B) or 179 (E10C) seconds. The expanded membrane was allowed to cool to room temperature (~22° C.) under restraint of the pantograph.

The samples were harvested from the machine onto (152.4 mm×152.4 mm) adhesive backed frames for further testing (E10A and E10B) or further expansion (E10C).

Fourth Pass

Samples were harvested from the cooled membrane and layered if needed for further expansion, i.e. a fourth pass. The specific number of layers, 2056, (E10C) were loaded for the fourth pass of each condition as provided in Table 22. Using the same pantograph machine, the membrane was again heated in an oven set to 300° C. for a target of 120 (E10C) seconds and then expanded in the longitudinal direction and transverse direction simultaneously at target ratios of 4.75:1 (E10C) in both longitudinal and transverse directions while maintaining a temperature of about 300° C. The average strain rate target was 1%/s. The pantograph opened at a constant acceleration rate set point for approximately 156 (E10C) seconds. The expanded membrane was allowed to cool to room temperature (~22° C.) under restraint of the pantograph.

Densification

The samples (E10A-C) were densified while restrained in the MD and TD plane, by gently pouring Isopropyl Alcohol (IPA) onto the restrained membrane and allowing the IPA to evaporate.

Figure 38:
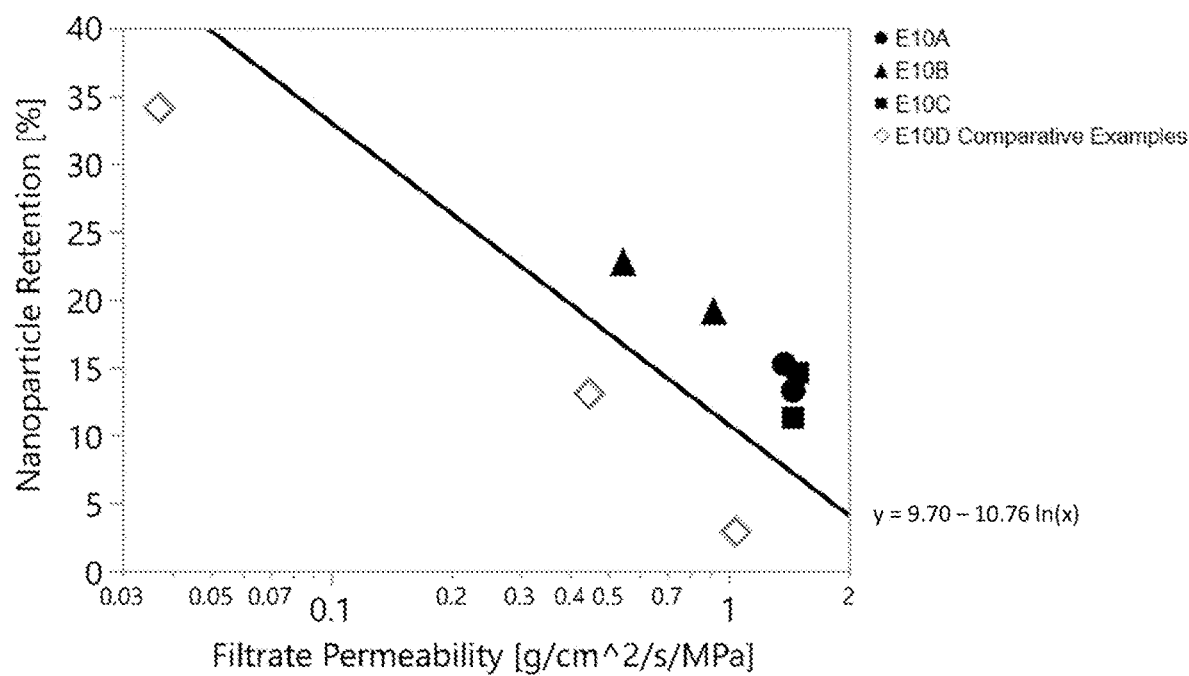
FIG. 38 is a graphical illustration of nanoparticle vs. filtrate permeability retention for Example 10 samples in accordance with embodiments described herein.
Figure 39:
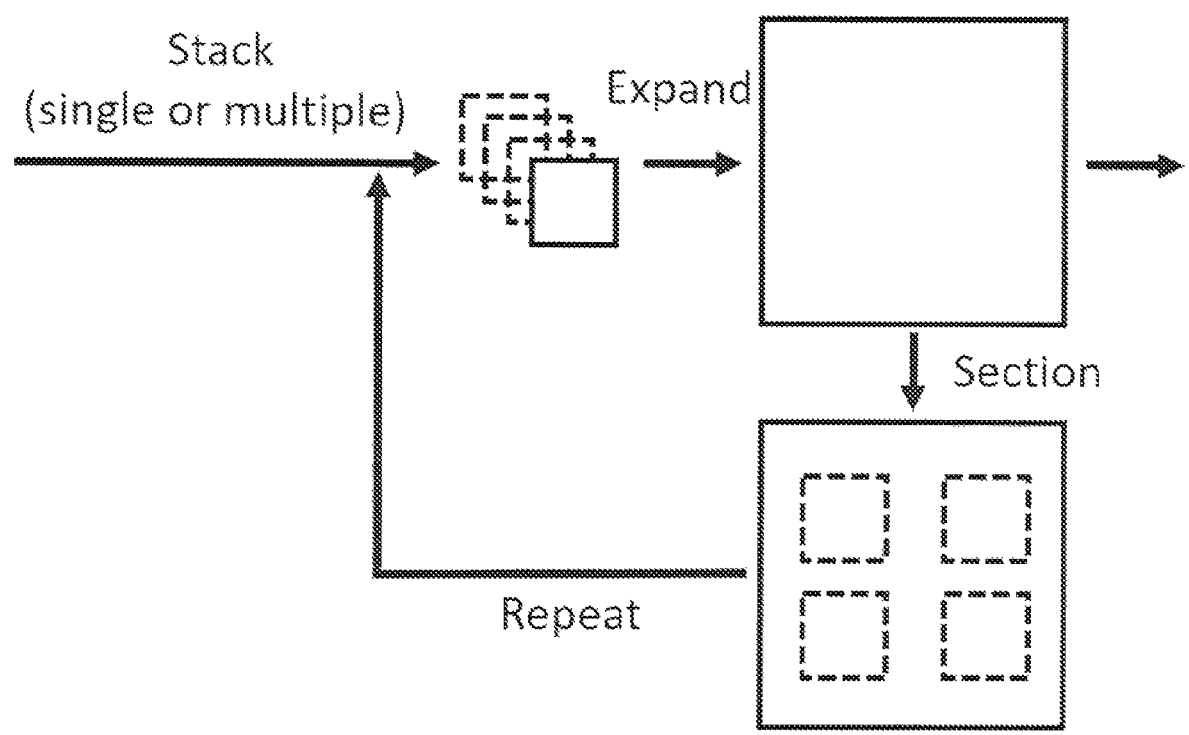
FIG. 39 is a diagram generally depicting a method of making a biaxially expanded membrane in accordance with embodiments described herein.

Each membrane sample (i.e., samples E10A, E10B, and E10C) was evaluated for mean filtrate permeability (See Equation (9) above), and bead retention (See Equation (10) above) according to the Determination of Permeability and Retention with Bead Test set forth above in the Test Methods section. The results are provided in Table 22 and in FIG. 38.

Comparative Examples 5-7

Three comparative liquid filtration samples were prepared as follows.

Comparative Example 5

A fine powder of polytetrafluoroethylene polymer made in accordance with the teachings of U.S. Pat. No. 6,541,589 to Baillie was combined with 0.184 lb/lb of an isoparaffinic hydrocarbon lubricant (ISOPAR™ K, Exxon, Houston, Texas). The resultant mixture was then blended, compressed into a cylindrical pellet, and thermally conditioned for at least 8 hours at a temperature of 49° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 200° C.

The dried tape was then expanded at 330° C. in the machine direction to an expansion ratio of 7:1. The resulting material was subsequently expanded in the transverse direction to an expansion ratio of 12:1 at temperature of about 310° C.

This biaxially expanded membrane was compressed between rollers (at 25° C.) at a speed of 1 m/minute and with a compression force of 10 N/mm.

Comparative Example 6—Sample E10D2

A fine powder of polytetrafluoroethylene polymer made in accordance with the teachings of U.S. Pat. No. 6,541,589 to Baillie was combined with 0.151 lb/lb of lubricant (ISOPAR™ K, Exxon, Houston, Tex.). The resultant mixture was then blended, compressed into a cylindrical pellet, and thermally conditioned for at least 8 hours at a temperature of 49° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 200° C. The dried tape was then expanded at 330° C. in the machine direction to an expansion ratio of 5:1. The resulting material was subsequently expanded in the transverse direction to an expansion ratio of 10.8:1 at temperature of about 310° C. The membrane was then heat treated at a temperature of approximately 380° C. for a target of 25 seconds. This biaxially expanded membrane was compressed between rollers (at 25° C.) at a speed of 1 m/minute and with a compression force of 20 N/mm.

Comparative Example 7—Sample E10D3

A fine powder of polytetrafluoroethylene polymer made in accordance with the teachings of U.S. Pat. No. 6,541,589 to Baillie was combined with 0.145 lb/lb of lubricant (ISOPAR™ K, Exxon, Houston, Tex.). The resultant mixture was then blended, compressed into a cylindrical pellet, and thermally conditioned for at least 8 hours at a temperature of 49° C. The cylindrical pellet was then extruded through a rectangular orifice die at a reduction ratio of 72:1 to form a tape. The tape was then calendered between rolls at a calendering ratio of 3:1. The calendered tape was then transversely stretched at a ratio of 3.6:1 and dried at a temperature of 230° C. The dried tape was then expanded at 325° C. in the machine direction to an expansion ratio of 5:1. The resulting material was subsequently expanded in the transverse direction to an expansion ratio of 12.3:1 at temperature of about 300° C. This biaxially expanded membrane was compressed between rollers (at 90° C.) at a speed of 5 m/minute and with a compression force of 80 N/mm.

Each Comparative Example membrane sample (i.e., samples E10D1, E10D2, and E10D3) was evaluated for mean filtrate permeability (See Equation (9)), and bead retention (See Equation (10)) using the testing procedures described above. The results are provided in Table 22 and in FIG. 38.

TABLE 21

Process parameters for Example 10 - Samples E10A-E10C

| Sample | Pass | Temp[2] ° C. | n | Time (s) | $\lambda_{1sp}$ | $\lambda_{2sp}$ | Rate Input (%/s) | Rate Mode[1] |
|---|---|---|---|---|---|---|---|---|
| E10A | 1 | 300 | 4 | 120 | 7 | 7 | 36 | s |
|  | 2 | 300 | 64 | 240 | 7 | 7 | 5 | s |
|  | 3 | 300 | 256[3] | 120 | 8 | 8 | 1 | r/s |
| E10B | 1 | 300 | 4 | 120 | 2 | 2 | 36 | s |
|  | 2 | 300 | 16 | 240 | 10 | 10 | 18 | s |
|  | 3 | 300 | 120[3] | 120 | 10 | 10 | 1 | r/s |
| E10C | 1 | 300 | 4 | 120 | 7 | 7 | 36 | s |
|  | 2 | 300 | 32 | 120 | 6 | 6 | 5 | s |
|  | 3 | 300 | 128 | 120 | 6 | 6 | 1 | r |
|  | 4 | 300 | 2048[3] | 120 | 4.75 | 4.75 | 1 | r |

[1]"s" = constant speed; "r" = constant acceleration rate set point; "r/s"—combination of constant acceleration rate step followed by constant speed step;
[2]Set point;
[3]final number of layers in final pass.

TABLE 22

Nanoparticle retention and Filtrate Permeability for Example 10

| Sample | Nanoparticle Retention (%) | Filtrate Permeability (g/cm²/m/MPa) |
|---|---|---|
| E10A | 15.2 | 1.38 |
| E10A | 13.3 | 1.45 |
| E10B | 19.1 | 0.92 |
| E10B | 22.7 | 0.54 |
| E10C | 11.3 | 1.45 |
| E10C | 14.6 | 1.49 |
| E10D1 (Comparative Example) | 2.9 | 1.04 |
| E10D2 (Comparative Example) | 13.0 | 0.45 |
| E10D3 (Comparative Example) | 34.1 | 0.04 |

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. An expanded polytetrafluoroethylene (ePTFE) membrane comprising:
    a matrix tensile strength at least about 600 MPa in both longitudinal and transverse directions; and
    a crystallinity index of at least about 94%.

2. The expanded polytetrafluoroethylene membrane of claim 1, wherein the ePTFE membrane has an areal density per layer less than about 100 mg/m².

3. The expanded polytetrafluoroethylene membrane of claim 1, wherein the ePTFE membrane has a specific surface area from about 35 m²/g to about 120 m²/g.

4. The expanded polytetrafluoroethylene membrane of claim 1, wherein the ePTFE membrane has a total luminous transmittance of at least about 98%.

5. The expanded polytetrafluoroethylene membrane of claim 1, wherein the ePTFE membrane comprises fibrils having a median fibril width from about 10 nm to about 80 nm.

6. The expanded polytetrafluoroethylene membrane of claim 1, wherein the ePTFE membrane has a membrane thickness per layer from 1 nm to about 100 nm.

7. The expanded polytetrafluoroethylene membrane of claim 1, wherein the ePTFE membrane is self-supporting.

8. The expanded polytetrafluoroethylene membrane of claim 1, wherein the ePTFE membrane is biaxially oriented.

9. The expanded polytetrafluoroethylene membrane of claim 8, wherein the ePTFE membrane has an areal density less than about 10 g/m².

10. The expanded polytetrafluoroethylene membrane of claim 8, wherein the ePTFE membrane has a quality factor at a particle size of 0.1 micron and a face velocity 5.33 cm/sec of at least about 65 kPa$^{-1}$.

11. The expanded polytetrafluoroethylene membrane of claim 8, wherein the ePTFE membrane is at least partially coated with a polymer, at least partially imbibed with a polymer, or a combination thereof.

12. The expanded polytetrafluoroethylene membrane of claim 8, in the form of a fiber, a sheet, a tube, a three dimensional self-supporting structure, a diced fiber, a diced sheet, a diced tube, or a diced three dimensional self-supporting structure.

13. The expanded polytetrafluoroethylene membrane of claim 8, wherein the ePTFE membrane has a specific surface area from about 35 m$^2$/g to about 120 m$^2$/g.

14. The expanded polytetrafluoroethylene membrane of claim 8, wherein the ePTFE membrane has a total luminous transmittance of at least about 98%.

15. The expanded polytetrafluoroethylene membrane of claim 8, further comprising a spacing layer.

16. The expanded polytetrafluoroethylene membrane of claim 15, wherein the spacing layer is selected from a porous polymer, a non-porous polymer, a fluoropolymer, a porous polyolefin, and a non-porous polyolefin.

17. A composite comprising the expanded polytetrafluoroethylene membrane of claim 1.

18. A laminate comprising the expanded polytetrafluoroethylene membrane of claim 1.

19. An article comprising the expanded polytetrafluoroethylene membrane of claim 1.

20. A method comprising:
    (1) sectioning at least a first piece from a first expanded polytetrafluoroethylene (ePTFE) membrane;
    (2) biaxially stretching said at least a first piece to obtain a second expanded polytetrafluoroethylene membrane;
    (3) sectioning at least a second piece from said second expanded membrane;
    (4) positioning said at least one first piece and said at least one second piece in a stacked orientation to form stacked sample; and
    (5) repeating steps (2) through (4) until a desired biaxially oriented ePTFE membrane is obtained.

21. The method of claim 20, further comprising including a spacing layer.

22. The method of claim 21, wherein the spacing layer is selected from a porous polymer, a non-porous polymer, a fluoropolymer, a porous polyolefin, and a non-porous polyolefin.

23. A method of filtering a filterable matrix comprising:
    passing a filterable matrix through the ePTFE membrane of claim 1 to form a filtrate.

24. The method of claim 23, comprising collecting the filtrate.

25. The method of claim 23, wherein the filterable matrix is selected from a solution, a suspension, a colloid, a biological fluid, a component of a biological fluid, an aqueous material, or a non-aqueous material.

26. The method of claim 23, further comprising a nanoparticle retention percent (%) equal to or greater than a line defined by the following equation:

$$y >= 9.70 - 10.76 * \ln(x)$$

where
  y=Nanoparticle Retention %, and
  x=Filtrate Permeability (g/cm$^2$/s/MPa).

* * * * *